US012730709B2

(12) United States Patent
Tang et al.

(10) Patent No.: US 12,730,709 B2
(45) **Date of Patent: *Sep. 8, 2026**

(54) MEMORY DEVICE AND OPERATION METHOD THEREOF, MEMORY SYSTEM AND MEMORY CONTROLLER

(71) Applicant: YANGTZE MEMORY TECHNOLOGIES CO., LTD., Wuhan (CN)

(72) Inventors: Xingwei Tang, Wuhan (CN); Guangchang Ye, Wuhan (CN); Wen Luo, Wuhan (CN); Chaofan Xie, Wuhan (CN); Yufei Feng, Wuhan (CN); Cheng Han, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 4 days.

This patent is subject to a terminal disclaimer.

(21) Appl. No.: 18/821,601

(22) Filed: Aug. 30, 2024

(65) Prior Publication Data

US 2025/0328416 A1 Oct. 23, 2025

Related U.S. Application Data

(63) Continuation of application No. PCT/CN2024/088898, filed on Apr. 19, 2024.

(51) Int. Cl.
*G06F 11/10* (2006.01)

(52) U.S. Cl.
CPC ...... *G06F 11/1016* (2013.01); *G06F 11/1004* (2013.01)

(58) Field of Classification Search
None
See application file for complete search history.

(56) References Cited

U.S. PATENT DOCUMENTS

| | | | | |
|---|---|---|---|---|
| 2014/0119124 | A1* | 5/2014 | Kim | G11C 16/0483 365/185.18 |
| 2022/0139475 | A1 | 5/2022 | Seo et al. | |
| 2025/0328257 | A1* | 10/2025 | Tang | G06F 3/0619 |

FOREIGN PATENT DOCUMENTS

| | | | |
|---|---|---|---|
| CN | 103578523 | A | 2/2014 |
| CN | 103778962 | A | 5/2014 |
| CN | 108573722 | A | 9/2018 |
| CN | 111916134 | A | 11/2020 |

(Continued)

*Primary Examiner* — Guerrier Merant

(74) *Attorney, Agent, or Firm* — BAYES PLLC

(57) ABSTRACT

According to one aspect, a memory device is provided. The memory device may include a memory cell array including a plurality of memory cells. A preset number of the memory cells may form a code word. The memory device may include a peripheral circuit coupled to the memory cell array. The peripheral circuit may be configured to obtain M first results corresponding to at least one code word at M reference read voltages. The peripheral circuit may be configured to obtain a predicted valley voltage according to the M first results and the M reference read voltages in combination with a preset function model. The peripheral circuit may be configured to, based on the predicted valley voltage, determine a target valley voltage and the target valley voltage is configured as a read voltage used when a read operation is performed on the at least one code word.

20 Claims, 26 Drawing Sheets

(56) References Cited

FOREIGN PATENT DOCUMENTS

| | | | |
|---|---|---|---|
| CN | 113223593 | A | 8/2021 |
| CN | 113421601 | A | 9/2021 |
| CN | 115148269 | A | 10/2022 |
| KR | 20140052691 | A | 5/2014 |
| WO | 2023087267 | A1 | 5/2023 |

* cited by examiner

MEMORY DEVICE AND OPERATION METHOD THEREOF, MEMORY SYSTEM AND MEMORY CONTROLLER

CROSS-REFERENCE TO RELATED APPLICATIONS

The present application is a continuation of International Application No. PCT/CN2024/088898, filed on Apr. 19, 2024, which is hereby incorporated by reference in its entirety.

TECHNICAL FIELDS

Examples of the present disclosure relate to the field of semiconductor technology and relate to, but not limited to, a memory device and operation method thereof, a memory system, a memory controller and a storage medium.

BACKGROUND

With development of science and technology, the market of the integrated circuit industry is continuously growing, while in the whole integrated circuit industry, the processes and technologies for non-volatile memory devices have achieved development with great leaps in recent years. Among non-volatile memory devices, NAND memories can be found in an especially wide variety of applications. The data storage function of a NAND memory is achieved by trapping and storing a charge in the gate dielectric layer of a memory cell included in the NAND memory. However, as the usage time increases, the charge stored in a memory cell may be changed with the increasing usage time, repeated read operations, cross temperatures or the like, thereby affecting reading accuracy of the data stored in the memory cell.

SUMMARY

According to one aspect of the present disclosure, a memory device is provided. The memory device may include a memory cell array including a plurality of memory cells. A preset number of the memory cells may form a code word. The memory device may include a peripheral circuit coupled to the memory cell array. The peripheral circuit may be configured to obtain M first results corresponding to at least one code word at M reference read voltages. Each of the M first results may include a number of bits which represents a number of flipped bits of the at least one code word in two read results under a first read voltage and a second read voltage. A difference between the first read voltage and the second read voltage may be smaller than a preset voltage and M is an integer larger than or equal to 2. The peripheral circuit may be configured to obtain a predicted valley voltage according to the M first results and the M reference read voltages in combination with a preset function model. The preset function model may represent a relationship between the first results and the reference read voltages and the M first results are all within a first preset interval. The peripheral circuit may be configured to, based on the predicted valley voltage, determine a target valley voltage and the target valley voltage is configured as a read voltage used when a read operation is performed on the at least one code word.

In some implementations, the first preset interval may represent a numerical interval of the first results corresponding to a preset region of a curve where the preset function model is located.

In some implementations, the peripheral circuit may be configured to obtain the first result corresponding to the at least one code word under a target read voltage. In some implementations, the peripheral circuit may be configured to, in response to a first result of the M first results corresponding to the at least one code word under the target read voltage being within the first preset interval, take the target read voltage as one of the M reference read voltages and take the first result within the first preset interval as a corresponding first result under the reference read voltage.

In some implementations, the peripheral circuit may be configured to obtain a predicted parameter of the preset function model according to the M first results and the M reference read voltages in combination with the preset function model. In some implementations, the predicted parameter may be the corresponding reference read voltage when a curve where the preset function model is located has the minimum first result. In some implementations, the peripheral circuit may be configured to obtain the predicted valley voltage according to the predicted parameter.

In some implementations, the preset function model may include a quadratic function model including the following functional relation formula: $y=a(x+b)^2+c$, where y is a first result of the M first results, x is a reference read voltage of the M reference read voltages, b represents the predicted parameter, a is a first parameter, and c is a second parameter.

In some implementations, the first preset interval may represent a range between a first threshold and a second threshold in a curve where the quadratic function model is located. In some implementations, the first threshold may be larger than the second threshold.

In some implementations, the first parameter and the second parameter may both be constants. In some implementations, the peripheral circuit may be configured to obtain the first result corresponding to the at least one code word under a target read voltage. In some implementations, the peripheral circuit may be configured to, in response to the first result corresponding to the at least one code word under the target read voltage being within the first preset interval, take the target read voltage as one of the reference read voltages. In some implementations, in response to the first result corresponding to the at least one code word under the target read voltage being outside the first preset interval, obtain at least one new target read voltages again and obtain the corresponding first results under the at least one new target read voltages until the corresponding first result under the newest target read voltage falls within the first preset interval.

In some implementations, at least two of the M reference read voltages may be located on two sides of an axis of symmetry of the curve where the quadratic function model is located. In some implementations, the peripheral circuit may be configured to, when obtaining the reference read voltage, obtain the reference read voltages on a first side of the two sides of the axis of symmetry of the curve where the quadratic function model is located. In some implementations, the peripheral circuit may be configured to determine the reference read voltages on a second side of the two side of the axis of symmetry according to the reference read voltages on the first side.

In some implementations, the peripheral circuit may be configured to, in response to the first result corresponding to the at least one code word under the target read voltage being outside the first preset interval, based on the target read voltage, the corresponding first result under the target read voltage, a target first result, and a first mapping function, obtain a fitted read voltage on the first side corresponding to the target first result. In some implementations, the first mapping function may be obtained according to the quadratic function model, the first parameter and the second parameter. In some implementations, the target first result may be within a second preset interval and the first preset interval may be within the range of the second preset interval. In some implementations, the peripheral circuit may be configured to obtain the first result corresponding to the at least one code word under the fitted read voltage on the first side. In some implementations, the peripheral circuit may be configured to, in response to the corresponding first result under the fitted read voltage on the first side being within the first preset interval, take the fitted read voltage on the first side as one of the reference read voltages on the first side. In some implementations, the peripheral circuit may be configured to, in response to the corresponding first result under the fitted read voltage on the first side being outside the first preset interval, based on the previous fitted read voltage on the first side, the corresponding first result under the previous fitted read voltage on the first side, the target first result and the first mapping function, obtain a next fitted read voltage on the first side corresponding to the target first result until the corresponding first result under the newest fitted read voltage on the first side is within the first preset interval, and take the newest fitted read voltage on the first side as one of the reference read voltages on the first side.

In some implementations, the peripheral circuit may be configured to, in response to the number of times the corresponding first result under the newest fitted read voltage on the first side being outside the first preset interval is larger than or equal to a preset number of times, adjust a value of the first parameter and adjust the first mapping function correspondingly. In some implementations, the peripheral circuit may be configured to, based on the previous fitted read voltage on the first side, the corresponding first result under the previous fitted read voltage on the first side, the target first result and the adjusted first mapping function, obtain a next adjusted fitted read voltage on the first side corresponding to the target first result until the corresponding first result under the newest adjusted fitted read voltage on the first side is within the first preset interval.

In some implementations, the peripheral circuit may be configured to, based on one of the reference read voltages on the first side, the corresponding first result under one of the reference read voltages on the first side, the target first result and a second mapping function, obtain a fitted read voltage on the second side corresponding to the target first result. In some implementations, the second mapping function is obtained according to the quadratic function model, one or more of the first parameter or the adjusted first parameter, and the second parameter. In some implementations, the peripheral circuit may be configured to obtain the first result corresponding to the at least one code word under the fitted read voltage on the second side. In some implementations, the peripheral circuit may be configured to, in response to the corresponding first result under the fitted read voltage on the second side being within the first preset interval, take the fitted read voltage on the second side as one of the reference read voltages on the second side.

In some implementations, the peripheral circuit may be configured to, in response to the corresponding first result under the fitted read voltage on the second side being outside the preset interval, based on the previous fitted read voltage on the second side, the corresponding first result under the previous fitted read voltage on the second side, the target first result and a third mapping function, obtain a next fitted read voltage on the second side corresponding to the target first result until the corresponding first result under the newest fitted read voltage on the second side is within the first preset interval, and take the newest fitted read voltage on the second side as one of the reference read voltages on the second side. In some implementations, the third mapping function may be obtained according to the quadratic function model, one or more of the first parameter or the adjusted first parameter, and the second parameter.

In some implementations, the first parameter may be a variable and the second parameter may be constant. In some implementations, the peripheral circuit may be configured to obtain the predicted parameter according to the M first results and the M reference read voltages in combination with the quadratic function model. In some implementations, the peripheral circuit may be configured to take the predicted parameter as the predicted valley voltage.

In some implementations, the first parameter and the second parameter may both be variables. In some implementations, the peripheral circuit may be configured to obtain the predicted parameter according to the M first results and the M reference read voltages in combination with the quadratic function model. In some implementations, the peripheral circuit may be configured to take the predicted parameter as a target read voltage and obtain the first result corresponding to the at least one code word under the target read voltage which is the predicted parameter. In some implementations, the peripheral circuit may be configured to obtain a new predicted parameter according to the M first results, the M reference read voltages, the predicted parameter and the corresponding first result under the target read voltage which is the predicted parameter in combination with the quadratic function model. In some implementations, the peripheral circuit may be configured to take the new predicted parameter as the predicted valley voltage.

In some implementations, the memory cell array may include memory cells each having a plurality of memory bits. In some implementations, the plurality of memory bits may correspond to a plurality of pages respectively. In some implementations, at least one of the pages may correspond to a plurality of stages. In some implementations, the peripheral circuit may be configured to, after determining the target valley voltage of the at least one code word for a target stage, determine the target valley voltages for the other stages than the target stage among the plurality of stages respectively.

In some implementations, the plurality of stages may include a first stage and a second stage. In some implementations, the read voltage for the second stage may be smaller than that for the first stage. In some implementations, the peripheral circuit may be configured to, when the determined target valley voltage corresponds to the first stage, according to the target valley voltage determined for the first stage, obtain at least one of a predicted valley voltage for the second stage or predicted valley voltages for the remaining first stages with lower read voltages among the plurality of stages.

In some implementations, the peripheral circuit may be configured to, according to the first result corresponding to the at least one code word under the target read voltage, obtain a preset threshold. In some implementations, the preset threshold may be configured to represent a first result corresponding to a maximum in an effective range of the predicted valley voltages. In some implementations, the peripheral circuit may be configured to, in response to the first result according to the predicted valley voltage being smaller than the preset threshold, take the predicted valley voltage as the target valley voltage.

In some implementations, the peripheral circuit may be configured to read the stored data of the at least one code word under the first read voltage to obtain a second result. In some implementations, the peripheral circuit may be configured to read the stored data of the at least one code word under the second read voltage to obtain a third result. In some implementations, the peripheral circuit may be configured to perform a logical operation on the second result and the third result to obtain a fourth result. In some implementations, the peripheral circuit may be configured to count, in the fourth result, the number of bits which represent flip of bits in the third result relative to the second result to obtain the first result.

In some implementations, the peripheral circuit may include a first latch configured to store the second result. In some implementations, the peripheral circuit may include a second latch configured to store the third result. In some implementations, the peripheral circuit may include a third latch configured to store the fourth result.

According to another aspect of the present disclosure, a memory system is provided. The memory system may include one or more memory devices. Each of the one or more memory devices may include a memory cell array including a plurality of memory cells. A preset number of the memory cells may form a code word. Each of the one or more memory devices may include a peripheral circuit coupled to the memory cell array. The peripheral circuit may be configured to obtain M first results corresponding to at least one code word under M reference read voltages. A first result of the M first results may include a number of bits which represents the number of flipped bits of the at least one code word in two read results under a first read voltage and a second read voltage. A difference between the first read voltage and the second read voltage may be smaller than a preset voltage and M may be an integer larger than or equal to 2. The peripheral circuit may be configured to obtain a predicted valley voltage according to the M first results and the M reference read voltages in combination with a preset function model. The preset function model may represent a relationship between the first results and the reference read voltages and the M first results may all be within a first preset interval. The peripheral circuit may be configured to, based on the predicted valley voltage, determine a target valley voltage and the target valley voltage is configured as a read voltage used when a read operation is performed on the at least one code word. The memory system may include a memory controller coupled to and control the memory device.

In some implementations, the memory controller may be configured to send a data acquiring instruction that instructs to obtain a target valley voltage. In some implementations, the memory device may be configured to receive the data acquiring instruction, obtain the target valley voltage, and send information including the target valley voltage to the memory controller. In some implementations, the memory controller may be further configured to perform a read operation on the data stored in the memory device according to the target valley voltage in the information.

In some implementations, the memory controller may be further configured to perform an error correction code decoding operation on the read result of the read operation.

According to yet another aspect of the present disclosure, a memory controller is provided. The memory controller may include a control component. The control component may be configured to obtain M first results of at least one code word under M reference read voltages. The first result may include a number of bits which represents the number of flipped bits of the at least one code word in two read results under a first read voltage and a second read voltage. A difference between the first read voltage and the second read voltage may be smaller than a preset voltage and M may be an integer larger than or equal to 2. The control component may be configured to obtain a predicted valley voltage according to the M first results and the M reference read voltages in combination with a preset function model. The preset function model may represent a relationship between the first results and the reference read voltages and the M first results may all be within a first preset interval. The control component may be configured to, based on the predicted valley voltage, determine a target valley voltage. The target valley voltage may be configured as a read voltage used when a read operation is performed on the at least one code word. The memory controller may be coupled to at least one memory device. The memory device may include a plurality of memory cells forming a memory cell array. A preset number of the memory cells may form a code word.

In some implementations, the first preset interval may represent a numerical interval of the first results corresponding to a preset region of a curve where the preset function model is located.

In some implementations, the control component may be configured to obtain the first result corresponding to the at least one code word under a target read voltage. In some implementations, the control component may be configured to, when the first result corresponding to the at least one code word under the target read voltage is within the first preset interval, take the target read voltage as one of the reference read voltages and take the first result within the first preset interval as the corresponding first result under the reference read voltage.

In some implementations, the control component may be configured to obtain a predicted parameter of the preset function model according to the M first results and the M reference read voltages in combination with the preset function model. In some implementations, the predicted parameter may be the corresponding reference read voltage when a curve where the preset function model is located has a minimum first result. In some implementations, the control component may be configured to obtain the predicted valley voltage according to the predicted parameter.

In some implementations, the preset function model may include a quadratic function model including the following functional relation formula: $y=a(x+b)^2+c$, where y is the first result, x is the reference read voltage, b represents the predicted parameter, a is a first parameter, and c is a second parameter.

In some implementations, the first preset interval may represent a range between a first threshold and a second threshold in a curve where the quadratic function model is located. In some implementations, the first threshold may be larger than the second threshold.

In some implementations, the first parameter and the second parameter may both be constants. In some implementations, the control component may be configured to obtain the first result corresponding to the at least one code word under a target read voltage. In some implementations, the control component may be configured to, in response to the first result corresponding to the at least one code word under the target read voltage being within the preset interval, take the target read voltage as one of the reference read voltages. In some implementations, the control component may be configured to, in response to the first result corresponding to the at least one code word under the target read voltage being outside the first preset interval, obtain at least one new target read voltages again and obtain the corresponding first results under the at least one new target read voltages until the corresponding first result under the newest target read voltage falls within the first preset interval.

In some implementations, at least two of the M reference read voltages may be located on two sides of an axis of symmetry of the curve where the quadratic function model is located. In some implementations, the control component may be configured to, when obtaining the reference read voltages, obtain the reference read voltages on a first side of the two sides of the axis of symmetry of the curve where the quadratic function model is located. In some implementations, the control component may be configured to determine the reference read voltages on a second side of the two side of the axis of symmetry according to the reference read voltages on the first side.

In some implementations, the control component may be configured to, in response to the first result corresponding to the at least one code word under the target read voltage being outside the first preset interval based on the target read voltage, the corresponding first result under the target read voltage, a target first result, and a first mapping function, obtain a fitted read voltage on the first side corresponding to the target first result. In some implementations, the first mapping function may be obtained according to the quadratic function model, the first parameter, and the second parameter. In some implementations, the target first result may be within a second preset interval and the first preset interval may be within the range of the second preset interval. In some implementations, the control component may be configured to obtain the first result corresponding to the at least one code word under the fitted read voltage on the first side. In some implementations, the control component may be configured to, in response to the corresponding first result under the fitted read voltage on the first side being within the first preset interval, take the fitted read voltage on the first side as one of the reference read voltages on the first side. In some implementations, the control component may be configured to, in response to the corresponding first result under the fitted read voltage on the first side being outside the first preset interval based on the previous fitted read voltage on the first side, the corresponding first result under the previous fitted read voltage on the first side, the target first result, and the first mapping function, obtain a next fitted read voltage on the first side corresponding to the target first result until the corresponding first result under the newest fitted read voltage on the first side is within the first preset interval and take the newest fitted read voltage on the first side as one of the reference read voltages on the first side.

In some implementations, the control component may be configured to, in response to the number of times the corresponding first result under the newest fitted read voltage on the first side is outside the first preset interval being larger than or equal to a preset number of times, adjust a value of the first parameter and adjust the first mapping function correspondingly. In some implementations, the control component may be configured to, based on the previous fitted read voltage on the first side, the corresponding first result under the previous fitted read voltage on the first side, the target first result, and the adjusted first mapping function, obtain the next adjusted fitted read voltage on the first side corresponding to the target first result until the corresponding first result under the newest adjusted fitted read voltage on the first side is within the first preset interval.

In some implementations, the control component may be configured to, based on one of the reference read voltages on the first side, the corresponding first result under one of the reference read voltages on the first side, the target first result and a second mapping function, obtain a fitted read voltage on the second side corresponding to the target first result. In some implementations, the second mapping function may be obtained according to the quadratic function model, one or more of the first parameter or the adjusted first parameter, and the second parameter. In some implementations, the control component may be configured to obtain the first result corresponding to the at least one code word under the fitted read voltage on the second side. In some implementations, the control component may be configured to, in response to the corresponding first result under the fitted read voltage on the second side being within the first preset interval, take the fitted read voltage on the second side as one of the reference read voltages on the second side.

In some implementations, the control component may be configured to, in response to the corresponding first result under the fitted read voltage on the second side being outside the preset interval, based on the previous fitted read voltage on the second side, the corresponding first result under the previous fitted read voltage on the second side, the target first result and a third mapping function, obtain a next fitted read voltage on the second side corresponding to the target first result until the corresponding first result under the newest fitted read voltage on the second side is within the first preset interval, and take the newest fitted read voltage on the second side as one of the reference read voltages on the second side. In some implementations, the third mapping function may be obtained according to the quadratic function model, one or more of the first parameter or the adjusted first parameter, and the second parameter.

In some implementations, the first parameter may be a variable, and the second parameter may be a constant. In some implementations, the control component may be configured to, according to the M first results and the M reference read voltages in combination with the quadratic function model, obtain the predicted parameter. In some implementations, the control component may be configured to take the predicted parameter as the predicted valley voltage.

In some implementations, the first parameter and the second parameter may both be variables. In some implementations, the control component may be configured to obtain the predicted parameter according to the M first results and the M reference read voltages in combination with the quadratic function model. In some implementations, the control component may be configured to take the predicted parameter as a target read voltage and obtain the first result of corresponding to the at least one code word under the target read voltage which is the predicted parameter. In some implementations, the control component may be configured to obtain a new predicted parameter according to the M first results, the M reference read voltages, the predicted parameter and the corresponding first result under the target read voltage which is the predicted parameter in combination with the quadratic function model. In some implementations, the control component may be configured to take the new predicted parameter as the predicted valley voltage.

In some implementations, the memory cell array may include memory cells each having a plurality of memory bits. In some implementations, the plurality of memory bits may correspond to a plurality of pages respectively, and at least one of the pages may correspond to a plurality of stages. In some implementations, the control component may be configured to, after determining the target valley voltage of the at least one code word for a target stage, determine the target valley voltages for the other stages than the target stage among the plurality of stages respectively.

In some implementations, the plurality of stages may include a first stage and a second stage. In some implementations, the read voltage for the second stage may be smaller than that for the first stage. In some implementations, the control component may be configured to, when the determined target valley voltage corresponds to the first stage, according to the target valley voltage determined for the first stage, obtain at least one of a predicted valley voltage for the second stage or predicted valley voltages for the remaining first stages with lower read voltages among the plurality of stages.

In some implementations the control component may be configured to, according to the first result corresponding to the at least one code word under a target read voltage, obtain a preset threshold. Ins some implementations, the preset threshold may be configured to represent a first result corresponding to the maximum in an effective range of the predicted valley voltages. In some implementations the control component may be configured to, in response to the first result according to the predicted valley voltage being smaller than the preset threshold, take the predicted valley voltage as the target valley voltage.

According to yet a further aspect of the present disclosure, a method of operating a memory device is provided. The method may include obtaining M first results corresponding to at least one code word under M reference read voltages. A first result of the M first results may include a number of bits which represents the number of flipped bits of the at least one code word in two read results under a first read voltage and a second read voltage. A difference between the first read voltage and the second read voltage may be smaller than a preset voltage, and M may be an integer larger than or equal to 2. The method may include obtaining a predicted valley voltage according to the M first results and the M reference read voltages in combination with a quadratic function model. The preset function model may represent a relationship between the first results and the reference read voltages and the M first results may all be within a first preset interval. The method may include, based on the predicted valley voltage, determining a target valley voltage and the target valley voltage is configured as a read voltage used when a read operation is performed on the at least one code word. The memory device may include a plurality of memory cells. A preset number of the memory cells may form a code word.

In some implementations, the first preset interval may represent a numerical interval of the first result corresponding to a preset region of a curve where the preset function model is located.

In some implementations, the method may include obtaining the first result corresponding to the at least one code word under a target read voltage. In some implementations, the method may include, in response to the first result corresponding to the at least one code word under the target read voltage being within the first preset interval, taking the target read voltage as one of the reference read voltages and taking the first result within the first preset interval as the first result under the reference read voltage.

In some implementations, the method may include obtaining a predicted parameter of the preset function model according to the M first results and the M reference read voltages in combination with the preset function model. In some implementations, the predicted parameter may be the corresponding reference read voltage when a curve where the preset function model is located has the minimum first result. In some implementations, the method may include obtaining the predicted valley voltage according to the predicted parameter.

In some implementations, the preset function model may include a quadratic function model including the following functional relation formula: $y=a(x+b)^2+c$, where y is the first result, x is the reference read voltage, b represents the predicted parameter, a is a first parameter, and c is a second parameter.

In some implementations, the first preset interval may represent a range between a first threshold and a second threshold in a curve where the quadratic function model is located, and the first threshold may be larger than the second threshold.

According to still a further aspect of the present disclosure, a non-transitory computer-readable medium storing instructions is provided. The instructions, which when executed by a processor of a memory device, may cause the processor of the memory device to obtain M first results corresponding to at least one code word under M reference read voltages. A first result of the M first results may include a number of bits which represents the number of flipped bits of the at least one code word in two read results under a first read voltage and a second read voltage. A difference between the first read voltage. The second read voltage may be smaller than a preset voltage and M may be an integer larger than or equal to 2. The instructions, which when executed by a processor of a memory device, may cause the processor of the memory device to obtain a predicted valley voltage according to the M first results and the M reference read voltages in combination with a quadratic function model. The preset function model represents a relationship between the first results and the reference read voltages and the M first results may all be within a first preset interval. The instructions, which when executed by a processor of a memory device, may cause the processor of the memory device to, based on the predicted valley voltage, determining a target valley voltage and the target valley voltage is configured as a read voltage used when a read operation is performed on the at least one code word. The memory device may include a plurality of memory cells. A preset number of the memory cells may form a code word.

BRIEF DESCRIPTION OF DRAWINGS

In the figures, the same reference numerals indicate the same or like components or elements throughout a plurality of figures, unless otherwise indicated. The figures are not necessarily drawn to scale. It should be understood that the figures only depict some implementations disclosed in accordance with the present disclosure and should not be considered as limitation on the scope of the present disclosure.

DETAILED DESCRIPTION

Figure 1:
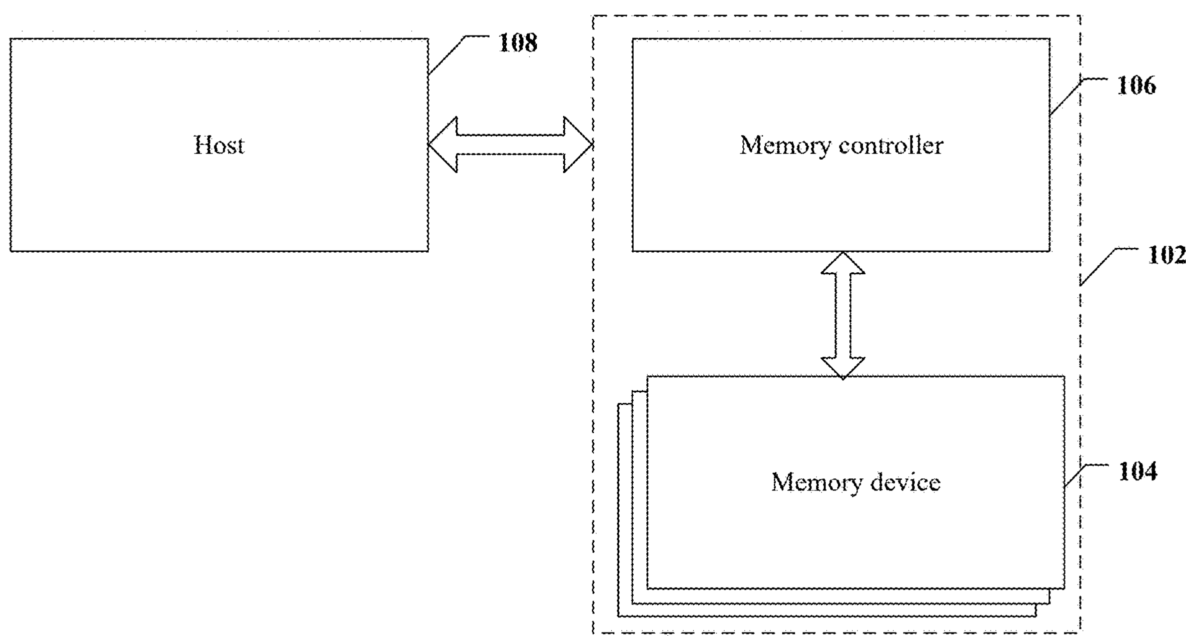
FIG. 1 is a schematic diagram of an example system having a memory system in an example of the present disclosure.

Hereinafter, example implementations disclosed by the present disclosure will be described in more detail with reference to accompanying drawings. Although example implementations of the present disclosure are illustrated in accompanying drawings, it should be understood that the present disclosure can be embodied in various forms and is not limited to specific implementations described herein. On the contrary, the implementations are provided for more thorough understanding of the present disclosure and to convey the scope the present disclosure fully to those skilled in the art.

In the description hereafter, many specific details are provided to facilitate more thorough understanding of the present disclosure. However, it is apparent for those skilled in the art that the present disclosure can be implemented without one or more of these details. In other examples, in order not to obscure the present disclosure, some technical features well known in the art will not be described. That is to say, not all features of practical examples will be described herein, and well-known functions and structures will not be described in detail.

Moreover, the accompanying drawings are only schematic diagrams of the present disclosure and not necessarily drawn to scale. In the drawings, the same reference numerals represent the same or similar parts and redundant descriptions of them will therefore be omitted. Some block diagrams shown in the drawings are only functional entities which do not necessarily correspond to logically or physically separate entities. The functional entities can be implemented in a software form, or in one or more hardware modules or integrated circuits, or in different network and/or processor devices and/or micro-controller devices.

The flow charts in the figures are only for illustration, and not all steps must be included. For example, some steps may be decomposed, and some steps may be combined or partially combined, so that the practical performing sequence may be changed in accordance with actual conditions.

Terminology is used herein only for description of specific examples and in no way for limiting the present disclosure. As used herein, the terms “a”, “an” and “the” in singular forms are also intended to cover plural forms, unless the context clearly indicates otherwise. It is also be appreciated that terms “comprise”, “comprising”, “include” and/or “including”, as used in the specification, indicate the presence of the mentioned features, integers, steps, operations, elements and/or components, but do not exclude the presence of one or more other features, integers, steps, operations, elements, components and/or combinations thereof. As used herein, the term “and/or” includes any and all combinations of relevant listed items.

The memory device in examples of the present disclosure includes, but not limited to, a 3D NAND memory and description is given by taking the 3D NAND memory as an example for case of understanding.

FIG. 1 is a block diagram of an example system 100 having a memory device in accordance with some aspects of the present disclosure. The system 100 may be a mobile phone, a desktop computer, a laptop computer, a tablet computer, a vehicle computer, a game console, a printer, a positioning apparatus, a wearable electronic apparatus, a smart sensor, a virtual reality (VR) apparatus, an augmented reality (AR) apparatus and any other suitable electronic apparatus having a storage therein. As shown in FIG. 1, the system 100 may include a host 108 and a memory system 102 that includes one or more memory devices 104 and a memory controller 106. The host 108 may be a processor of an electronic apparatus, such as a central processing unit (CPU), or a system-on-chip (SOC) such as an application processor (AP). The host 108 may be configured to send data to the memory device 104 or receive data from the memory device 104.

According to some implementations, the memory controller 106 is coupled to the memory device 104 and the host 108 and is configured to control the memory device 104. The memory controller 106 can manage the data stored in the memory device 104 and communicate with the host 108. In some implementations, the memory controller 106 is designed to operate in a low duty-cycle environment like a secure digital (SD) card, a compact flash (CF) card, a universal serial bus (USB) flash drive or any other medium for use in an electronic device such as a personal computer, a digital camera, a mobile phone, etc.

In some implementations, the memory controller 106 is designed to operate in a high duty-cycle environment solid state disk (SSD) or an embedded multi-media-card (eMMC), used as a data storage for a mobile device such as a smart phone, a tablet computer or a laptop computer and an enterprise storage array.

The memory controller 106 can be configured to control operations of the memory device 104, such as read, erase, and program operations. The memory controller 106 can also be configured to manage various functions with respect to the data stored or to be stored in the memory device 104, including at least one of bad-block management, garbage collection, logical-to-physical address conversion and wear leveling. In some implementations, memory controller 106 is further configured to process error correction codes (ECCs) with respect to the data read from or written to the memory device 104.

Any other suitable functions may be performed by the memory controller 106 as well, for example, formatting the memory device 104. The memory controller 106 can communicate with an external device (e.g., the host 108) according to a particular communication protocol. For example, the memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

The memory controller 106 and one or more memory devices 104 can be integrated into various types of storage apparatuses, for example, be included in the same package, such as a universal Flash storage (UFS) package or an eMMC package. That is, the memory system 102 can be implemented and packaged into different types of end electronic products.

Figure 2A:
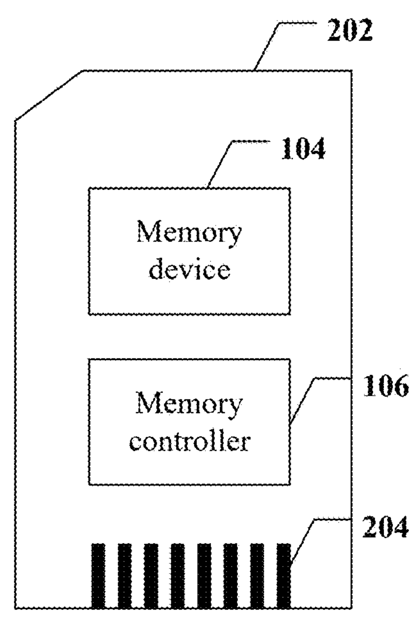
FIG. 2A is a schematic diagram of an example memory card having a memory system in an example of the present disclosure.

In one example as shown in FIG. 2A, the memory controller 106 and a single memory device 104 can be integrated into a memory card 202. The memory card 202 may include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 202 may further include a memory card connector 204 coupling the memory card 202 with a host (e.g., the host 108 in FIG. 1).

Figure 2B:
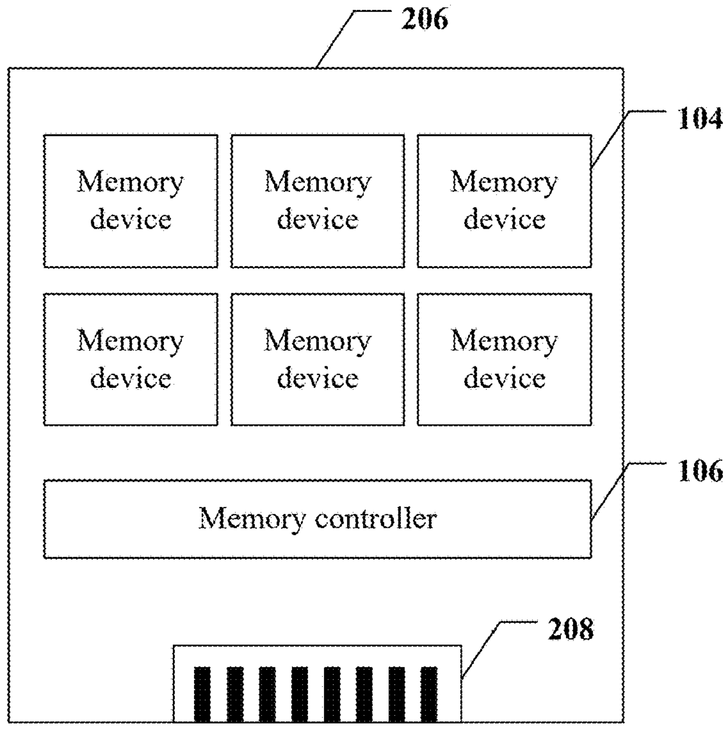
FIG. 2B is a schematic diagram of an example solid state driver having a memory system in an example of the present disclosure.

In another example as shown in FIG. 2B, the controller 106 and multiple memory devices 104 can be integrated into an SSD 206. The SSD 206 may further include an SSD connector 208 coupling the SSD 206 with a host (e.g., the host 108 in FIG. 1). In some implementations, the storage capacity and/or the operation speed of the SSD 206 are higher than those of the memory card 202.

In some examples, each memory block may couple a plurality of word lines and the plurality of memory cells coupled by each word line constitute a physical page.

Figure 3:
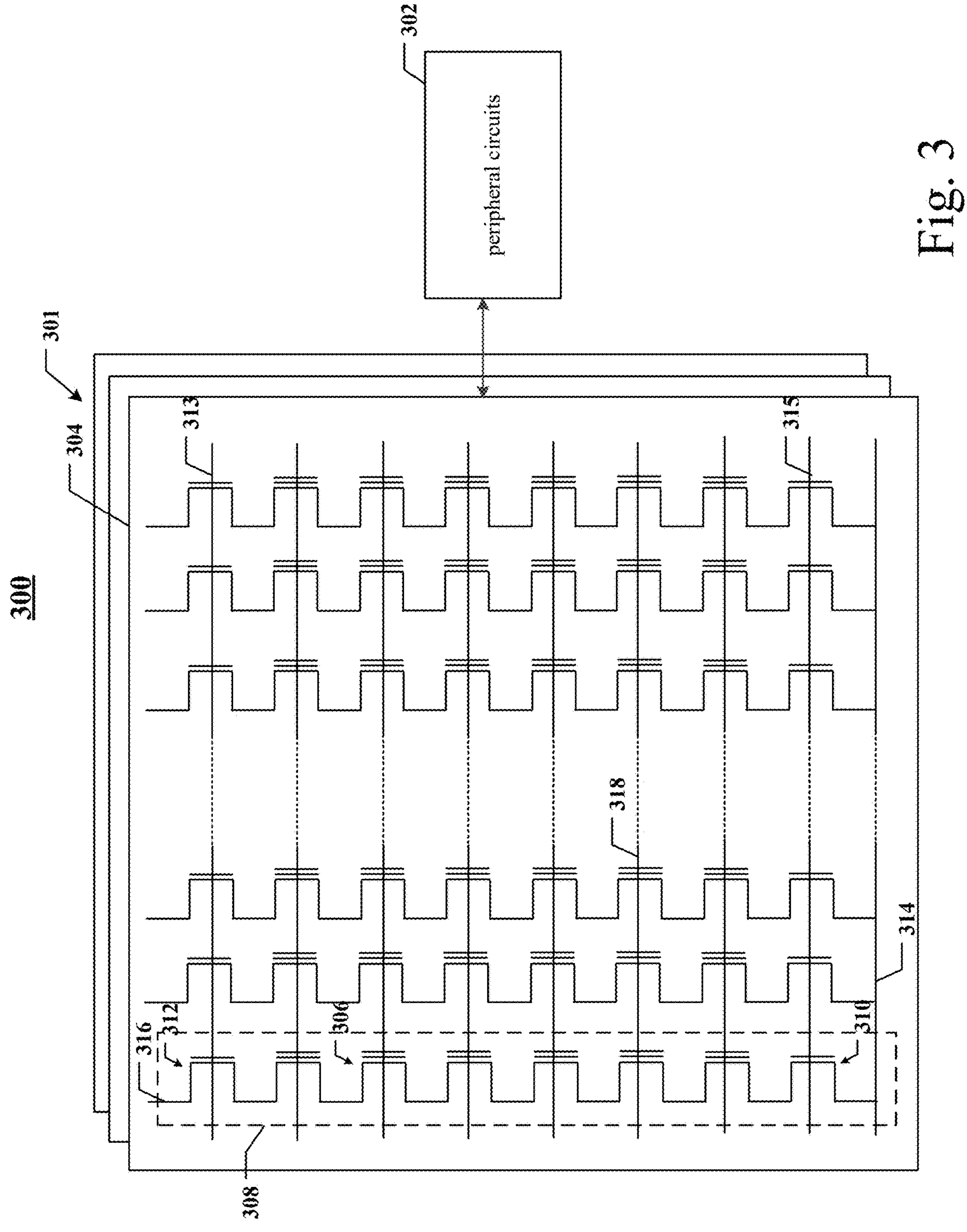
FIG. 3 is a schematic diagram of an example memory including peripheral circuit in an example of the present disclosure.

FIG. 3 shows a schematic circuit diagram of an example memory device 300 including a peripheral circuit in accordance with some aspects of the present disclosure. The memory device 300 may be an example of the memory device 104 in FIG. 1. The memory device 300 may include a memory cell array 301 and a peripheral circuit 302 coupled to the memory cell array 301. Description will be given by taking an example in which the memory cell array 301 is a 3D NAND memory cell array, where the memory cells 306 are NAND memory cells and provided in the form of an array of memory strings 308 and each memory string 308 extends vertically above a substrate (not shown). In some implementations, each memory string 308 includes a plurality of memory cells 306 coupled in series and stacked vertically. Each memory cell 306 can retain a continuous analog value, for example, a voltage or charge, depending on the number of electrons trapped in the region of the memory cell 306. Each memory cell 306 may be a memory cell of a floating-gate type that includes a floating-gate transistor, or a memory cell of a charge trapping type that includes a charge trapping transistor.

In some implementations, each memory cell 306 is a single-level cell (SLC) that has two possible memory states and can therefore store one bit of data. For example, the first memory state “0” may correspond to a first range of voltages, and the second memory state “1” may correspond to a second range of voltages. In some implementations, each memory cell 306 is a multi-level cell (MLC) that is capable of storing more than a single bit of data in more than four memory states. For example, the MLC can store two bits per cell (also known as a double-level cell), three bits per cell (also known as a trinary-level cell (TLC)), four bits per cell (also known as a quad-level cell (QLC)), five bits per cell (also known as a penta-level cell (PLC)) or more than five bit per cell. Each MLC may be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

It is to be noted that the memory state mentioned here means memory status of a memory cell in the present disclosure. Different memory cells have different numbers of memory status. For example, an SLC memory cell has two memory status (e.g., two memory states) including one programmed state and one erased state. For another example, an MLC memory cell has 4 memory status including one erased state and three programmed states. For yet another example, a TLC memory cell has 8 memory status including one erased state and seven programmed states. In some other implementations, a QLC memory cell has 16 memory status including one erased state and fifteen programmed states.

As shown in FIG. 3, each memory string 308 may include a lower select transistor (BSG) 310 at its source end (also referred to as a source side select transistor) and an upper select transistor (TSG) 312 at its drain end (also referred to as a drain side select transistor). The BSG 310 and TSG 312 may be configured to activate selected memory string 308 during reading and programming operations. In some implementations, sources of the memory strings 308 in the same memory block 304 are coupled together through the same source line (SL) 314 (e.g., a common SL). In other words, in accordance with some implementations, all the memory strings 308 in the same memory block 304 have an array common source (ACS). In some other implementations, the TSG 312 of each memory string 308 is coupled to a corresponding bit line (BL) 316 and can read data from or write data to the bit line 316 through an output bus (not shown). In some implementations, each memory string 308 is configured to be selected or deselected by applying a select voltage (e.g., a voltage higher than the threshold voltage of the transistor having the TSG 312) or a deselect voltage (e.g., 0V) to the corresponding TSG 312 through one or more TSG lines 313 and/or applying a select voltage (e.g., a voltage higher than the threshold voltage of the transistor having the BSG 310) or a deselect voltage (e.g., 0V) to the corresponding BSG 310 through one or more BSG lines 315.

As shown in FIG. 3, the memory strings 308 can be organized into a plurality of memory blocks 304, each of which may have a common source line 314 (e.g., coupled to the ground). In some implementations, each memory block 304 is a basic data unit used for an erase operation. That is, all the memory cells 306 in the same memory block 304 can be erased simultaneously. In order to erase the memory cells 306 in a selected memory block 304, an erase voltage (Vers), for example, a high positive voltage (e.g., 20V or higher) is used to bias the source line 314 coupled to the selected memory block 304 and unselected memory block 304 in the same plane as the selected memory block 304. It is understood that, in some examples, an erase operation may be performed at a half-memory block level, a quarter-memory block level, or a level having any suitable number of memory blocks or any suitable fraction of the memory block. Memory cells 306 of adjacent memory strings 308 can be coupled through word lines 318 that select which row of memory cells 306 are affected by read and program operations.

Referring to FIG. 3, each memory cell 306 of a plurality memory cells is coupled to a corresponding word line 318 and each memory string 308 is coupled to a corresponding bit line 316 through a corresponding select transistor (e.g., an upper select transistor (TSG) 312).

Figure 4:
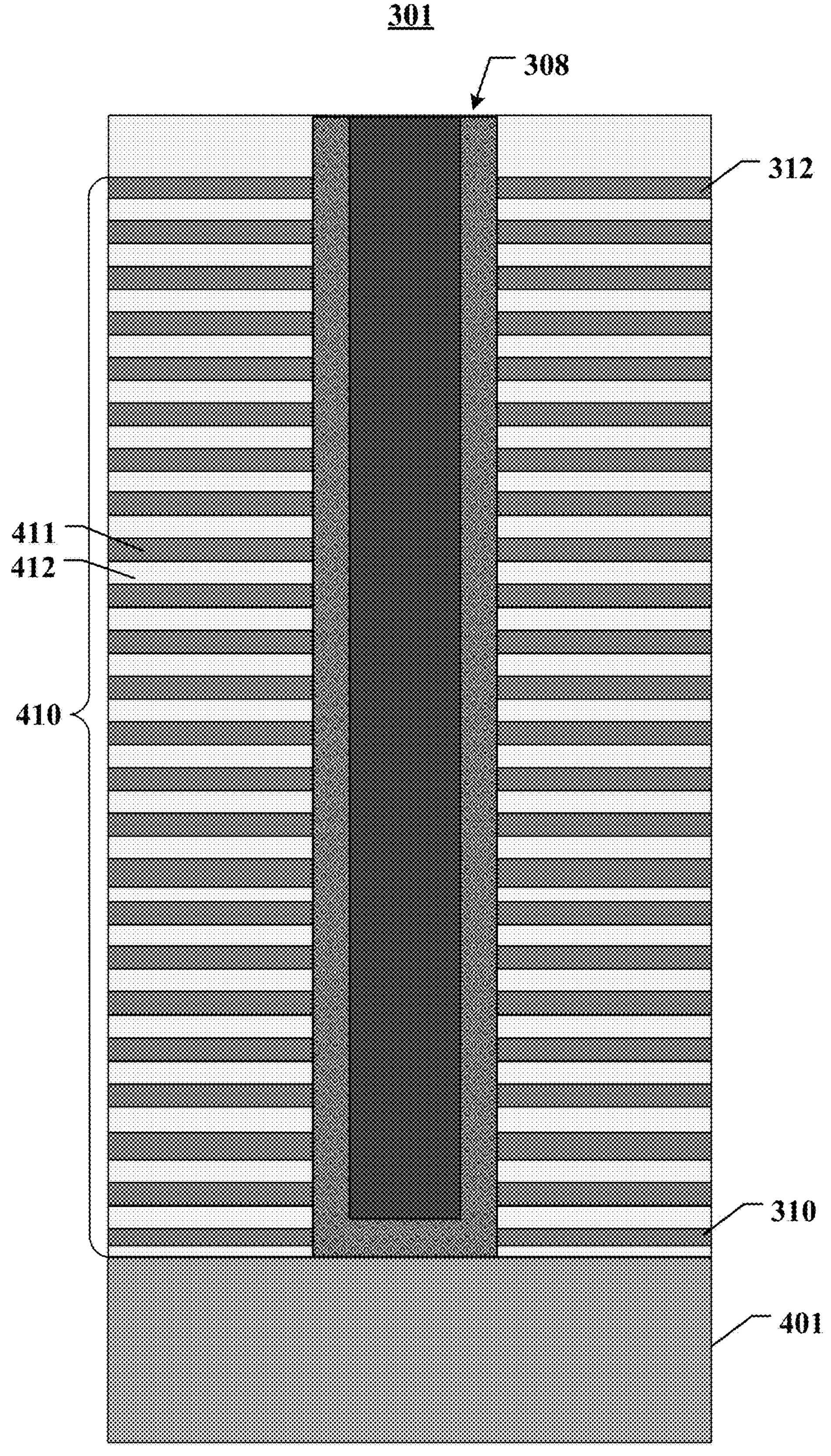
FIG. 4 is a cross-sectional diagram of a memory cell array including NAND memory strings in an example of the present disclosure.

FIG. 4 is a cross-sectional diagram of an example memory cell array 301 including memory strings 308 taking NAND as an example in accordance with some aspects of the present disclosure. As shown in FIG. 4, the NAND memory cell array 301 may include a stack structure 410, which includes a plurality of gate layers 411 and a plurality of insulating layers 412 stacked in turn alternately, and channel structures extending vertically through the gate layers 411 and insulating layers 412. Here, the channel structure is coupled to each gate layer to constitute a memory cell and coupled to a plurality of gate layers in the stack structure 410 to constitute a memory string 308. The gate layers 411 and the insulating layers 412 may be stacked alternately and two adjacent gate layers 411 are isolated from each other by an insulating layer 412.

The material of the gate layer 411 may include a conductive material. The conductive material may include, but is not limited to, tungsten (W), cobalt (Co), copper (Cu), aluminum (Al), polysilicon, doped silicon, silicide or any combination thereof. In some implementations, each gate layer 411 includes a metal layer, for example, a tungsten layer. In some implementations, each gate layer 411 includes a doped polysilicon layer. Each gate layer 411 may include a control gate surrounding the memory cell. The gate layer 411 on the top of the stack structure 410 may extend laterally as an upper select gate line and the gate layer 411 at the bottom of the stack structure 410 may extend laterally as a lower select gate line. Those gate layers 411 that extend laterally between the upper select gate line and the lower select gate line may serve as word line layers.

In some examples, the stack structure 410 may be disposed on a substrate 401. The substrate 401 may include silicon (e.g. single crystal silicon), silicon germanium (SiGe), gallium arsenide (GaAs), germanium (Ge), silicon on insulator (SOI), germanium on insulator (GOI) or any other suitable material.

In some examples, the memory string 308 includes a channel structure extending vertically through the stack structure 410. In some implementations, the channel structure includes a channel hole filled with one or more semiconductor materials (e.g., as a semiconductor channel) and one or more dielectric materials (e.g., as a memory film). In some implementations, the semiconductor channel includes silicon, for example, polysilicon. In some implementations, the memory film is a composite dielectric layer including a tunneling layer, a storage layer (also referred to as a "charge trapping/storage layer") and a blocking layer. The channel structure may have a cylinder shape (e.g., a pillar shape). In accordance with some implementations, the semiconductor channel, the tunneling layer, the storage layer and the blocking layer are arranged radially from the center to the outer surface of the pillar in this order. The tunneling layer may include silicon oxide, silicon oxynitride or any combination thereof. The storage layer may include silicon nitride, silicon oxynitride or any combination thereof. The blocking layer may include silicon oxide, silicon oxynitride, a high-k dielectric or any combination thereof. In one example, the memory film may include a composite layer of silicon oxide/silicon oxynitride/silicon oxide (ONO).

Figure 5:
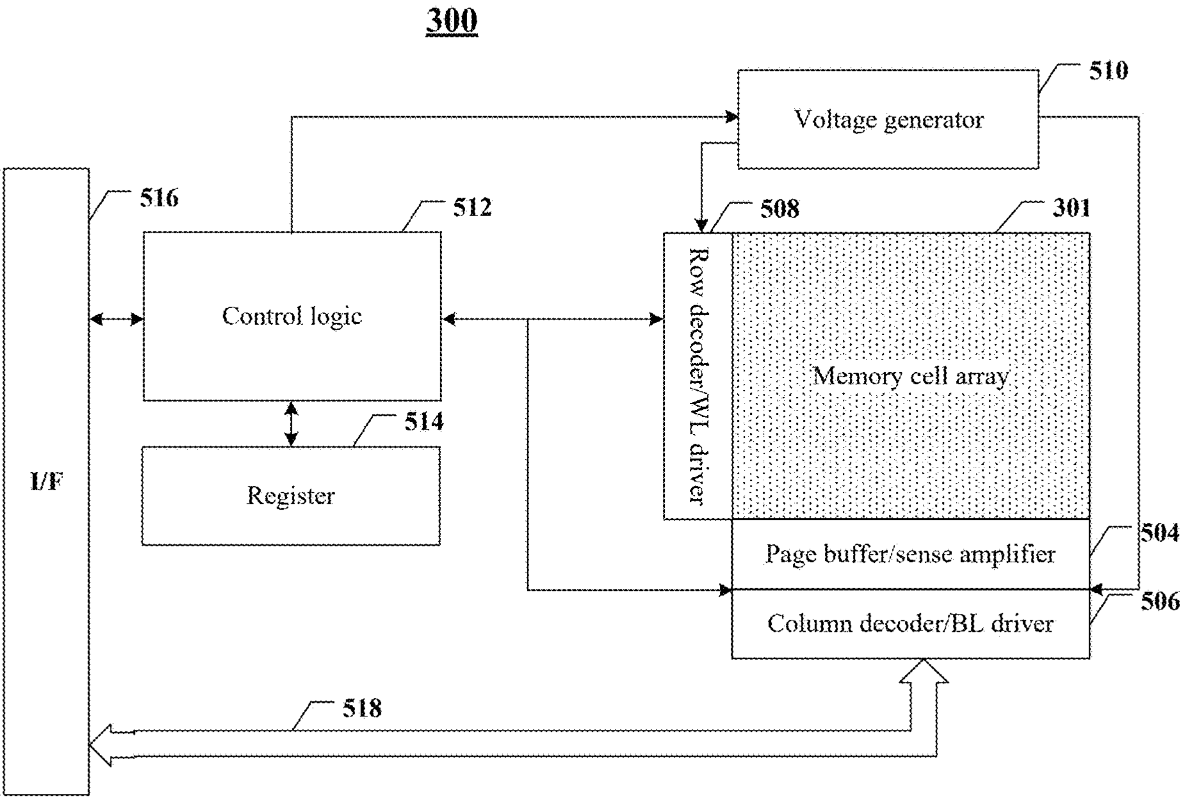
FIG. 5 is a schematic diagram of an example memory device including a memory cell array and a peripheral circuit in an example of the present disclosure.

Referring back to FIG. 3, the peripheral circuit 302 may be coupled to the memory cell array 301 through bit lines 316, world lines 318, source lines 314, BSG lines 315 and TSG lines 313. The peripheral circuit 302 may include any suitable analog, digital, and mixed-signal circuits to facilitate operations of the memory cell array 301 by applying voltage signals and/or current signals to and sensing voltage signals and/or current signals from each target memory cell 306 through bit lines 316, word lines 318, source lines 314, BSG lines 315 and TSG lines 313. The peripheral circuit 302 may include various types of peripheral circuit formed using the metal-oxide-semiconductor (MOS) technology. For example, FIG. 5 illustrates some example peripheral circuit and the peripheral circuit includes a page buffer/sense amplifier 504, a column decoder/bit line driver 506, a row decoder/word line driver 508, a voltage generator 510, a control logic 512, a register 514, an interface 516, and a data bus 518. It should be understood that, in some examples, additional peripheral circuit not shown in FIG. 5 may be further included.

The page buffer/sense amplifier 504 may be configured to read and program (write) data from/to the memory cell array 301 according to control signals from the control logic 512. In one example, the page buffer/sense amplifier 504 may store programming data (writing data) to be programmed into the memory cell array 301. In another example, the page buffer/sense amplifier 504 may perform a program verify operation to ensure that the data have been properly programmed into the memory cell 306 coupled to the selected word line 318. In still another example, the page buffer/sense amplifier 504 may also sense a low power signal from the bit line 316 that represent data bits stored in the memory cell 306 and amplify the small voltage swing to a recognizable logic level in a read operation. The column decoder/bit line driver 506 can be configured to be controlled by the control logic 512 and select one or more memory strings 308 by applying the bit line voltages generated from the voltage generator 510.

The row decoder/word line driver 508 can be configured to be controlled by the control logic 512 and select/deselect the memory block 304 of the memory cell array 301 and select/deselect the word line 318 of the memory block 304. The row decoder/word line driver 508 can be further configured to drive the word line 318 using the word line voltages generated from the voltage generator 510. In some implementations, the row decoder/word line driver 508 can also select/deselect and drive the BSG lines 315 and the TSG lines 313. As described below in detail, the row decoder/word line driver 508 is configured to perform program operations on the memory cells 306 coupled to one or more selected word lines 318. The voltage generator 510 can be configured to be controlled by the control logic 512 and generate the word line voltages (e.g., a read voltage, a program voltage, a pass voltage, a channel boost voltage, a verification voltage, etc.), bit line voltages, and source line voltages to be supplied to memory cell array 301.

The control logic 512 may be coupled to each of the other parts of the peripheral circuit described above and configured to control its operations. The register 514 may be coupled to the control logic 512 and include a status register, a command register and an address register for storing status information, command operation codes (OP codes) and command addresses for controlling operations of each peripheral circuit. The interface 516 may be coupled to the control logic 512 and serve as a control buffer to buffer control commands received from the host (not shown) and relay them to the control logic 512, and buffer status information received from the control logic 512 and relay them to the host. The interface 516 may be further coupled to the column decoder/bit line driver 506 through the data bus 518 and serve as a data I/O interface and a data buffer to buffer data and relay it to the memory cell array 301 or relay or buffer data from the memory cell array 301.

The basic principle of a 3D NAND memory is a process of writing data through implanting a charge into a memory cell by carriers (electrons or holes) crossing the charge barrier and then the stored data may be read according to the threshold voltage when the memory cell is turned on. Therefore, in order to read the correct data, an error correcting algorithm having a high error correcting capability and a high efficiency is usually introduced during data reading.

However, as the usage time increases, the charge stored in a memory cell will be changed with the increased usage time, the repeated read operations, cross temperatures or the like, thus affecting the accuracy of data reading. When the threshold voltage has a relatively obvious upward or downward shift, the possibility for occurring reading errors is very high if the original read voltage is used to read data from the memory cell, and when the number of reading errors exceeds the error correcting capability, a read fail to the data the memory cell may be resulted in.

Figure 6:
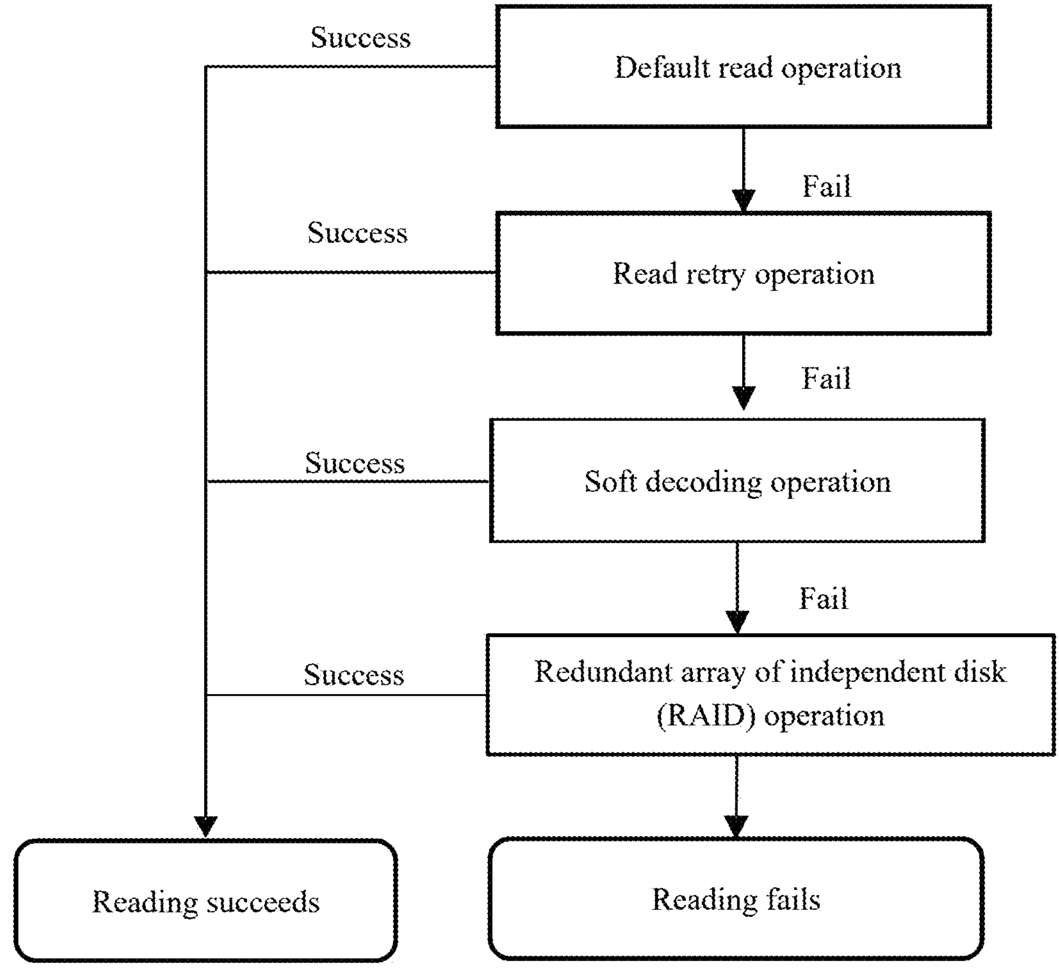
FIG. 6 is a schematic diagram of a flow chart of an example read operation of a memory system provided by the present disclosure.

FIG. 6 illustrates a flow chart of example read operations of a memory system. In combination with FIG. 6, when the memory controller controls the memory device to perform a read operation, a FW default read operation is first performed on the memory cell corresponding to a physical address; if the FW default read operation fails, a read retry operation is performed; if the read retry operation fails, a soft decode operation is performed; if the soft decode operation fails, a redundant array of independent disk (RAID) operation is performed; if the RAID operation fails, the read operation stops and a read fail may occur due to incapability of error correcting, and the memory controller sends a read fail signal to the host 108. The read retry operation and the FW default read operation may be applied in hard decoding.

In some implementations, the read retry operation may be performed by checking a retry table provided by the manufacturer. The nature of the read retry operation is a mechanism of error correction and the retry table may provide reference voltages for reading data. By checking the retry table and trying a read voltage having an offset with respect to the normal threshold voltage to read the memory cell again, in combination with an error correction by an error correction algorithm, it has been tried to read data correctly. If the data with read errors are corrected, checking of the retry table is stopped. If the data with read errors cannot be corrected, the retry table is checked repeatedly until the whole retry table is gone through.

The way of the above-described read retry operation needs to check the retry table item by item, which will increase the number of the trial-and-error operations and consume a relatively long period of time. Moreover, the retry table provided by the manufacturer only includes reference values applicable in certain situations, while there are a great variety of usage scenarios in practice, many of which cannot be covered by the retry table provided by the manufacturer. As a result, data cannot be corrected even though the whole retry table has been gone through, wasting much time for processing commands. In summary, by performing read retry operations through repeated polling of the retry table, time is wasted, thus affecting response time of subsequent commands and in turn affecting the device performance.

Based on one or more of the problems above, in the first aspect, examples of the present disclosure provide a memory device.

Figure 7:
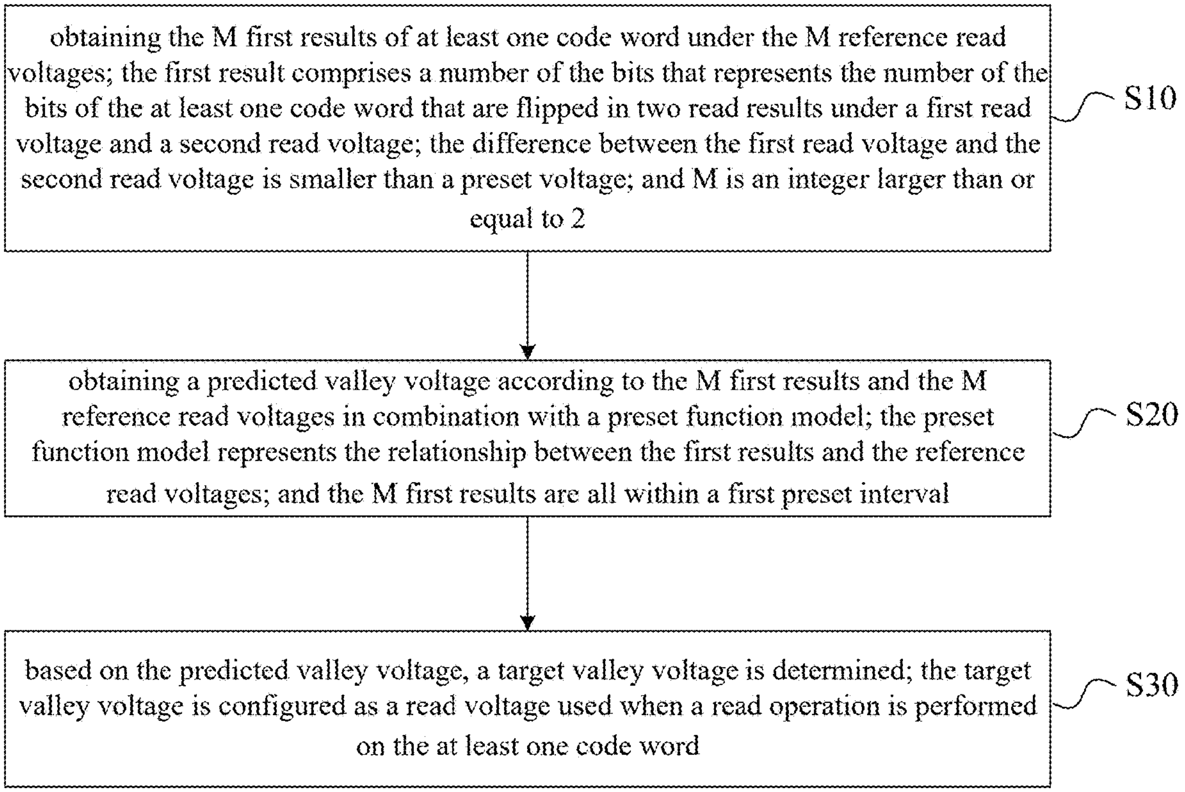
FIG. 7 is a schematic diagram of a flow chart for implementing an operation method, which a peripheral circuit in a memory device is configured to perform, provided in an example of the present disclosure.

As shown in FIG. 7, the memory device includes: a memory cell array including a plurality of memory cells, where a preset number of memory cells form a code word; and a peripheral circuit coupled to the memory cell array and configured to perform the following operations.

In operation S10, M first results of at least one code word under M reference read voltages are obtained; the first result includes a number of the bits which represents the number of flipped bits of the at least one code word in two read results under a first read voltage and a second read voltage; the difference between the first read voltage and the second read voltage is smaller than a preset voltage; and M is an integer larger than or equal to 2.

In operation S20, a predicted valley voltage is obtained according to the M first results and M reference read voltages in combination with a preset function model; the preset function model represents the relationship between the first results and the reference read voltages; and the M first results are all in a first preset interval.

In operation S30, based on the predicted valley voltage, a target valley voltage is determined; and the target valley voltage is used as the read voltage when a read operation is performed on the at least one code word.

Here, the structure of the memory device refers to FIG. 3 above, which will not be repeated here.

In some examples, the memory device includes a memory cell array including a plurality of memory blocks, each of which includes a plurality of word lines and a plurality of memory cells coupled to each of the word lines. All the memory cells coupled to a word line form a physical page. A preset number of memory cells form a code word (CW). A physical page includes one or more code words.

In some examples, the number of the memory cells included in a code word is the same as the number of the memory cells included in an encoding or decoding operation during encoding or decoding for error correction. In some examples, the number of the memory cells included in a code word may be smaller than or equal to the number of the memory cells coupled in a physical page. For example, the number of the memory cells included in a code word is ¼ of the number of the memory cells coupled in a physical page. In some examples, a code word may include memory cells with a number being in the range of $2^4$ to $2^{12}$. Illustratively, a code word may include $2^4$, $2^8$ or $2^{12}$ memory cells.

In summary, different memory systems may select code words of different sizes to satisfy their demands for performance, reliability and storage. The memory cells (e.g., an MLC, a TLC or a QLC) in different types of memory devices may store different numbers of bits. It can be understood that a code word may include a plurality memory cells and the number of memory cells included the code word may be adjusted according to practical conditions.

It is to be noted that since some additional space may be reserved in a code word for management and error correction, the number of actually required memory cells may slightly exceed the above-mentioned calculation result.

The meaning of the first results, and the manner in which the first results are obtained, will be introduced hereafter.

Here, the first result includes a number of the bits which represents the number of flipped bits, of the code word to be read, in two read results under a first read voltage and a second read voltage.

Here, the first read voltage and the second read voltage are general concepts and the difference therebetween is smaller than a preset voltage. In some examples, the second read voltage is larger than the first read voltage and the difference between the first read voltage and the second read voltage is set in the range from 5 mV to 20 mV. Illustratively, the difference between the first read voltage and the second read voltage may be 5 mV, 10 mV, 15 mV or 20 mV. In some other examples, the second read voltage is smaller than the first read voltage and the difference between the first read voltage and the second read voltage is set in the range from −5 m V to −20 mV. Illustratively, the difference between the first read voltage and the second read voltage may be −5 mV, −10 mV, −15 mV or −20 mV.

In some examples, the peripheral circuit is configured to: read the stored data of the at least one code word under a first read voltage to obtain a second result; read the stored data of the at least one code word under a second read voltage to obtain a third result; perform logical operation on the second result and the third result to obtain a fourth result; and count, in the fourth result, the number of bits which represent flip of bits in the third result relative to the second result to obtain a first result. In some examples, the peripheral circuit includes: a first latch, a second latch and a third latch; the first latch is configured to: store the second result; the second latch is configured to: store the third result; and the third latch is configured to: store the fourth result.

Here, the first read voltage and the second read voltage are associated in chronological order, that is to say, the second read voltage is obtained by a third adjustment to the first read voltage. Based on this, the voltage difference between the first read voltage and the second read voltage is a third step. In some examples, the third step is in the range from 5 mV to 20 mV and illustratively may be 5 mV, 10 mV, 15 mV or 20 mV. The preset voltage is related to the third step and may be a voltage slightly larger than the third step. In some examples, the preset voltage is set in the range from 6 mV to 21 mV and illustratively may be 6 mV, 11 mV, 16 mV or 21 mV. In some other examples, the preset voltage is set in the range from −6 mV to −21 mV and illustratively may be −6 mV, −10 mV, −16 mV or −21 mV.

As described before, both the first read voltage and the second read voltage are general concepts. The target read voltage and the read voltages obtained by first and second adjustments to the target read voltage are each referred to as the first read voltage, and the read voltage obtained by the third adjustment to the first read voltage may be referred to as the second read voltage. That is to say, the first read voltage is a general concept and can be appreciated as the target read voltage or the target adjusted read voltages (the voltages obtained by adjusting the target read voltage with the target steps, where the target steps may be set in the range from 20 mV to 40 mV, illustratively, the first step of the first adjustment may be 20 mV, 30 mV or 40 mV; or the target steps may be set in the range from 50 mV to 150 mV, illustratively, the second step of the second adjustment may be 50 mV, 60 mV, 70 mV, 80 mV, 100 mV, 120 mV or 150 mV).

It is to be noted that the target read voltage used for the first time (the first read voltage) may refer to a preset read voltage that can distinguish two adjacent memory states of a memory cell in a memory device during a previous read process. Here, the preset read voltage may be an empirical value, or may be a default value that is configured when the memory device leaves the factory, which is obtained through a great quantity of simulation experiments before the memory device leaves the factory.

In some examples, during the process of reading the memory device, one physical page of data is read through one read operation, and when the number of the memory cells included in a code word is smaller than the number of the memory cells coupled in a physical page, the code word is the execution unit used during the process of obtaining the first result, but in practice it is not excluded that a plurality of code words are used. That is, the first result corresponding to the at least one code word under the target read voltage may be obtained. For example, one physical page may correspond to 4 code words and respective fail bit counts (FBCs) of the 4 code words can be counted at one time through a page buffer hardware operation. Then the FBCs of the four code words are added to obtain the FBC of one physical page, which will be used in subsequent calculations. It can be understood that the first result here may be the data based on one physical page that corresponds to a plurality of code words.

In some examples, peripheral circuit is configured to: obtain the first result corresponding to at least one code word under a target read voltage; and when the first result corresponding to at least one code word under the target read voltage is in a first preset interval, take the target read voltage as one of the reference read voltages and take the corresponding first result as the first result under the reference read voltage. In some examples, the first preset interval represents a numerical interval of the first result corresponding to a preset region of the curve where the preset function model is located.

In some implementations, the preset function model may be obtained by fitting through a great quantity of experiment data before the memory device leaves the factory. The first preset interval refers to the numerical interval of the first result corresponding to the experimental data capable of reflecting the distribution of the actual valley voltages accurately during the process of fitting the preset function model. It can be understood that, during the process of determining the target valley voltage of at least one code word, the plurality of first results corresponding to the obtained at least one code word under different target read voltages have different values, the target read voltages corresponding to the first results among the plurality of first results within the first preset interval are taken as reference read voltages and the corresponding first results are taken as the first results under the reference read voltages. In other words, the data used to obtain the predicted valley voltage/target valley voltage are filtered by the first preset interval, so that the obtained predicted valley voltage/target valley voltage have higher accuracy according to the reference read voltages and the first results corresponding to the reference read voltages in combination with the preset function model.

It is to be noted that the predicted valley voltage may be used as the target valley voltage directly to perform a read operation on the data to be read as required, or may be further processed to obtain the target valley voltage. The manner in which the predicted valley voltage is obtained will be further described hereafter.

The target valley voltage is used as the read voltage when a read operation is performed on at least one code word. The manner, in which the target valley voltage is obtained in the memory device according to a limited number of reference read voltages and the M first results corresponding to the M reference read voltages within the first preset interval in combination with the preset function model, may reduce the number of loop iterations and determine the target valley voltage rapidly and accurately.

In some examples, the memory cell array includes memory cells each having P memory bits corresponding to P pages respectively and the P-bit stored data in the P-bit memory cell are read through Q levels of read voltages. Here, P and Q are all integers larger than 1 and $Q=2^P-1$.

Figure 8A:
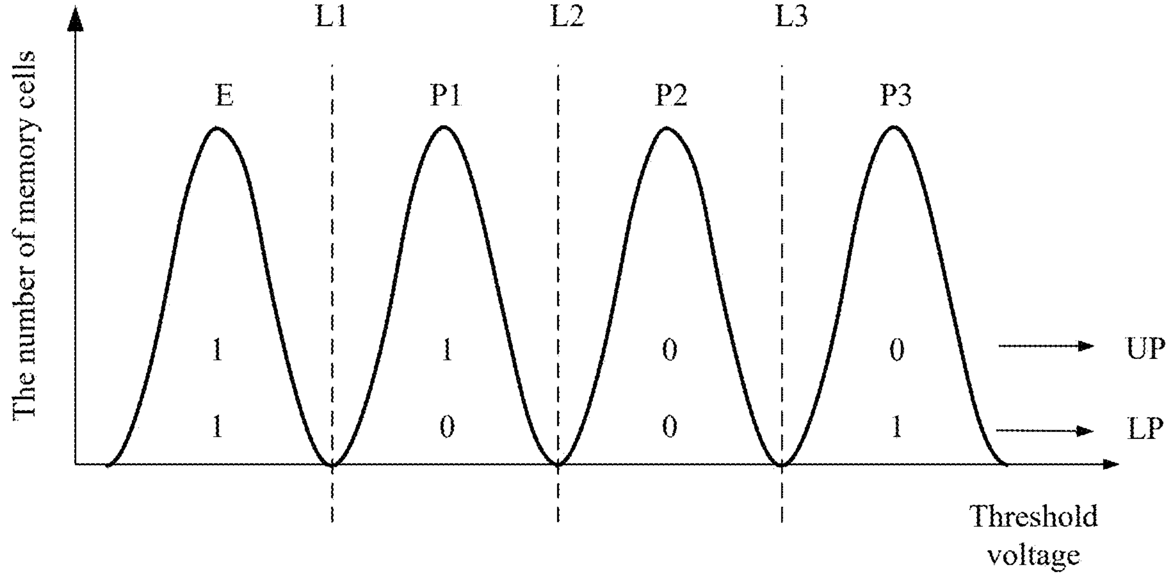
FIG. 8A is a threshold voltage distribution diagram corresponding to a memory cell including 2 memory bits provided in an example of the present disclosure.

Illustratively, when the number of bits stored in memory cell includes two bits, the corresponding memory status include the 0th to the 4th status and, as shown in FIG. 8A. The 4 status are the 0th status (also referred to as the erased status) E, the 1st status (also referred to as the 1st memory status) P1, the 2nd status (also referred to as the 2nd memory status) P2 and the 3rd status (also referred to as the 3rd memory status) P3 corresponding to the binary data 11, 10, 00 and 01 respectively. Correspondingly, the memory device includes two pages, e.g., a lower page (LP) and an upper page (UP) respectively.

Taking the memory cell shown in FIG. 8A as an example, in the two-bit memory cell, 3 levels of read voltages (the first level of read voltage L1, the second level of read voltage L2 and the third level of read voltage L3 shown in FIG. 8A) are used to read the stored data of two bits and four memory states.

Illustratively, one of the pages corresponds to a plurality of levels of read voltages, while the other of the pages corresponds to one level of read voltage. As shown in FIG. 8A, the binary data corresponding to the lower page are 1001 respectively and the corresponding first level of read voltage L1 and the third level of read voltage L3 are needed to read the lower page. The binary data corresponding to the upper page are 1100 respectively and the corresponding second level of read voltage L2 is needed to read the upper page.

Figure 8B:
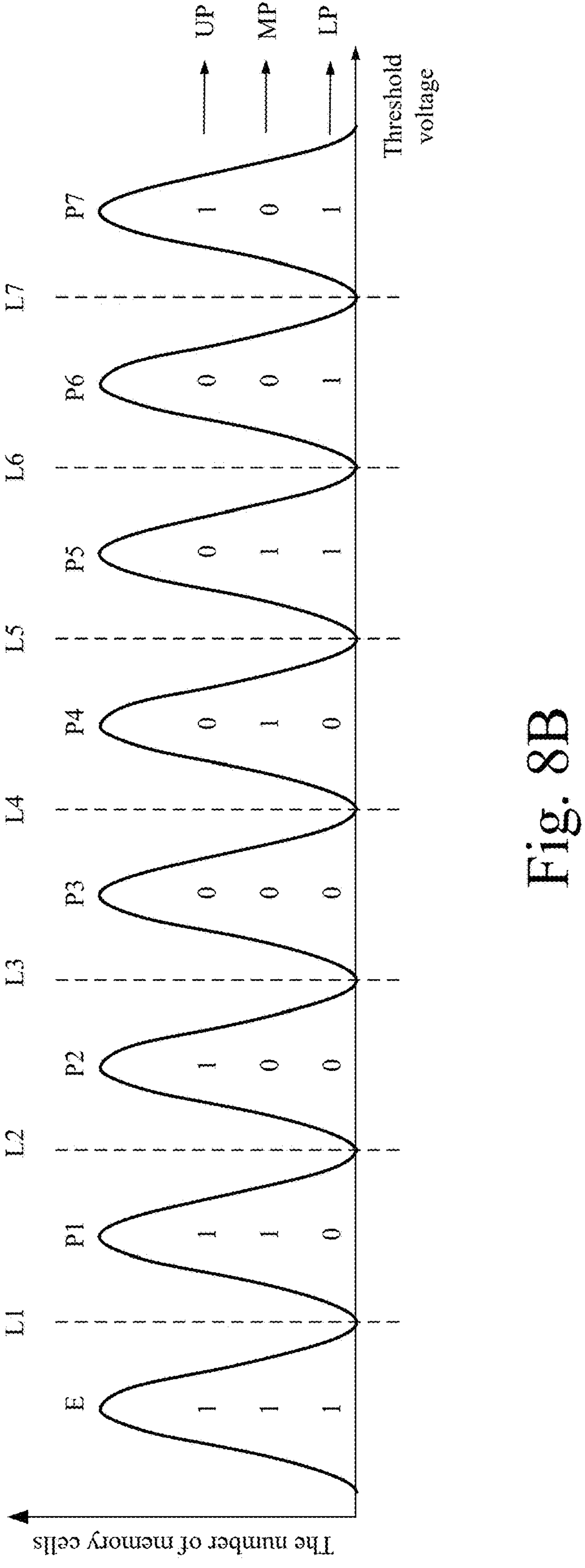
FIG. 8B is a threshold voltage distribution diagram corresponding to a memory cell including 3 memory bits provided in an example of the present disclosure.

Illustratively, when the number of bits stored in memory cell includes three bits, the corresponding memory status include the 0th to the 7th status and, as shown in FIG. 8B, the 8 status are the 0th status (also referred to as the erased status) E, the 1st status (also referred to as the 1st memory status) P1, the 2nd status (also referred to as the 2nd memory status) P2 . . . the 7th status (also referred to as the 7th memory status) P7 corresponding to the binary data 111, 110, 100, 000, 010, 011, 001 and 101 respectively. Correspondingly, the memory device includes three pages, e.g., a lower page, a middle page (MP) and an upper page respectively.

Taking the memory cell shown in FIG. 8B as an example, in the three-bit memory cell, 7 levels of read voltages (the first level of read voltage L1, the second level of read voltage L2, the third level of read voltage L3, the fourth level of read voltage L4, the fifth level of read voltage L5, the sixth level of read voltage L6 and the seventh level of read voltage L7 shown in FIG. 8B) are used to read the stored data of three bits and eight memory states.

Illustratively, each page corresponds to a plurality of levels of read voltages. As shown in FIG. 8B, the binary data corresponding to the lower page are 10000111 respectively and the corresponding first level of read voltage L1 and the fifth level of read voltage L5 are needed to read the lower page. The binary data corresponding to the middle page are 11001100 respectively and the corresponding second level of read voltage L2, the fourth level of read voltage L4 and the sixth level of read voltage L6 are needed to read the middle page. The binary data corresponding to the upper page are 11100001 respectively and the corresponding third level of read voltage L3 and the seventh level of read voltage L7 are needed to read the upper page.

Figure 8C:
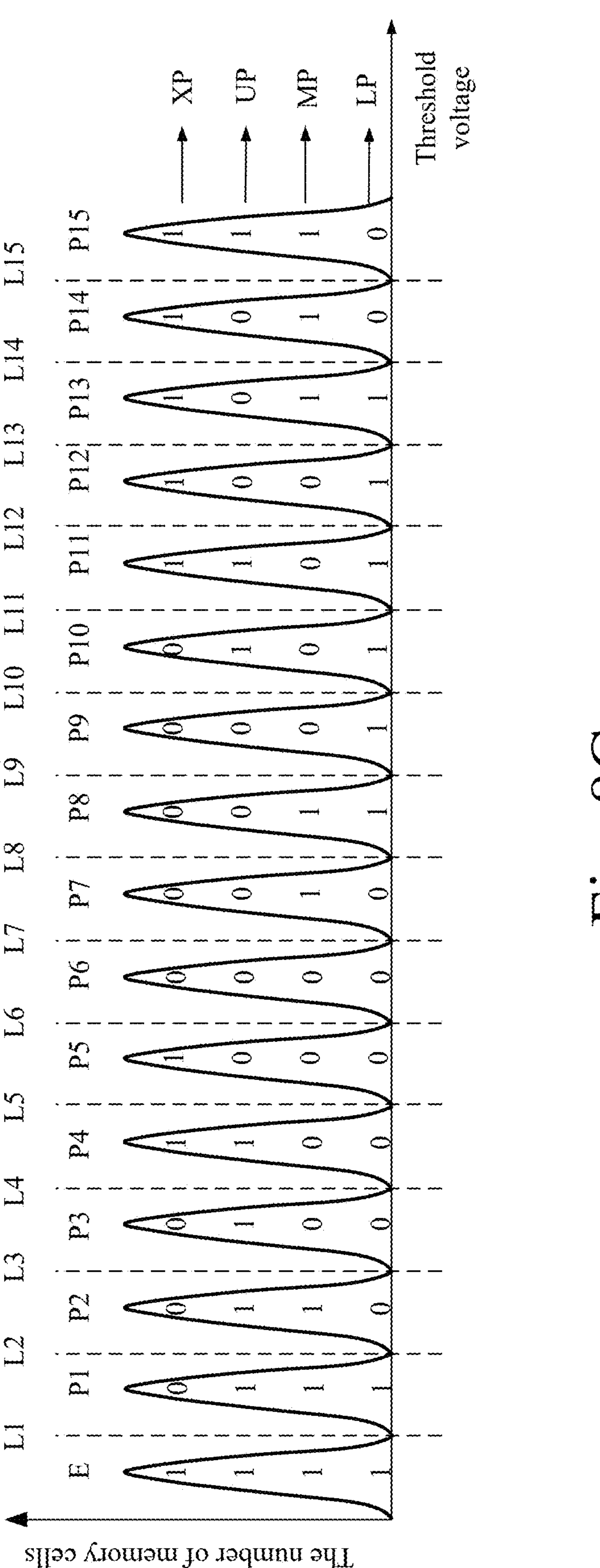
FIG. 8C is a threshold voltage distribution diagram corresponding to a memory cell including 4 memory bits provided in an example of the present disclosure.

Illustratively, when the number of bits stored in memory cell includes four bits, the corresponding memory status include the 0th to the 15th status and, as shown in FIG. 8C, the 16 status are the 0th status (also referred to as the erased status) E, the 1st status (also referred to as the 1st memory status) P1, the 2nd status (also referred to as the 2nd memory status) P2 . . . the 15th status (also referred to as the 15th memory status) P15 corresponding to the binary data 1111, 0111, 0110 . . . 1110 respectively. Correspondingly, the memory device includes four pages, e.g., a lower page, a middle page, an upper page and an extra page (XP) respectively. Here, the four memory bits corresponding to the 16 status are stored in the lower page, the middle page, the upper page and the extra page respectively.

Taking the memory cell shown in FIG. 8C as an example, in the four-bit memory cell, 15 levels of read voltages (the first level of read voltage L1, the second level of read voltage L2 and the third level of read voltage L3, the fourth level of read voltage L4, the fifth level of read voltage L5, the sixth level of read voltage L6 and the seventh level of read voltage L7, the eighth level of read voltage L8, the ninth level of read voltage L9, the tenth level of read voltage L10, the eleventh level of read voltage L11, the twelfth level of read voltage L12, the thirteenth level of read voltage L13, the fourteenth level of read voltage L14 and the fifteenth level of read voltage L15 shown in FIG. 8C) are used to read the stored data of four bits and sixteen memory status.

Illustratively, each page corresponds to a plurality of levels of read voltages. As shown in FIG. 8C, the binary data corresponding to the lower page are 1100000011111100 respectively and the corresponding second level of read voltage L2, the eighth level of read voltage L8 and the fourteenth level of read voltage 14 are needed to read the lower page. The binary data corresponding to the middle page are 1110000110000111 respectively and the corresponding third level of read voltage L3, the seventh level of read voltage L7, the ninth level of read voltage L9 and the thirteenth level of read voltage L13 are needed to read the middle page. The binary data corresponding to the upper page are 1111100000110001 respectively and the corresponding fifth level of read voltage L5, the tenth level of read voltage L10, the twelfth level of read voltage L12 and the fifteenth level of read voltage L15 are needed to read the upper page. The binary data corresponding to the extra page are 1000110000011111 respectively and the corresponding first level of read voltage L1, the fourth level of read voltage L4, the sixth level of read voltage L6 and the eleventh read voltage L11 are needed to read the extra page.

Since the lower page is the nearest to the source/drain, the target valley voltage of each of the corresponding levels of read voltages to the lower page is determined first, thereby the access speed is the fastest, the response time is the shortest and the equilibrium and durability can be ensured during the process of data access.

It is to be noted that it is only an example to determine the target valley voltage of each of the corresponding levels of read voltages to the lower page first, which is not a limitation on the order of determining the target valley voltage of each of the plurality of levels of read voltages corresponding to at least a portion of a page in examples of the present disclosure.

In various examples of the present disclosure, the first result corresponding to a specific voltage (e.g., the first read voltage V0 shown in FIG. 9) can be understood as: performing a third adjustment on a specific voltage to have a first voltage difference A V1 between the specific voltage and the adjusted specific voltage after the third adjustment (e.g., the second read voltage V1 shown in FIG. 9), and taking the number of the bits, in a preset number of memory cells, which are flipped in the two read results obtained under the specific voltage and the adjusted specific voltage after the third adjustment, as the corresponding first result under the specific voltage, where the preset number of memory cells may form at least one code word.

In some examples, before obtaining the corresponding first result under the target read voltage for at least one code word, the read mode of the memory device is set to be a single level read (SLR) mode, which includes reading at least one bit of data stored in the memory cells through one level of read voltage.

In some examples, the memory device is configured to: enter into the SLR mode in response to a mode setting command, and obtain a first result of at least one code word under the target read voltage in the SLR mode.

Figure 9:
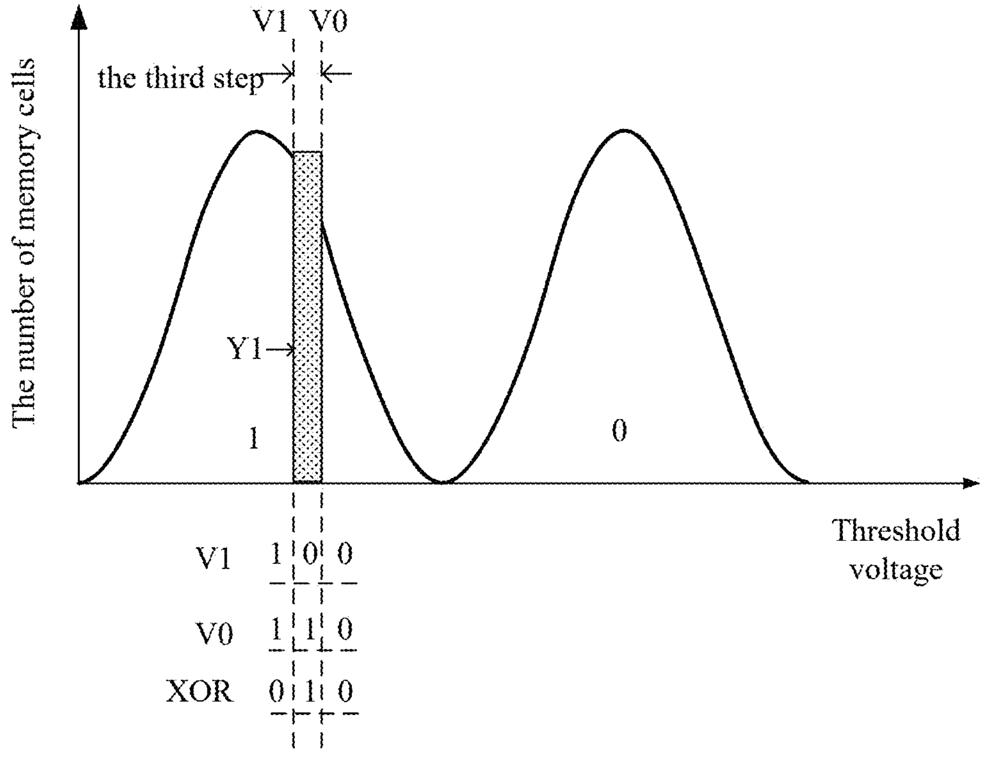
FIG. 9 is a threshold voltage distribution diagram of a memory cell when a first result is obtained provided in an example of the present disclosure.

In some examples, stored data of a code word are read under a first read voltage to obtain a second result, which is stored in a first latch of the memory device. Illustratively, as shown in FIG. 9, stored data of at least one code word are read under a first read voltage V0 to obtain a second result. In an example, the memory cells having their threshold voltages smaller than the target read voltage V0 are denoted as the bit "1" and the memory cells having their threshold voltages larger than the target read voltage V0 are denoted as the bit "0" to obtain a second result, which is stored in the first latch of the memory device.

Subsequently, a third adjustment is performed on the first read voltage to obtain a second read voltage and stored data of at least one code word are read under the second read voltage to obtain a third result, which is stored in a second latch of the memory device. Illustratively, as shown in FIG. 9, a third adjustment is performed on the first read voltage V0 and stored data of the code word are read under the second read voltage V1 obtained after the adjustment to obtain a third result. Specifically, the memory cells having their threshold voltages smaller than the second read voltage V1 are denoted as the bit "1" and the memory cells having their threshold voltages larger than the second read voltage V1 are denoted as the bit "0" to obtain a third result, which is stored in the second latch of the memory device.

Subsequently, a logical operation is performed on the second result and the third result to obtain a fourth result, which is stored in a third latch of the memory device. Illustratively, as shown in FIG. 9, an XOR operation is performed on the second result and the third result to obtain a fourth result, which is stored in the third latch of the memory device.

It is to be noted that the XOR operation is one of basic logical operations; if two binary numbers at the same location are the same, the result is "0"; and if the two binary numbers at the same location are different from each other, the result is "1". That is to say, being the same leads to "0" and being different leads to "1".

Subsequently, the number of the bits in the fourth result which represent flip of bits in the third result relative to the second result is counted to obtain a first result. Illustratively, as shown in FIG. 9, the portion of the fourth result having bits "1" represents the number of the memory cells having different threshold voltages between the first read voltage V0 and the second read voltage V1. In other words, the portion of the fourth result having bits "1" represents the number of the bits of the code word that are flipped in two read results under the first read voltage V0 and the second read voltage V1 and the number is denoted as a first result Y1 corresponding to the first read voltage V0.

It is to be noted that the first result may also be referred to as FBC in examples of the present disclosure.

In some implementations, the preset function model is related to the characteristics of the memory device, may be obtained through fitting by a great quantity of experimental results before the memory device leaves the factory, and is saved in the memory device.

Illustratively, the preset function model is encoded into codes that are stored in the firmware or software of the memory device.

In some examples, a great quantity data is collected through a great number of experiments before the memory device leaves the factory, and can be analyzed after being preprocessed through removal of abnormal values, sorting, denoising or the like. The preset function model is fitted using a statistical method, machine learning or another modeling technology to describe the relationship between the reference read voltages and the first results.

It is to be noted that obtaining a great quantity data through a great number of experiments before the memory device leaves the factory may be understood as: obtaining a plurality of first results corresponding to at least one code word under a plurality of different target read voltages before the memory device leaves the factory, taking the target read voltages corresponding to the first results among the plurality of first results within the first preset interval as reference read voltages, and taking the corresponding first results as the first results under the reference read voltages, so that the preset function model is fitted based on the plurality of reference read voltages and the corresponding plurality of first results before the memory device leaves the factory.

Illustratively, the preset function model is fitted through the great quantity of collected reference read voltages and the corresponding first results using a regression analysis method.

Illustratively, the preset function model is established through a great quantity of collected reference read voltages and the corresponding first results using a data-driven method such as machine learning or deep learning to represent the relationship between the reference read voltages and the first results.

In some examples, the peripheral circuit is configured to: obtain a predicted parameter of the preset function model according to M first results and M reference read voltages in combination with the preset function model, where the predicted parameter is the corresponding reference read voltage when the curve, where the preset function model is located has the minimum first result; and obtain a predicted valley voltage according to the predicted parameter.

In some implementations, the functional relation formula in the fitted preset function model includes a related parameter; and during the process of obtaining a predicted valley voltage, the value of the related parameter may be obtained according to M first results, M reference read voltages and the functional relation formula, and the corresponding reference read voltage when the curve, where the preset function model is located has the minimum first result is further obtained and taken as the predicted valley voltage. In some examples, the preset function model includes a quadratic function model that includes the following functional relation formula:

$$y=a(x+b)^2+c,$$

where y is a first result, x is a reference read voltage, b is used for representing a predicted parameter, a is a first parameter, and c is a second parameter.

Figure 10:
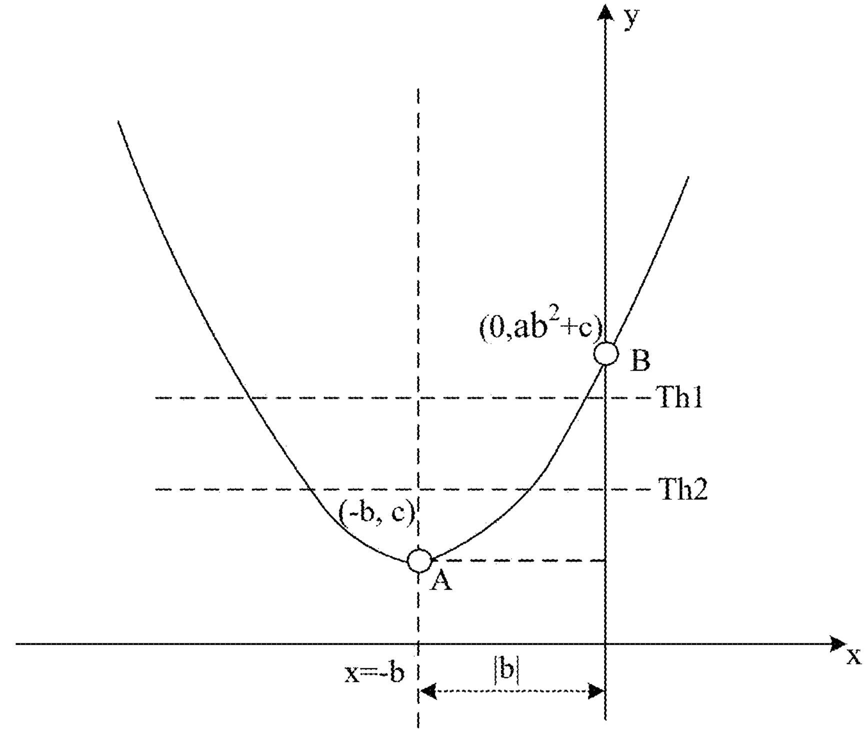
FIG. 10 is a schematic diagram of a preset function model provided in an example of the present disclosure.

As shown in FIG. 10, in combination with the functional relation formula included in the above-mentioned quadratic function model, it can be known that the extreme value in the curve where the quadratic function model is located, is at the location, at which the axis of symmetry x=−b is located, e.g., the location with the derivative value of 0 in the curve. Illustratively, when the first parameter is larger than 0, the value of y (a first result) corresponding to x=−b is the minimum in the curve where the quadratic function model is located, and the coordinates of the extreme point (the point A shown in FIG. 10) are (−b, c).

In some implementations, the taken value of the predicted parameter is the opposite number of b, e.g., the predicted parameter represents the horizontal coordinate corresponding to the minimum in the curve where the quadratic function model is located.

As shown in FIG. 10, the axis of symmetry (at x=−b) of the curve where the quadratic function model is located has an offset value −b with respect to the y axis (at x=0), e.g., the distance between axis of symmetry of the curve and the y axis is the absolute value |b| of b.

Here, x=0 can be understood as the position of a FW default read voltage, and the term "a corresponding first result under the FW default read voltage" herein may be abbreviated as "a default first result" (the B point shown in FIG. 10) corresponding coordinates (0, $ab^2+c$). A FW default read voltage may be the read voltage of a memory cell without any shift in its threshold voltage, for example, the corresponding read voltage when writing is just done and the offset value at this point is 0. It can be understood that when the offset value of a target read voltage with respect to a FW default read voltage (x=0) is −b, the corresponding first result under the target read voltage is the minimum. It can be understood that the corresponding target read voltage (equivalent to the predicted parameter), when the first result is the minimum, is taken as the predicted valley voltage and a target valley voltage is determined based on the predicted valley voltage, so that the error rate of reading results is low and the reliability is high.

It is to be noted that taking the corresponding target read voltage, when the first result is the minimum, as a predicted valley voltage, e.g., taking −b as the predicted valley voltage, means that the offset value of the predicted valley voltage with respect to the FW default read voltage is −b instead of the predicted valley voltage being a negative value. When −b is larger than 0, it means that the predicted valley voltage is shifted towards the right with respect to the FW default read voltage with an offset value of |b|, and when −b is smaller than 0, it means that the predicted valley voltage is shifted towards the left with respect to the FW default read voltage with an offset value of |b|. In other words, the actual voltage of the predicted valley voltage (denoted as Vpre) and the actual voltage of the FW default read voltage (denoted as Vdefault) have the following relationship therebetween:

$$V pre=\text{Vdefault}+(-b).$$

Likewise, after determining the target valley voltage based on the predicted valley voltage, using the target valley voltage to perform a read operation on at least one code word means using the actual voltage of the target valley voltage to perform the read operation on the at least one code word. It is to be noted that when there are only one set of the predicted parameters, they can be directly used as the predicted valley voltage. However, when there is a plurality of sets of the predicted parameters, the predicted valley voltage needs to be determined according to the plurality of sets of the predicted parameters together.

In some examples, as shown in FIG. 10, the first preset interval represents the range between a first threshold and a second threshold of the curve where the quadratic function model is located, the first threshold (Th1) being larger than the second threshold (Th2).

Figure 11:
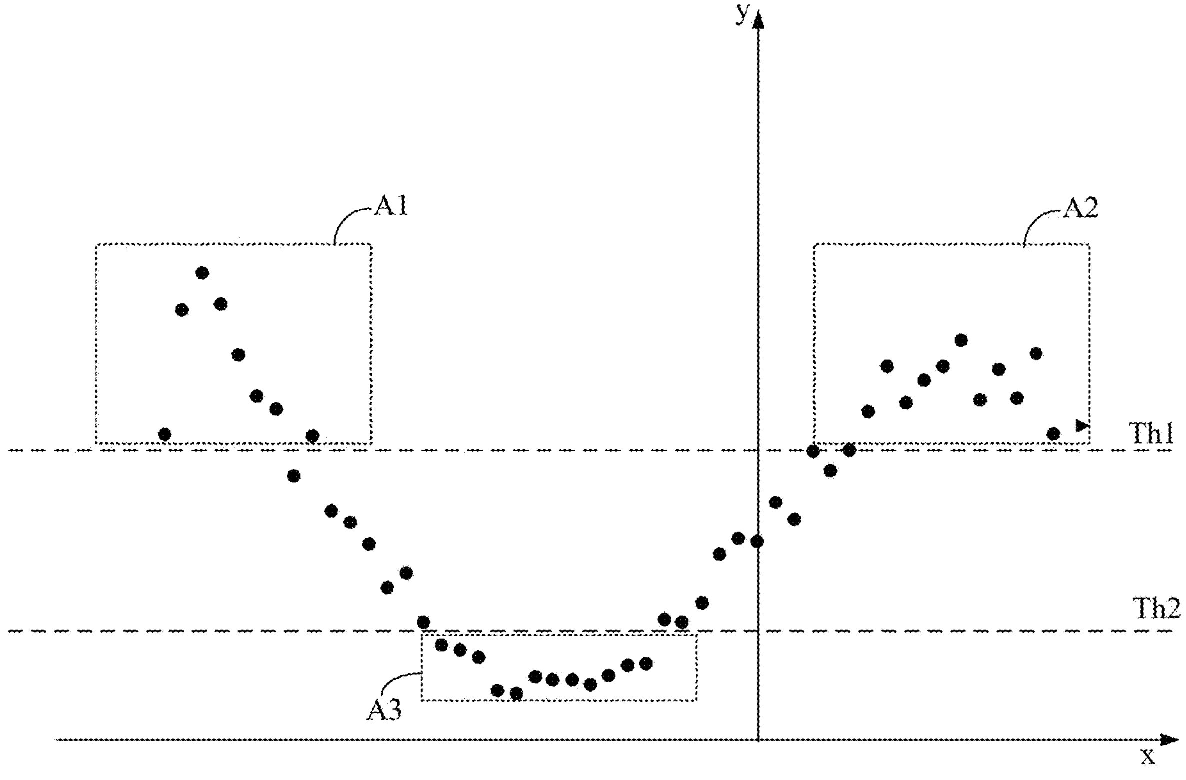
FIG. 11 is a schematic diagram for determining a first preset interval provided in an example of the present disclosure.

FIG. 11 is a schematic diagram for determining the first preset interval provided in an example of the present disclosure. In some implementations, a plurality of solid dots shown in FIG. 11 are a large quantity of data (a plurality of target read voltages and a plurality of first results corresponding to the plurality of target read voltages) collected through a great number of experiments before the memory device leaves the factory. When a preset function model is fitted based on the data shown in FIG. 11, selection of data is directly related to the accuracy of the fitted preset function model. Illustratively, when the selected data have a too high FBC (e.g., the solid dots within the dashed box region A1 or the dashed box region A2 shown in FIG. 11), the fitted preset function module is not consistent with the distribution curve of the actual valley voltage. In an example, the preset function model obtained through fitting by selecting the solid dots within the dashed box region A1 or dashed box region A2, is a quadratic function model with its opening facing downwards, which is not consistent with the distribution curve of the actual valley voltage (a quadratic function model with its opening facing upwards). When the selected data have a too low FBC (e.g., the solid dots in the dashed box region A3 shown FIG. 11), the fitted preset function model has a too big error, leading to a too big deviation between the target valley voltage obtained according to the preset function model and the actual valley voltage.

Thereby, it can be known that selection of data is especially important during fitting of the preset function model, or else the preset function model cannot accurately reflect the distribution of the actual valley voltage. Illustratively, when the FBC of the selected data is within the first preset interval (e.g., the range between the first threshold (Th1) and the second threshold (Th2) shown in FIG. 11), the preset function model obtained through fitting can accurately reflect the distribution of the actual valley voltage. By collecting a large quantity of data through a great number of experiments before the memory device leaves the factory and obtaining a preset function model through fitting according to the data within a first preset interval, the accuracy is high, and it can be understood that the predicted valley voltage obtained according to M reference read voltages and M first results within a first preset interval in combination with the preset function model, can also ensure its accuracy.

In some implementations, the first preset interval has a range from 50 to 200.

It is to be noted that the range of the first preset interval in the example of the present disclosure is only an example, and the range of the first preset interval is related to the characteristics of the memory device, which should not excessively limit the scope of the present disclosure.

In some examples, the first parameter and the second parameter are both constants; the peripheral circuit is configured to: obtain the first result corresponding to at least one code word under a target read voltage; and in response to the first result corresponding to the at least one code word under the target read voltage being within a first preset interval, take the target read voltage as one reference read voltage; and in response to the first result corresponding to the at least one code word under the target read voltage being outside the first preset interval, obtain at least one new target read voltages again and obtain the corresponding first results under the at least one new target read voltages until the corresponding first result under the newest target read voltage falls within the first preset interval.

Here, the first parameter and the second parameter may be obtained during fitting of the preset function model and saved in the memory device.

Illustratively, the preset function model includes a quadratic function model that includes the following functional relation formula (1):

$$y = a(x+b)^2 + c.$$

The first parameter and the second parameter in the functional relation formula may be optimized using a method including, but not limited to, the least square method, the gradient descent method, the Bayesian optimization method, the newton method, the quasi-newton method or the like, and the optimized first and second parameters are saved in the memory device. Here, the least square method is a method of estimating a parameter, which estimates the parameter by minimizing the sum of squares of residuals between the actual collected data and the predicted values of the quadratic function model. The gradient descent method takes the parameter of the quadratic function model as a target of optimization and finds the value of the parameter that minimizes the fitting error of the quadratic function model by using the gradient descent method, in which the gradient of the loss function with respect to the first parameter and the second parameter is calculated and the values of the first and second parameters are updated along the direction opposite the gradient, until convergence is reached.

Figure 12:
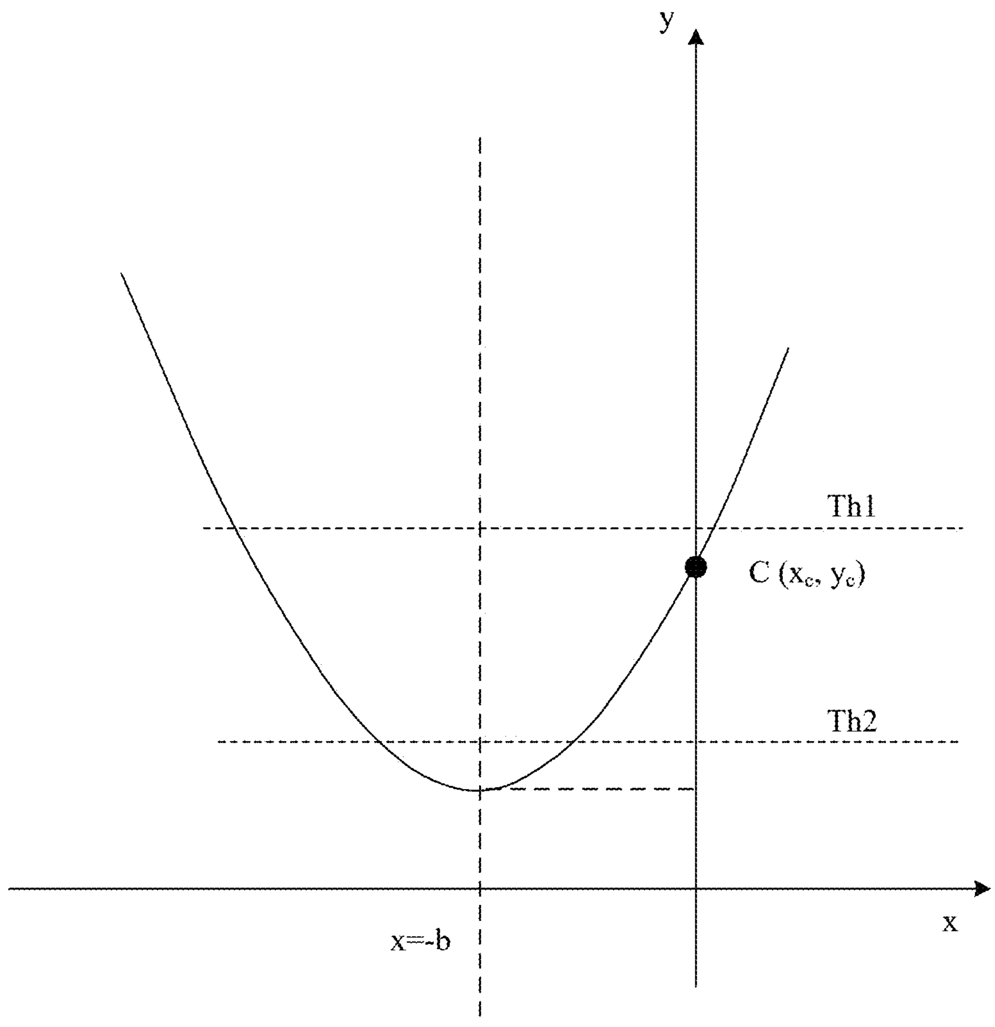
FIG. 12 is a first schematic diagram for obtaining a reference read voltage provided in an example of the present disclosure.

In some examples, as shown in FIG. 12, the peripheral circuit is configured to: obtain the corresponding first result of at least one code word under a target read voltage, e.g., obtain the point C ($x_c$, $y_x$) shown FIG. 12, which corresponds to a first result ($y_c$) within the first preset interval. The target read voltage ($x_c$) corresponding to the point C is taken as a reference read voltage.

It is to be noted that FIG. 12 is an example, in which the default first result is taken as the point C, which should not excessively limit the scope of the present disclosure. In addition, the point C is the point corresponding to the first result obtained under the FW default read voltage according to the manner of obtaining a first result in the above-described examples, and therefore the point C is an actual value, which may be or may not be located on the curve where the quadratic function model is located.

Figure 13:
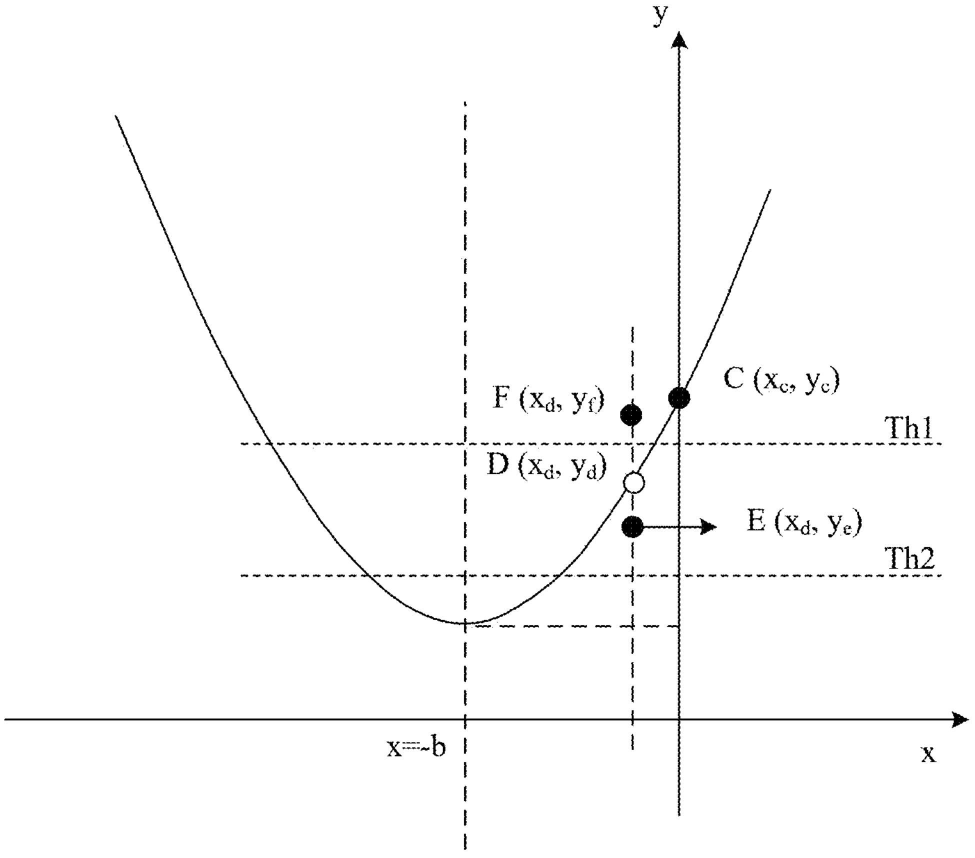
FIG. 13 is a second schematic diagram for obtaining a reference read voltage provided in an example of the present disclosure.

In some examples, as shown in FIG. 13, the peripheral circuit is configured to: in response to the first result ($y_c$) corresponding to the point C ($x_c$, $y_c$) being outside the first preset interval, obtain at least one new target read voltages again and obtain the first results corresponding to the at least one new target read voltages until the first result corresponding to the newest target read voltage falls within the first preset interval.

It can be understood that only when the first result corresponding to the target read voltage is within the first preset interval, the target read voltage can be taken as a reference read voltage that is used to obtain a predicted valley voltage. As such, the accuracy and reliability of obtaining the predicted valley voltage according to a plurality of reference read voltages and a plurality of first results can be improved.

In some examples, at least two of the M reference read voltages are located on two sides of the axis of symmetry of the curve where the quadratic function model is located; and the peripheral circuit is configured to: during the process of obtaining reference read voltages, obtain the reference read voltages on a first side of the two sides of the axis of symmetry of the curve where the quadratic function model is located; and determine the reference read voltages on a second side of the two side of the axis of symmetry according to the reference read voltages on the first side.

In some implementations, the first parameter and the second parameter may be obtained during fitting of the preset function model and saved in the memory device. According to the coordinates of the point C in FIG. 12 or 13, the functional relation formula of the quadratic function model, the first parameter and the second parameter, an original value of b may be obtained. The axis of symmetry $x=-b$ of the curve where the quadratic function model is located may be obtained by the original value of b.

It is to be noted that the first side refers to one side of the axis of symmetry (at x=−b as shown in FIGS. 12 and 13) of the curve where the quadratic function mode is located, and the second side is the other side of the curve where the quadratic function mode is located. When the first side is the right side of the axis of symmetry, the second side is the left side of the axis of symmetry. When the first side is the left side of the axis of symmetry, the second side is the right side of the axis of symmetry.

Illustratively, the target read voltage ($x_c$) corresponding to the point C in FIG. 12 is the reference read voltages on the first side of the two sides of the axis of symmetry of the curve where the quadratic function mode is located.

Subsequently, the process of obtaining the reference read voltages on the first side of the two sides of the axis of symmetry of the curve where the quadratic function mode is located and obtaining the reference read voltages on the second side of the two sides of the axis of symmetry of the curve will be described in detail.

In some implementations, in response to a first result corresponding to at least one code word under a target read voltage being outside a first preset interval, the manner of obtaining at least one new target read voltages again includes, but not limited to, taking a read voltage, obtained by adjusting the target read voltage with a target step, as a new target read voltage. Illustratively, as shown in FIG. 13, a read voltage ($x_d$), obtained by adjusting the target read voltage ($x_c$) with a target step, is taken as a new target read voltage and a first result ($y_e$) corresponding to at least one code word under the new target read voltage is obtained, e.g., the point E ($x_d$, $y_e$) shown in FIG. 13 is obtained. Here the point E is an actual value, and when the first result ($y_e$) corresponding to the point E is within the first preset interval, the new target read voltage ($x_d$) corresponding to the point E is taken as the reference read voltage. Here, the target step is set in the range from 20 mV to 40 mV and illustratively the step of the first adjustment may be 20 mV, 30 mV or 40 mV, or the target step is set in the range from 50 mV to 150 mV and illustratively the step of the second adjustment may be 50 mV, 60 mV, 70 mV, 80 mV, 100 mV, 120 mV or 150 mV.

In some implementations, the peripheral circuit is configured to: in response to the first result corresponding to at least one code word under a target read voltage being outside the first preset interval, based on the target read voltage, the corresponding first result under the target read voltage, a target first result and a first mapping function, obtain a fitted read voltage on the first side and corresponding to the target first result; the first mapping function is obtained according to the quadratic function model, the first parameter and the second parameter; the target first result is within a second preset interval and the first preset interval is within the range of the second preset interval.

Illustratively, as shown in FIG. 13, the peripheral circuit is configured to: according to that fact that the first result ($y_c$) corresponding to the point C ($x_c$,$y_c$) is outside the first preset interval, based on the target read voltage ($x_c$), the corresponding first result ($y_c$) under the target read voltage, a target first result ($y_d$) and a first mapping function, obtain a fitted read voltage ($x_d$) on the first side and corresponding to the target first result ($y_d$), e.g., obtain the point D ($x_d$,$y_d$) according to the coordinates of the point C, the target first result ($y_d$) and the first mapping function. Here, the first mapping function includes the following relation formula (2):

$$x2 = x1 - \sqrt{\frac{y1 - c}{a}} + \sqrt{\frac{y2 - c}{a}}$$

where $x_1$ and $y_1$ represent the horizontal coordinate and the vertical coordinate of the obtained actual point respectively, $y_2$ represents the target first result which is an optional value within the second preset interval, and $x_2$ represents the fitted read voltage. The first mapping function aims to obtain a fitted read voltage (e.g., the $x_d$ shown in FIG. 13) according to a value in the second preset interval in combination with the obtained actual point (e.g., the point C). The first preset interval is within the range of the second preset interval. Optionally, the second preset interval has the range from 30 to 220.

The point D ($x_d$,$y_d$) is obtained by substituting the coordinates of the point C, the target first result ($y_d$), the first parameter and the second parameter into the relation formula (2) of the first mapping function.

It is to be noted that FIG. 13 and the first mapping function are explained with the first side being the right side of the axis of symmetry and the point C being located on the first side.

Here, the point D ($x_d$,$y_d$) is a fitted point, and the horizontal coordinate $x_d$ corresponding to the point D is a fitted read voltage on the first side. The peripheral circuit is configured to: take the fitted read voltage as a new target read voltage and use the manner of obtaining a first result in the above-described examples to obtain the first result ($y_e$) corresponding to at least one code word under the fitted read voltage ($x_d$) on the first side, e.g., obtain a point E ($x_d$, $y_e$) which is an actual point; and in response to the corresponding first result (the vertical coordinate $y_e$ corresponding to the point E) under the fitted read voltage on the first side being within the first preset interval, the fitted read voltage ($x_d$) on the first side is taken as the reference read voltage on the first side.

In some examples, the fitted read voltage (the horizontal coordinate $x_d$ corresponding to the point D) on the first side is taken as a new target read voltage and the manner of obtaining a first result in the above-described examples is used to obtain the first result ($y_f$) corresponding to at least one code word under the fitted read voltage ($x_d$) on the first side, e.g., obtain a point F ($x_d$,$y_f$). The peripheral circuit is further configured to: in response to the corresponding first result (the vertical coordinate $y_f$ of a point F) under the fitted read voltage on the first side being outside the first preset interval, obtain the next fitted read voltage on the first side corresponding to the target first result based on the previous fitted read voltage on the first side, the corresponding first result under the previous fitted read voltage on the first side, the target first result and a first mapping function, until the corresponding first result under the newest fitted read voltage on the first side is within the first preset interval, and take the newest fitted read voltage on the first side as the reference read voltage on the first side. It can be understood here that based on the previous known actual point F ($x_d$, $y_f$), a target first result (an optional value within the second preset interval and different from $y_d$) and a first mapping function (the relation formula (2)), obtain the next fitted read voltage on the first side corresponding to the target first result until the corresponding first result under the newest fitted read voltage on the first side is within the first preset interval, and take the newest fitted read voltage on the first side as the reference read voltage on the first side.

In some examples, the peripheral circuit is configured to: in response to the number of times the corresponding first result under the newest fitted read voltage on the first side being outside the first preset interval is larger than or equal to a preset number of times, adjust the value of the first parameter and adjust the first mapping function correspondingly; based on the previous fitted read voltage on the first side, the corresponding first result under the previous fitted read voltage on the first side, the target first result and the adjusted first mapping function, obtain the next adjusted fitted read voltage on the first side corresponding to the target first result until the corresponding first result under the newest adjusted fitted read voltage on the first side is within the first preset interval.

Here, the preset number of times represents the upper limit of the number of times of trial and error when a preset function model is used, and if the corresponding first results obtained using the preset function model under the fitted read voltages on the first side are always outside the first preset interval after the preset number of times has passed, it means that the selected preset function model may not satisfy the actual requirements and deeper parameter adjustments is needed. The preset number of times may be adjusted according to actual conditions, and in some examples the preset number of times may be in the range from 3 to 7, such as 3, 5 or 7.

In some implementations, when the number of times the corresponding first result under the fitted read voltage on the first side obtained using the method described in the examples above is outside the first preset interval is larger than or equal to the preset number of times, it means that a plurality of actual points have been obtained at this point, and based on the plurality of obtained actual points in combination of the functional relation formula (1) of the quadratic function model and the second parameter (a constant), an value of the adjusted first parameter may be obtained. It can be understood that the accuracy and reliability of the quadratic function model may be improved by adjusting the first parameter of the quadratic function model in combination with actual points in practice, such that the adjusted first parameter can approach the first parameter corresponding to the distribution curve of the actual valley voltage infinitely. As such, the actual conditions can be better reflected, the variation of practical usage scenarios can be adapted flexibly and practicability of the quadratic function model can be improved.

Illustratively, the preset number of times is 3, the number of times the corresponding first result under the fitted read voltage on the first side obtained using the method described in the examples above is outside the first preset interval is equal to 3, e.g., at least 3 actual points are obtained here. The coordinates of the 3 actual points are denoted as ($x3$, $y_3$), ($x4$, $y_4$) and ($x5$, $y_5$) respectively. According to any two of the 3 obtained actual points, for example, ($x3$, $y_3$) and ($x4$, $y_4$), in combination with the functional relation formula (1) of the quadratic function model, the following calculation formula (1) for b may be obtained:

$$b = \frac{x4 - x3}{1 + \sqrt{\frac{y3 - c}{y4 - c}}} - x4$$

Based on the calculation formula (1) for b, according to the functional relation formula of the quadratic function model and the second parameter as a constant, the following calculation formula (2) for the first parameter may be obtained:

$$a = \frac{y3 - c}{(x3 + b)^2}$$

Illustratively, according to the three obtained actual points in combination with the functional relation formula (1) of the quadratic function model, the following calculation formula (3) for b may be obtained:

$$b = \frac{(y4 - y3) \times (x5^2 - x4^2) - (y5 - y4) \times (x4^2 - x3^2)}{2 \times ((y5 - y4) \times (x4 - x3) - (y4 - y3) \times (x5 - x4))}$$

Based on the calculation formula (3) for b, according to the functional relation formula (1) of the quadratic function model and the second parameter as a constant, the following calculation formula (4) for the first parameter may be obtained:

$$a = \frac{y4 - y3}{(x4^2 - x3^2) + 2 \times (x4 - x3) \times b}$$

As such, the value of the adjusted first parameter is obtained and substituted into the functional relation formula (2) of the first mapping function to adjust the first mapping function correspondingly.

In some examples, the peripheral circuit is configured to: based on the reference read voltage on the first side, the corresponding first result under the reference read voltage on the first side, a target first result and a second mapping function, obtain a fitted read voltage on the second side corresponding to the target first result, where the second mapping function is obtained according to the quadratic function model, the first parameter/adjusted first parameter and the second parameter; obtain the first result corresponding to at least one code word under the fitted read voltage on the second side; and in response to the corresponding first result under the fitted read voltage on the second side being within the preset interval, take the fitted read voltage on the second side as the reference read voltage on the second side.

Figure 14:
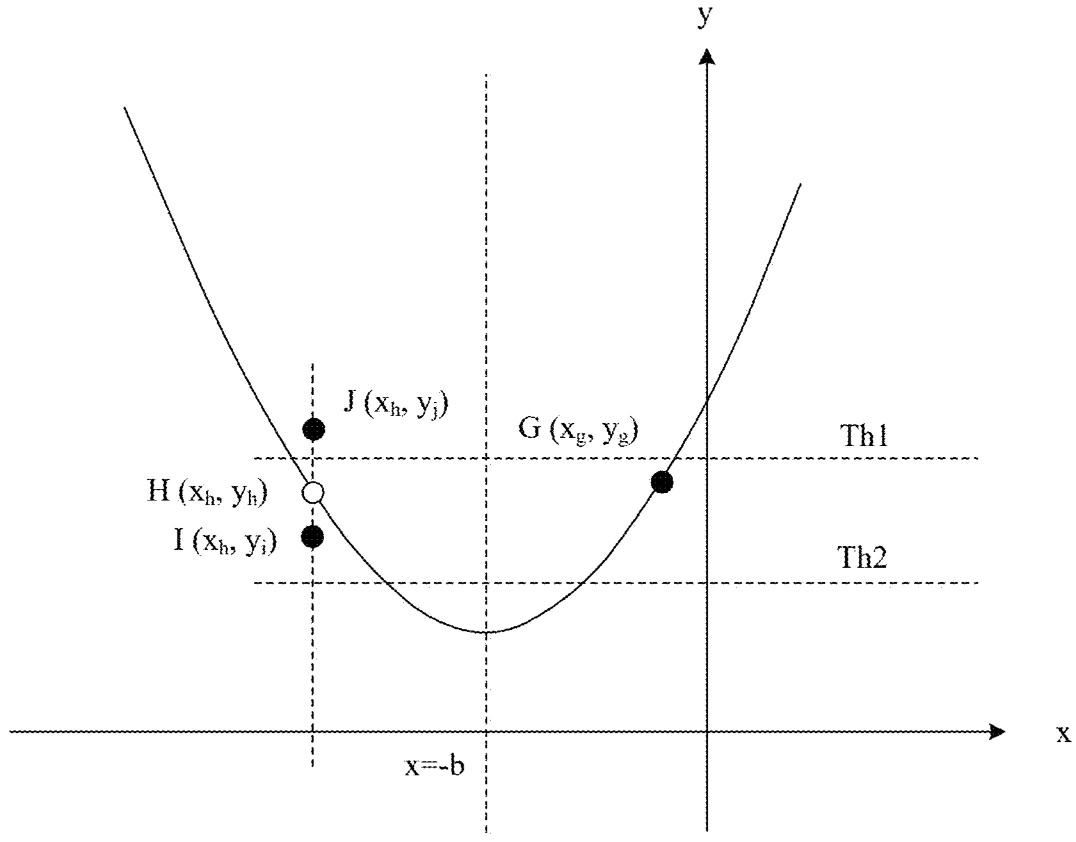
FIG. 14 is a third schematic diagram for obtaining a reference read voltage provided in an example of the present disclosure.

Illustratively, as shown in FIG. 14, the peripheral circuit is configured to: based on a reference read voltage (the corresponding horizontal coordinate $x_g$ of the point G) on the first side, the corresponding first result (the corresponding vertical coordinate $y_g$ of the point G) under the reference read voltage on the first side, a target first result ($y_h$) and a second mapping function, obtain the fitted read voltage ($x_h$) on the second side corresponding to the target first result ($y_h$), e.g., obtain the fitted read voltage ($x_h$) on the second side corresponding to the target first result ($y_h$) according to the coordinates of the point G. In an example, the point H ($x_h$,$y_h$) is obtained according to the coordinates of the point G, the target first result ($y_h$) and the second mapping function. Here, the second mapping function includes the following relation formula (3):

$$x2 = x1 - \sqrt{\frac{y1 - c}{a}} - \sqrt{\frac{y2 - c}{a}}$$

where x1 and $y_1$ represent the horizontal coordinate and the vertical coordinate of the obtained actual point respectively, $y_2$ represents the target first result which is an optional value within the second preset interval, and x2 represents the fitted read voltage. The second mapping function aims to obtain the fitted read voltage (e.g., the $x_h$ shown in FIG. 14) according to a value in the second preset interval in combination with the obtained actual point (e.g., the point G).

The point H $(x_h,y_h)$ is obtained by substituting the coordinates of the point G, the target first result $(y_h)$, the first parameter/adjusted first parameter and the second parameter into the relation formula (3) of the second mapping function.

Here, the point H $(x_h, y_h)$ is a fitted point, and the corresponding horizontal coordinate $x_h$ of the point H is the fitted read voltage on the second side. The peripheral circuit is configured to: take the fitted read voltage as a new target read voltage and use the manner of obtaining a first result in the above-described examples to obtain the first result $(y_i)$ corresponding to at least one code word under the fitted read voltage $(x_h)$ on the second side, e.g., obtain a point I $(x_h, y_i)$ which is an actual point; and in response to the corresponding first result (the corresponding vertical coordinate $y_i$ of the point I) under the fitted read voltage on the second side being within the first preset interval, the fitted read voltage $(x_h)$ on the second side is taken as the reference read voltage on the second side.

In some examples, the peripheral circuit is configured to: in response to the corresponding first result under the fitted read voltage on the second side being outside the preset interval, based on the previous fitted read voltage on the second side, the corresponding first result under the previous fitted read voltage on the second side, the target first result and a third mapping function, obtain the next fitted read voltage on the second side corresponding to the target first result until the corresponding first result under the newest fitted read voltage on the second side is within the first preset interval, and take the newest fitted read voltage on the second side as the reference read voltage on the second side; and the third mapping function is obtained according to the quadratic function model, the first parameter/adjusted first parameter and the second parameter.

Figure 15:
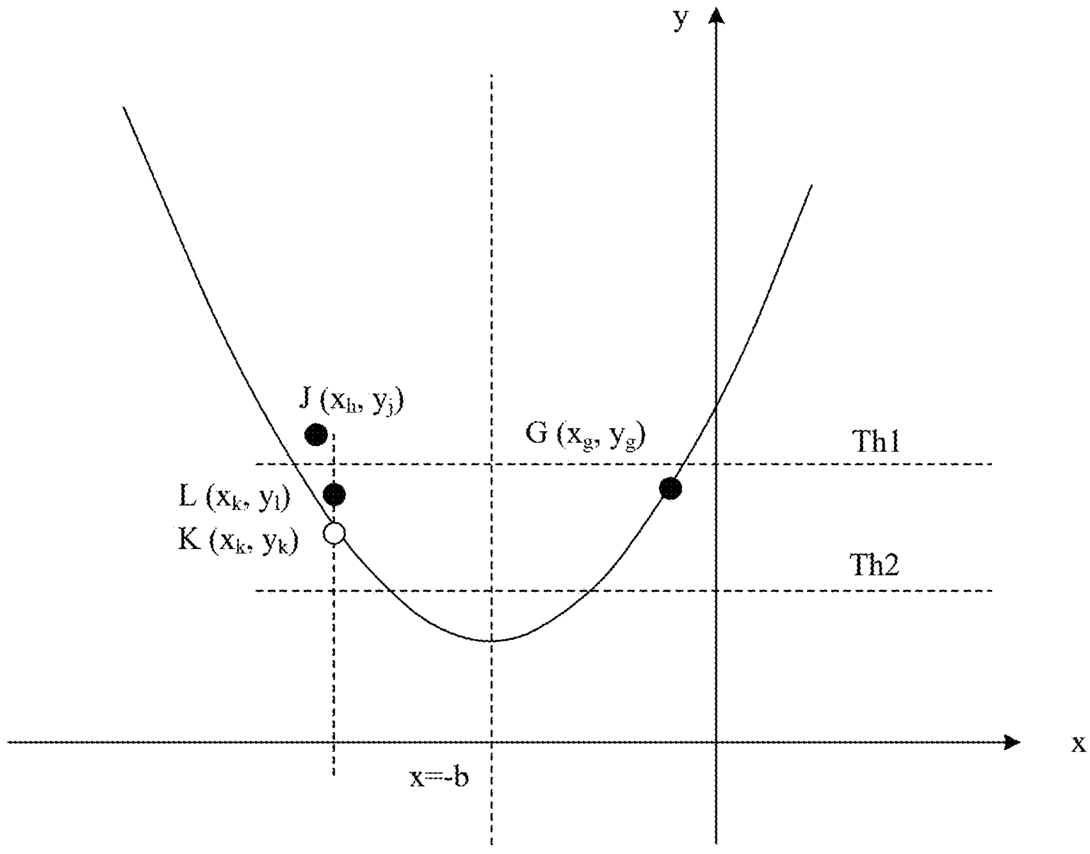
FIG. 15 is a fourth schematic diagram for obtaining a reference read voltage provided in an example of the present disclosure.

In some examples, as shown in FIGS. 14 and 15, the fitted read voltage (the corresponding horizontal coordinate $x_h$ of the point H) on the second side is taken as a new target read voltage and the manner of obtaining a first result in the above-described examples is used to obtain the first result $(y_j)$ corresponding to at least one code word under the fitted read voltage $(x_h)$ on the second side, e.g., obtain a point J $(x_h,y_j)$. The peripheral circuit is further configured to: in response to the corresponding first result (the vertical coordinate $y_j$ of the point J) under the fitted read voltage on the second side being outside the first preset interval, based on the previous fitted read voltage (the horizontal coordinate $x_h$ of the point J) on the second side, the corresponding first result (the vertical coordinate $y_j$ of the point J) under the previous fitted read voltage on the second side, the target first result $(y_k)$ and the third mapping function, obtain the next fitted read voltage $(x_k)$ on the second side corresponding to the target first result $(y_k)$, e.g., obtain the point K $(x_k, y_k)$ as shown in FIG. 15, until the corresponding first result $(y_l)$ under the newest fitted read voltage $(x_k)$ on the second side is within the first preset interval, e.g., the corresponding vertical coordinate of the point L $(x_k,y_1)$ as shown in FIG. 15 is within the first preset interval, and take the newest fitted read voltage $(x_k)$ on the second side as the reference read voltage on the second side; and the third mapping function is obtained according to the quadratic function model, the first parameter/adjusted first parameter and the second parameter. Here, the third mapping function includes the following relation formula (4):

$$x2 = x1 + \sqrt{\frac{y1-c}{a}} - \sqrt{\frac{y2-c}{a}}$$

where x1 and $y_1$ represent the horizontal coordinate and the vertical coordinate of the obtained actual point respectively, $y_2$ represents the target first result which is an optional value within the second preset interval, and x2 represents the fitted read voltage. The third mapping function aims to obtain the fitted read voltage (e.g., the xx as shown in FIG. 15) according to a value within the second preset interval in combination with the obtained actual point (e.g., the point J).

The point K $(x_k, y_k)$ is obtained by substituting the coordinates of the point J, the target first result $(y_k)$, the first parameter/adjusted first parameter and the second parameter into the relation formula (4) of the third mapping function.

Here, the point K $(x_h, y_h)$ is a fitted point, and the horizontal coordinate $x_k$ corresponding to the point K is the fitted read voltage on the second side. The peripheral circuit is configured to: take the fitted read voltage as a new target read voltage and use the manner of obtaining a first result in the above-described examples to obtain the first result $(y_l)$ corresponding to at least one code word under the fitted read voltage $(x_k)$ on the second side, e.g., obtain a point L $(x_k,y_l)$ which is an actual point; and in response to the first result (the vertical coordinate $y_l$ corresponding to the point L) under the newest fitted read voltage on the second side being within the first preset interval, the newest fitted read voltage $(x_k)$ on the second side is taken as the reference read voltage on the second side.

It is to be noted that the points A, B, C, D, H and K in examples of the present disclosure are all fitted points located in the curve where the quadratic function model is located. The points C, E, F, G, I, J and L are all actual points which may or may not be located in the curve where the quadratic function model is located.

In an example of the present disclosure, the manner of obtaining reference read voltages on the first/second side in the above described examples may be used to obtain M reference read voltages and the corresponding first results under the M reference read voltages, and predicted parameters can be obtained according to the M reference read voltages and the M first results.

In some examples, the first parameter is a variable and the second parameter is a constant; the peripheral circuit is configured to:

according to the M first results and the M reference read voltages in combination with the quadratic function model, obtain a predicted parameter; and take the predicted parameter as a predicted valley voltage.

Illustratively, according to the M first results, the M reference read voltages, the quadratic function model and the second parameter, N sets of predicted parameters are obtained, $$C_M^2.$$

Here, the second parameter may be obtained during fitting of the preset function model and saved in the memory device.

In some implementations, M is equal to 2, and thus N is equal to 1; the coordinates corresponding to two reference read voltages and two first results are substituted into the calculation formula (1) for b to obtain b and in turn obtain a set of predicted parameters; and the predicted parameters are taken as the predicted valley voltage.

In some implementations, M is larger than 2, N is equal $$C_M^2;$$

based on M reference read voltages and M first results, $$C_M^2$$

combinations of two reference read voltages and its corresponding two first results may be obtained; and based on the $$C_M^2$$

combination in combination with the calculation formula (1) for b, $$C_M^2$$

sets or predicted parameters can be obtained. Outliers of $$C_M^2$$

sets of predicted parameters are determined. The outliers are determined based on the median and standard deviation of the $$C_M^2$$

sets of predicted parameters, or both the maximum and the minimum of the $$C_M^2$$

sets or predicted parameters are taken as the outliers. The median or average value of the remaining predicted parameters of the $$C_M^2$$

sets or predicted parameters after removing the outliers is taken as the predicted valley voltage.

As such, by determining and removing outliers of a plurality of sets of predicted parameters, accuracy and reliability of determining the predicted valley voltage using the remaining predicted parameters may be guaranteed.

In some examples, the first parameter and the second parameter are both variables; the peripheral circuit is configured to: obtain a predicted parameter according to the M first results and the M reference read voltages in combination with the quadratic function model; take the predicted parameter as a target read voltage and obtain the first result of corresponding to at least one code word under the target read voltage which is the predicted parameter; obtain a new predicted parameter according to the M first results, the M reference read voltages, the predicted parameter and the corresponding first result under the target read voltage which is the predicted parameter in combination with the quadratic function model; and take the new predicted parameter as a predicted valley voltage.

In some implementations, the second parameter is a variable but can have an original value obtained during fitting of the preset function model and saved in the memory device.

Illustratively, according to the M first results, the M reference read voltages, the quadratic function model and the original value of the second parameter in combination with the calculation formula (1) for b, N sets of predicted parameters are obtained, where N is equal to $$C_M^2.$$

In some implementations, M is equal to 2, N is equal to 1, and two reference read voltages and two first results are substituted into the calculation formula (1) for b correspondingly to calculate b and in turn obtain a set of predicted parameters; the predicted parameters are taken as reference read voltages and first results of at least one code word under the target read voltages which is the predicted parameters are obtained, e.g., another actual point is obtained here; subsequently, the coordinates of 3 actual points (two reference read voltages and its corresponding two first results as well as the predicted parameters and the corresponding first results under the target read voltages which is the predicted parameters) are substituted into the calculation formula (3) for b to obtain b and in turn a set of new predicted parameters and the new predicted parameters are taken as a predicted valley voltage.

As such, new predicted parameters are further obtained through predicted parameters and corresponding first results under read voltages which is the predicted parameters, so that accuracy of the obtained predicted valley voltage may be improved.

In some implementations, the M reference read voltages are located on the same side of the axis of symmetry of the curve where the quadratic function model is located, for example, the M reference read voltages are all located on the first side of the axis of symmetry of the curve where the quadratic function model is located, or the M reference read voltages are all located on the second side of the axis of symmetry of the curve where the quadratic function model is located.

In some implementations, at least two of the M reference read voltages are located respectively on two sides of the axis of symmetry of the curve where the quadratic function model is located. Points located on two sides of the axis of symmetry of the curve where the quadratic function model is located, are more representative, can cover a wider data range, and may improve accuracy and reliability of determining predicted parameters according to reference read voltages and further obtaining the predicted valley voltage.

In some examples, the memory cell array includes memory cells each having a plurality of memory bits, where the plurality of memory bits correspond to a plurality of pages respectively and at least one of the pages corresponds to a plurality of stages; the peripheral circuit is configured to: after determining the target valley voltage of at least one code word for a target stage, determine the target valley voltages for the other stages than the target stage of the plurality of stages respectively.

Illustratively, with a TLC taken as an example, a manner similar to the manner of obtaining the target valley voltage for the seventh level of read voltage L7 using a preset function model may be used to obtain the target valley voltage for the third level of read voltage L3, and the target valley voltages for the seventh level of read voltage L7 and the third level of read voltage L3 may be used to read the data of the upper page of at least one code word. A manner similar to the manner of obtaining the target valley voltage for the seventh level of read voltage L7 may be used to obtain the target valley voltage for the first level of read voltage L1 and the target valley voltage for the fifth level of read voltage L5, which are used to read the data of the lower page of at least one code word. A manner similar to the manner of obtaining the target valley voltage for the seventh level of read voltage L7 may be used to obtain the target valley voltage for the second level of read voltage L2, the target valley voltage for the fourth level of read voltage L4 and the target valley voltage for the sixth level of read voltage L6, which are used to read the data of the middle page of at least one code word.

In some examples, the plurality of stages includes a first stage and a second stage, and the read voltage for the second stage is smaller than that for the first stage; the peripheral circuit is configured to: when the determined target valley voltage corresponds to the first stage, obtain at least one of a predicted valley voltage for the second stage or the predicted valley voltages for the remaining first stages with lower read voltages among the plurality of stages according to the target valley voltage determined for the first stage.

In some examples, at least one page corresponds to a plurality of stages of read voltages including a first stage of read voltages and a second stage of read voltages, where the second stage of read voltages are smaller than the first stage of read voltages. Illustratively, the first stage of read voltages may be understood as the highest read voltage among the plurality of stages of read voltages for each page and the second stage of read voltages may be understood as other read voltages among the plurality of stages of read voltages for each page that are smaller than the highest read voltage.

It is to be noted that the first stage and the second stage are used to distinguish high-level read voltages and low-level read voltages of the plurality of stages of read voltages corresponding to at least a part of a page, the low-level read voltages being smaller than the high-level read voltages. For a memory cell including a plurality of memory bits, a page corresponding to a memory bit may include one or more stages and one stage may include one or more levels.

Illustratively, as shown in FIG. 8A, the memory device includes a lower page and an upper page. The lower page corresponds to a plurality of stages, which include a first level and a third level. The read voltage for the first level L1 is smaller than the read voltage for the third level L3. Here, the third level of read voltage L3 corresponds to the first stage of read voltages of the lower page (high-level read voltages of the lower page) and the first level of read voltage L1 corresponds to the second stage of read voltages of the lower page (low-level read voltages of the lower page).

Illustratively, with reference to FIG. 8B, the memory device includes a lower page, a middle page and an upper page. Each page corresponds to a plurality of stages. The plurality of stages corresponding to the lower page include a first level and a fifth level, and the first level of read voltage L1 is smaller than the fifth level of read voltage L5. The plurality of stages corresponding to the middle page include a second level, a fourth level and a sixth level, and each of the second level of read voltage L2 and the fourth level of read voltage LA is smaller than the sixth level of read voltage L6. The plurality of stages corresponding to the upper page include a third level and a seventh level, and the third level of read voltage L3 is smaller than the seventh level of read voltage L7. Here, the fifth level of read voltage L5, the sixth level of read voltage L6 and the seventh level of read voltage L7 correspond to the first stage of read voltages of the lower page, middle page and upper page respectively, and the first level of read voltage L1, the second level of read voltage L2, the fourth level of read voltage L4 and the third level of read voltage L3 correspond to the second stage of read voltages of the lower page, middle page and upper page respectively.

Illustratively, with reference to FIG. 8C, the memory device includes a lower page, a middle page, an upper page and an extra page. Each page corresponds to a plurality of stages. The plurality of stages corresponding to the lower page include a second level, an eighth level and a fourteenth level, each of the second level of read voltage L2 and the eighth level of read voltage L8 is smaller than the fourteenth level of read voltage L14. The plurality of stages corresponding to the middle page include a third level, a seventh level, a ninth level and a thirteenth level, and each of the third level of read voltage L3, the seventh level of read voltage L7 and the ninth level of read voltage L9 is smaller than the thirteenth level of read voltage L13. The plurality of stages corresponding to the upper page include a fifth level, a tenth level, a twelfth level and the fifteenth level, and each of the fifth level of read voltage L5, the tenth level of read voltage L10 and the twelfth level of read voltage L12 is smaller than the fifteenth level of read voltage L15, and the plurality of stages corresponding to the extra page include a first level, a fourth level, a sixth level and a eleventh level, and each of the first level of read voltage L1, the fourth level of read voltage L4 and the sixth level of read voltage L6 is smaller than the eleventh level of read voltage L11. Here, the fourteenth level of read voltage L14, the thirteenth level of read voltage L13, the fifteenth level of read voltage L15 and the eleventh level of read voltage L11 correspond to the first stage of read voltages of the lower page, middle page, upper page and extra page respectively; the second level of read voltage L2 and the eighth level of read voltage L8 correspond to the second stage of read voltages of the lower page; the third level of read voltage L3, the seventh level of read voltage L7 and the ninth level of read voltage L9 correspond to the second stage of read voltages of the middle page; the fifth level of read voltage L5, the tenth level of read voltage L10 and the twelfth level of read voltage L12 correspond to the second stage of read voltages of the upper page; the first level of read voltage L1, the fourth level of read voltage L4 and the sixth level of read voltage L6 correspond to the second stage of read voltages of the extra page.

An optional example will be provided hereafter, in which according to the target valley voltages determined for the first stage of each page of the plurality of pages, at least one of predicted valley voltages of the second stage or predicted valley voltages for the remaining first stages with lower read voltages among the plurality of stages are obtained.

In an example of the present disclosure, predicted valley voltages of the low stage (the second stage) and the predicted valley voltages of the remaining high stage (the first stage) may be obtained by using the predicted valley voltages/determined target valley voltages of the high stage (the first stage). In an example, according to the predicted valley voltages/determined target valley voltages of the high stage (the first stage), the ordinal number of the stage to be predicted (the second stage and the remaining first stages with lower read voltages) and a fourth mapping function, predicted valley voltages of the stage to be predicted are obtained. Here, the fourth mapping function is related to the performance of the memory device (in particular shift performance of the threshold voltage of the memory cells), may be obtained by fitting using a great number of experimental results and be stored in the memory device before the memory device leaves the factory.

It is to be noted that the fourth mapping function does not support loop iterations.

In some examples, the peripheral circuit is configured to: according to the first result corresponding to at least one code word under a target read voltage, obtain a preset threshold used to represent a first result corresponding to the maximum in the effective range of the predicted valley voltages; and in response to the first result according to a predicted valley voltage being smaller than the preset threshold, take the predicted valley voltage as a target valley voltage.

In some examples, according to the first result corresponding to at least one code word under a first target read voltage, a preset threshold is obtained; the first target read voltage may be set according to empirical values (e.g., read voltages corresponding to success of data reading), or may be a default value obtained through a great number of simulation experiments and configured when the memory device leaves the factory. The term "a first result corresponding to a first target read voltage" in the present disclosure may be abbreviated as "an initial first result".

A FW default read voltage may be a default value obtained through a great number of simulation experiments and configured when the memory device leaves the factory.

In some examples, the preset threshold is in positive correlation with the degree of shift that is absolute values of the difference between the initial first result and the default first result.

Here, a preset threshold is used to represent the maximum in the range of predicted effective valley voltages. The preset threshold may be determined according to the first result under the first target read voltage. It can be understood that during a read operation, when the threshold voltage of a memory cell shifts relatively far with respect to the threshold voltage as writing is just done, the first result obtained using the first target read voltage is relatively large in general; based on this, a preset threshold may be confirmed using the specific value of the first result under the first target read voltage and used to represent the change (rising) of the valley voltage caused by the shift of the threshold voltage of the memory cell.

It is to be noted that when a first result is smaller than the preset threshold, it means that a target valley voltage can be determined directly.

In some examples, when a first result is smaller than a preset threshold, it means that the predicted valley voltage corresponding to the first result at this point can be taken as a target valley voltage.

Figure 16A:
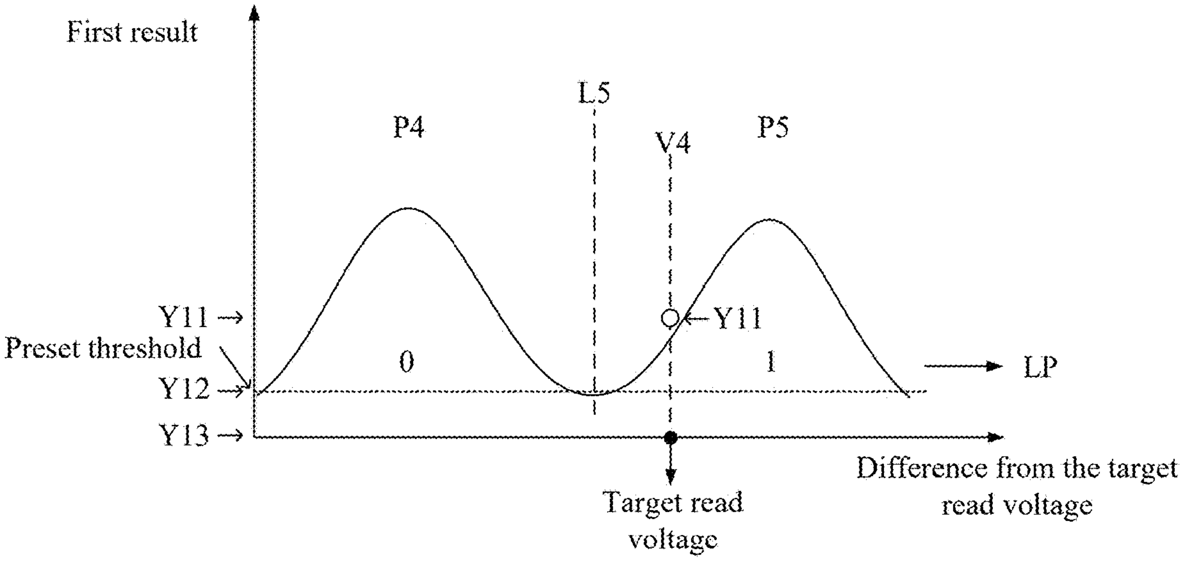
FIG. 16A is a first schematic diagram of a method of determining the preset threshold corresponding to the fifth level of read voltage corresponding to a lower page as shown in FIG. 8B provided in an example of the present disclosure.
Figure 16B:
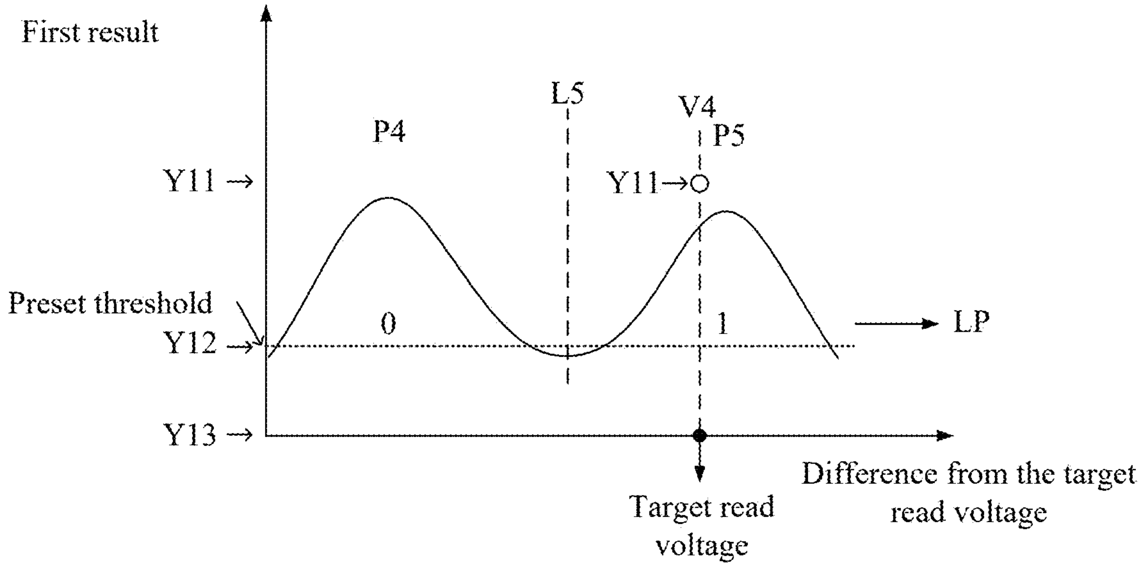
FIG. 16B is a second schematic diagram of a method of determining the preset threshold corresponding to the fifth level of read voltage corresponding to a lower page as shown in FIG. 8B provided in an example of the present disclosure.

Illustratively, the larger the absolute values of the difference between the initial first result and the default first result, the larger the preset threshold is. The difference between the initial first result Y11 and the default first result Y13 as shown in FIG. 16A is smaller than the difference between the initial first result Y11 and the default first result Y13 as shown in FIG. 14B. It can be deduced that the preset threshold shown in FIG. 16A (the Y12 shown in FIG. 16A) is smaller than the preset threshold shown in FIG. 16B (the Y12 shown in FIG. 16B).

In some examples, the peripheral circuit is configured to: in response to the first result corresponding to the predicted valley voltage being smaller than the preset threshold, take the predicted valley voltage as the target valley voltage. Illustratively, as shown in FIG. 9, the peripheral circuit is configured to: in response to the first result (the Y1 shown in FIG. 9) corresponding to the predicted valley voltage (the V0 shown in FIG. 9) being smaller than the preset threshold, take the predicted valley voltage (the V0 shown in FIG. 9) as the target valley voltage.

In a first aspect, in memory devices provided by examples of the present disclosure, the first result (the size of the first result may be a few bytes) instead of at least one code word (e.g., the size of the code word may be 4 KB) are transferred, thus reducing the amount of data to be transferred; the process of obtaining first result is constrained within the memory device and does not occupy, for example, any space of the memory controller, thus exerting less dependence on, for example, the memory controller; according to a limited number of reference read voltages and a limited number of first results in a first preset interval in combination with a preset function model, the process of obtaining the target valley voltage is accomplished in the memory device, and since the first preset interval is a reasonable interval determined during fitting of the preset function model, the data within the first preset interval are selected for determining the target valley voltage, such that not only the accuracy of determining the target valley voltage is improved, but also the impact of data noises is reduced to some extent and thereby reliability is improved, and at the same time the number of loop iterations is reduced, speeding up determination of the target valley voltage and reducing the time for transmission through the output port; memory devices of the MLC, TLC or QLC type are applicable.

Figure 17A:
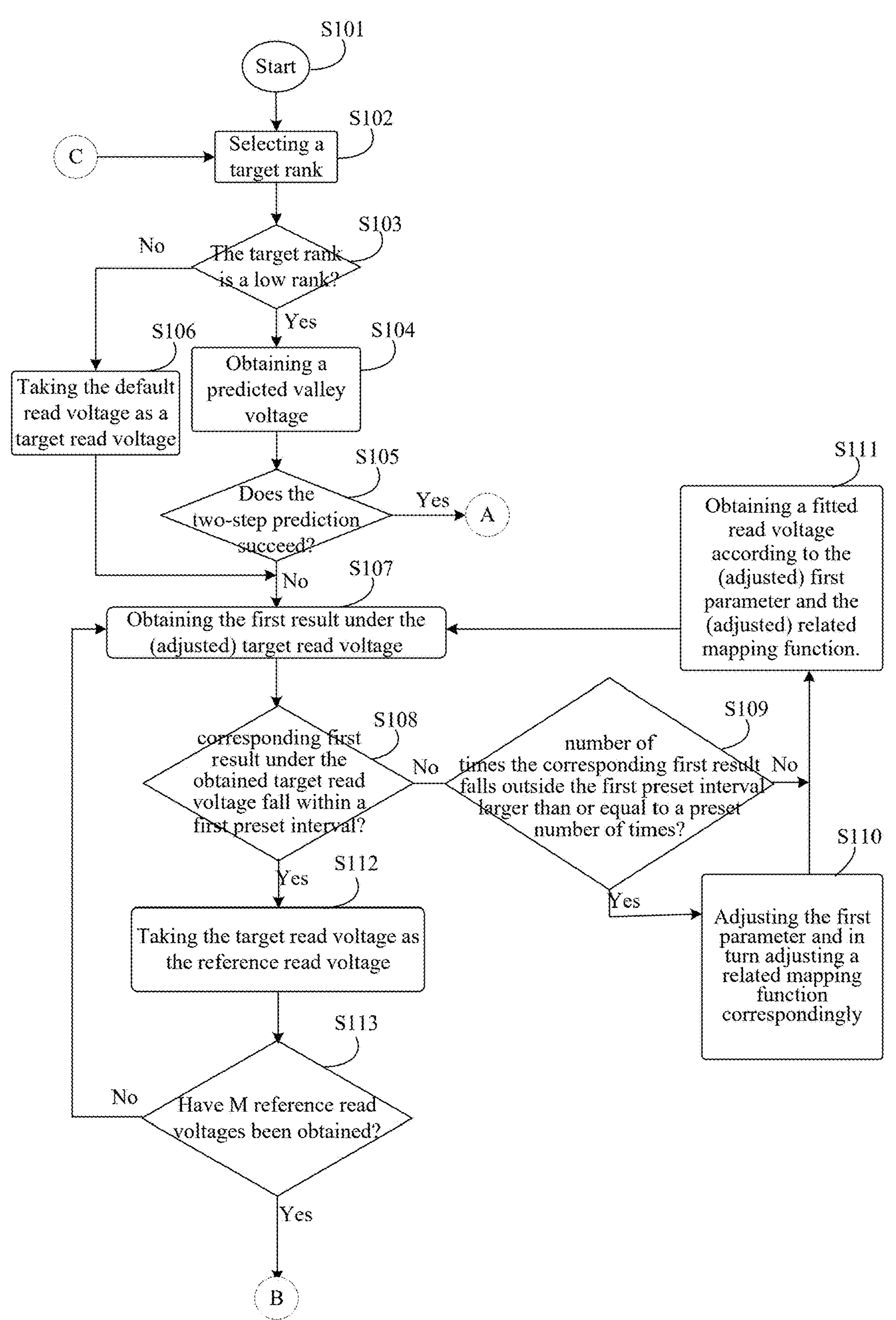
FIGS. 17A and 17B are a flowchart of an operation method of a memory device provided in an example of the present disclosure.
Figure 17B:
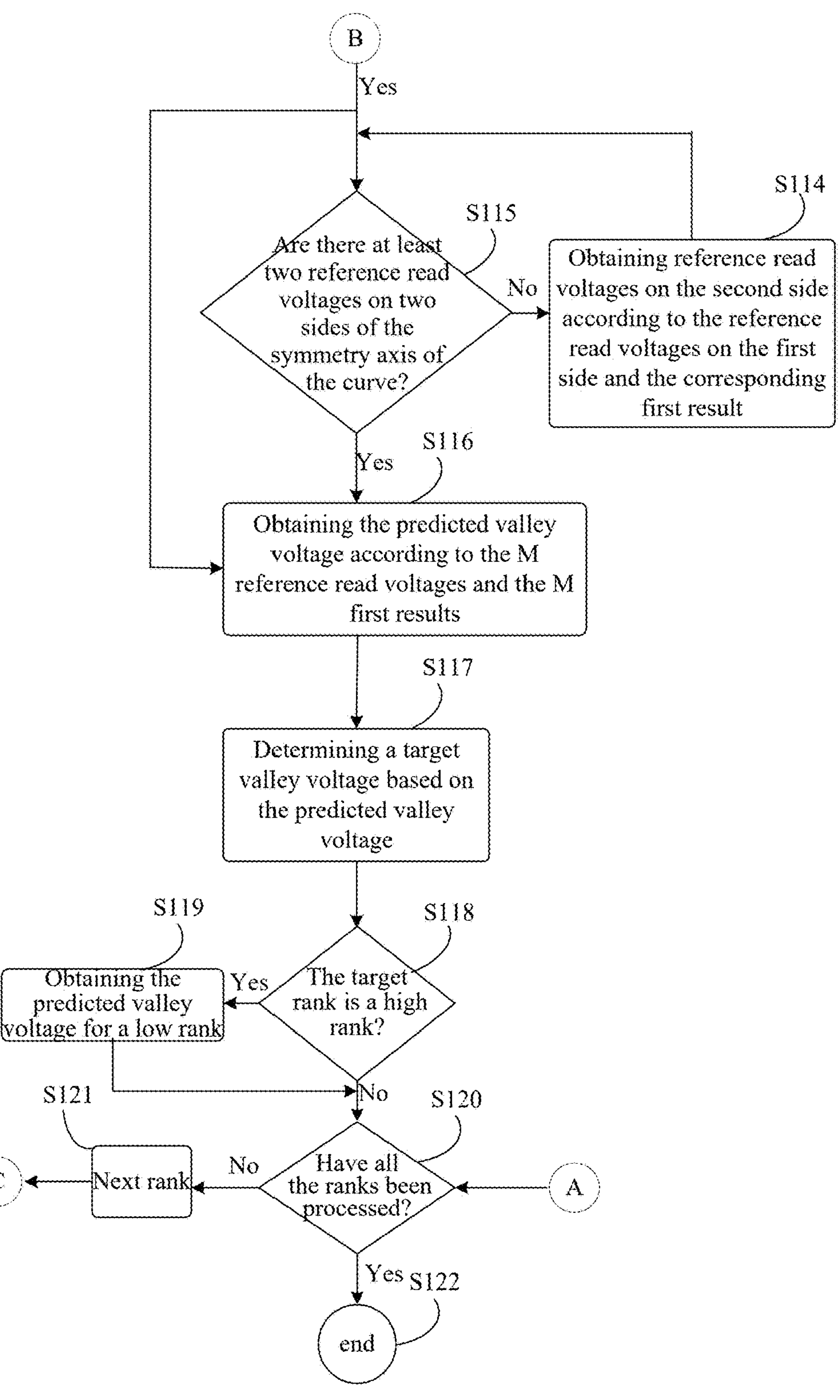

FIGS. 17A and 17B are a flowchart of an operation method of a memory device provided in an example of the present disclosure. The detailed process of determining a target valley voltage will be described in detail with reference to FIGS. 17A and 17B hereafter. It is to be noted that here and hereafter, a target valley voltage refers to a voltage used to perform a read operation on the data to be read.

In operation S101, a procedure of obtaining a target valley voltage is initiated to start the process of obtaining a target valley voltage. Subsequently, operation S102 is performed.

As described above, a memory cell has a plurality of memory bits corresponding to a plurality of pages respectively and at least one page corresponds to a plurality of stages. When a target valley voltage is determined, the target valley voltage of each level of read voltage in at least one stage of read voltages corresponding to each one of the plurality of pages is determined successively. In operation S103, one stage is selected as a target stage from the plurality of stages corresponding to a page and the target valley voltages corresponding to the target stage of the read voltages are determined. Illustratively, with a TLC taken as an example, target valley voltages of the first level of read voltage L1 and the fifth level of read voltage L5 corresponding to the lower page are determined, and one of the L1 and L5 may be selected as the target stage. After determination of the target stage, operation S103 is performed.

In operation S103, it mainly determines the type to which the target stage belongs. Here, the target stages may be classified into two classes, e.g., a first stage (also referred to as a high stage) and a second stage (also referred to as a low stage), where the read voltage of the first stage being larger than the read voltage of the second stage. Illustratively, the lower page of a TLC is still taken as an example, in which L5 is the first stage and L1 is the second stage. If L1 is selected as the target stage in operation S103, the target stage is the second stage, e.g., a low stage; if L5 is selected as the target stage in operation S103, the target stage is the first stage, e.g., a high stage. If the target stage is a low stage, operation S104 is performed; if the target stage is a high stage, operation S106 is performed.

In operation S104, a predicted valley voltage is obtained, and here the predicted valley voltage is a predicted valley voltage corresponding to a low stage and obtained according to the target valley voltage corresponding to the high stage and a fourth mapping function. Here and hereafter, the fourth mapping function may be obtained by fitting using a great number of experimental results and be stored in the memory device before the memory device leaves the factory. Subsequently, operation S105 is performed.

In operation S105, it is determined whether a two-step prediction succeeds. Here, the so-called two-step prediction may include a first step of prediction and a second step of prediction. In the first step of prediction, a predicted valley voltage of the high stage is obtained, and in an example, a predicted valley voltage of the high stage is obtained according to the corresponding first result under the target read voltage, the ordinal number of the high stage and a first mapping function. It is to be noted that in some implementations, the value of the first target read voltage is equal to the value of the FW default read voltage. In the second step of prediction, a predicted valley voltage of the low stage is obtained, and in an example, a predicted valley voltage of the low stage is obtained according to the predicted valley voltage of the above-mentioned high stage, the ordinal number of the low stage and a fourth mapping function. Moreover, no verification is performed on the predicted valley voltages after the two-step prediction and the predicted valley voltage of the high stage and the predicted valley voltage of the low stage are used directly for hard decoding. If the hard decoding succeeds, it means that the two-step prediction succeeds. At this point, the search for target valley voltages is stopped directly and operation S120 is performed; if the hard decoding fails, it means that the two-step prediction fails. At this point, the points corresponding to the predicted valley voltages are used as starting points for subsequent iterations and operation S107 is performed.

If the target stage is the high stage, operation S106 is performed, and the FW default read voltage is taken as the target read voltage. Here, the target read voltage may be taken as an initial value for subsequent searches or loops. In some implementations, the FW default read voltage may be the read voltage of a memory cell without any shift in threshold voltage, for example, the read voltage when writing is just done and the offset value at this point is 0 DAC. Operation S107 is performed after operation S106.

It is to be noted that here and hereafter, the conversion relationship between DAC and the above-mentioned mv is 1 DAC=10 mv.

For the process of performing a loop for the first time, in operation S107, the first result under the target read voltage is obtained. It can be understood that for the process of performing subsequent loops, in operation S107, the first results are obtained under adjusted target read voltages. The operation S108 is performed after operation S107.

In operation S108, it is determined whether the corresponding first result under the obtained target read voltage is within a first preset interval. If the corresponding first result under the obtained target read voltage is not within the first preset interval, operation S109 is performed.

In operation S109, it is determined whether the number of times the corresponding first result under the obtained target read voltage falls outside the first preset interval is larger than or equal to a preset number of times. If the number of times the corresponding first result under the obtained target read voltage falls outside the first preset interval is smaller than the preset number of times, operation S111 is performed, in which a fitted read voltage is obtained according to a first parameter and a related mapping function (a first mapping function, a second mapping function or a third mapping function); the fitted read voltage is taken as a new (adjusted) target read voltage and operation S107 is performed again.

If the number of times the corresponding first result under the obtained target read voltage falls outside the first preset interval is larger than or equal to the preset number of times, operation S110 is performed, in which the value of the first parameter is adjusted and the related mapping function (the first mapping function, the second mapping function or the third mapping function) is adjusted correspondingly. In some implementations, when the number of times the corresponding first result under the fitted read voltage on the first side obtained using the method described in the examples above falls outside the first preset interval is larger than or equal to the preset number of times, it means that a plurality of actual points have been obtained at this point and based on the plurality of obtained actual points in combination of the functional relation formula (1) of the quadratic function model and a second parameter (a constant), a value of the adjusted first parameter may be obtained and substituted into the related mapping function, so that the related mapping function may be adjusted correspondingly.

After operation S110, operation S111 is performed, in which a fitted read voltage is obtained according to the adjusted first parameter and the adjusted related mapping function (the first mapping function, the second mapping function or the third mapping function). The fitted read voltage is taken as a new (adjusted) target read voltage and operation S107 is performed again.

In operation S108, if the corresponding first result under the obtained target read voltage falls within the first set interval, operation S112 is performed and the target read voltage is taken as the reference read voltage.

After operation S113, operation S112 is performed, it is determined whether M reference read voltages have been obtained. If M reference read voltages have not been obtained, return to operation S107 until M reference read voltages are obtained.

In operation S113, if M reference read voltages have been obtained, operation S116 is performed directly, and a predicted valley voltage is obtained according to M reference read voltages and M first results.

Meanwhile, in operation S113, if M reference read voltages have been obtained, operation S115 may be performed first to determine whether at least two reference read voltages are located on two sides of the axis of symmetry of the curve. If the determination result is yes in operation S115, operation S116 is performed, or else operation S114 is performed. In operation S114, according to the reference read voltages on the first side and the corresponding first result, reference read voltages on the second side is obtained. FIG. 15 may be referred to for the specific process and the description thereof will not be repeated here.

After operation S114, operation S115 is performed again.

It is to be noted that M reference read voltages located on the same side of the axis of symmetry of the curve where the quadratic function model is located, or at least two of M reference read voltages located on two sides of the axis of symmetry of the curve where the quadratic function model is located, both of which may be used to obtain a predicted valley voltage.

After operation S116, operation S117 is performed, in which a target valley voltage is determined based on the predicted valley voltage. In an example, in response to the first result corresponding to the predicted valley voltage being smaller than a preset threshold, the predicted valley voltage is taken as the target valley voltage.

After operation S117, operation S118 is performed, in which it is determined whether the target stage is a high stage. If the determination result in operation S118 is no, operation S120 is performed, while if the determination result in operation S118 is yes, operation S119 is performed.

In operation S119, a predicted valley voltage of the low stage is obtained according to the target valley voltage of the high stage/predicted valley voltage. Here, the predicted valley voltage of the low stage may be obtained through the target valley voltage of the high stage/predicted valley voltage, the ordinal number of the low stage and the related mapping function (e.g., the fourth mapping function). After operation S119, operation S120 is performed.

In operation S120, it is determined whether the respective target valley voltages have been determined for the read voltages of all the stages included in the page. If the determination result is yes in operation S120, it means that the respective target valley voltages have been determined for the read voltages of all the stages included in the page, and at this point, operation S122 may be performed; if the determination result is no in operation S120, it means that among read voltages of all the stages included in the page, there are still stages, for which target valley voltages are not determined, and at this point, operation S121 is performed.

In operation S121, for the stages for which target valley voltages are not determined, the target valley voltage of each stage is determined successively. The procedure jumps from operation S121 to operation S102.

In operation S122, the procedure of obtaining a target valley voltage is terminated. It is to be noted that after operation S122, determination of target valley voltages corresponding to read voltages of all the stages of the next page may be initiated.

It is to be noted that the execution body of the process of implementing the operations in FIGS. 17A and 17B may be the peripheral circuit or a memory controller.

Figure 18:
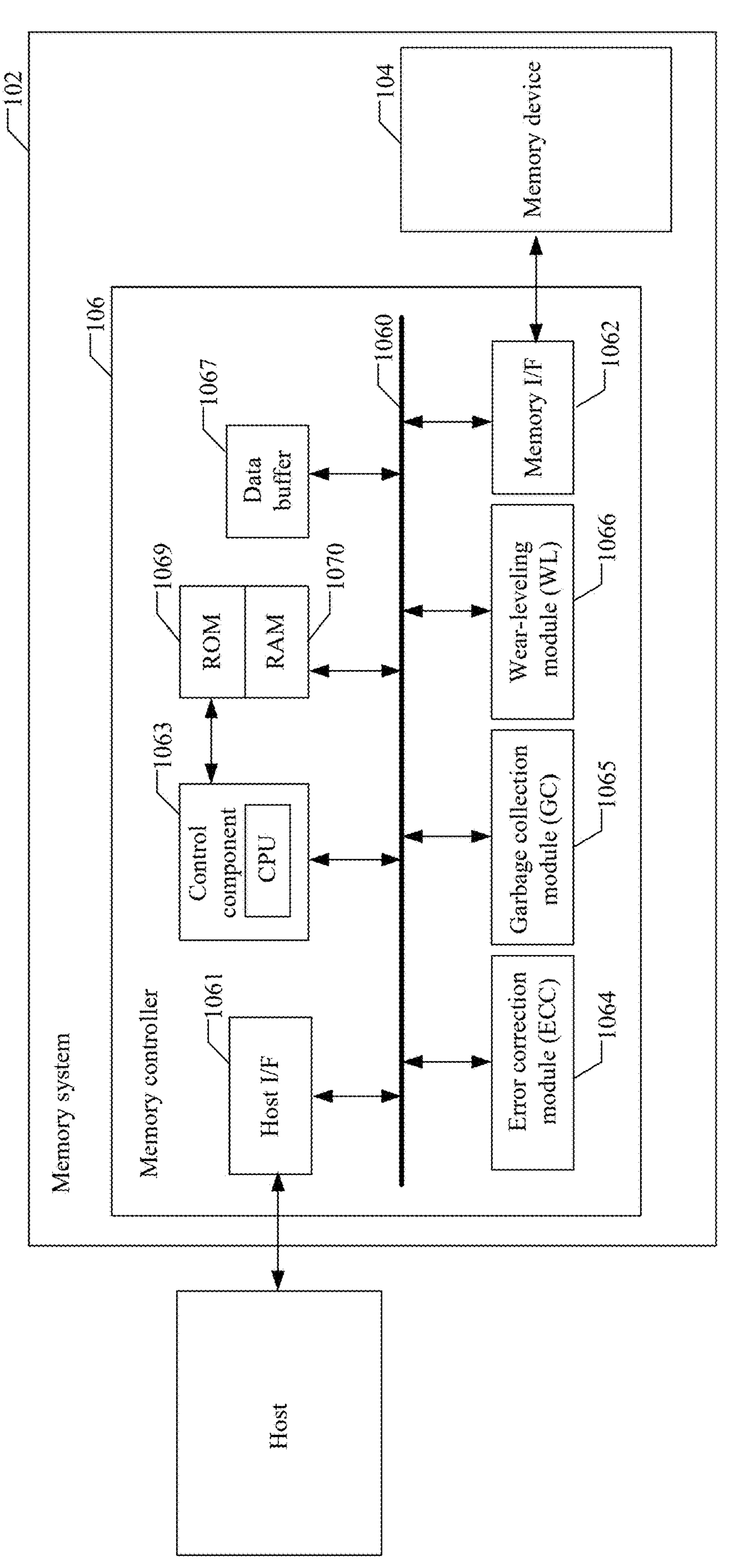
FIG. 18 is a schematic diagram of the example composition structure having a memory system provided in an example of the present disclosure.
Figure 19:
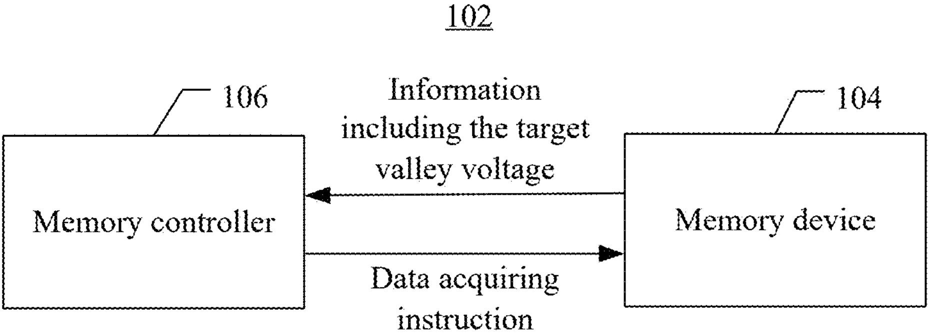
FIG. 19 is a block diagram of a memory system provided in an example of the present disclosure.

In a second aspect, examples of the present disclosure provide a memory system, which, as shown in FIGS. 18 and 19, includes: one or more memory devices 104 provided in the first aspect; and a memory controller 106 coupled to and control the memory device(s) 104.

As shown in FIG. 18, in some examples, the memory system 102 is coupled to a host and executes various feedbacks in response to instructions from the host. The memory system 102 may include a memory controller 106 and a memory device 104. The memory controller 106 is configured to control read, write and erase operations of the memory device 104. The memory controller 106 and the memory device 104 may be coupled in any suitable way.

The memory controller 106 may include a host interface (I/F) 1061, a memory interface (I/F) 1062, a control component 1063, a read-only memory (ROM) 1069, a random access memory (RAM) 1070, an error correction module 1064, a garbage collection module 1065, a wear-leveling module 1066, a data buffer 1067 and a bus 1060. Here, the host interface 1061 is an interface connected between the host 108 and the memory controller 106 and enables communication according to a particular protocol therebetween to transfer read and write requests and perform other operations. The memory interface 1062 is an interface connected between the memory controller 106 and the memory device 104 and enables data transfer therebetween. The control component 1063 is configured to control the whole memory system 106 and the above-described specific operations executed by the memory controller are mainly performed and accomplished by the control component 1063 here. In some examples, the control component 1063 is, for example, a central processing unit (CPU), a microprocessor (MCU) or the like. ROM 1069 generally includes the firmware or firmware program codes for the memory controller 106. The codes are configured to initialize and operate components of the memory controller. RAM 1070 is generally configured to buffer data. The error correction module 1064 may further include an encoding component and a decoding component. The encoding component is configured to encode the data to be stored and obtain parity data. The decoding component is configured to decode the parity data, so that the data, which may have errors, are detected and corrected during data transfer.

The garbage collection module 1065 is configured to read valid data out of some memory blocks, perform rewriting and mark the memory blocks to obtain new spare memory blocks upon the storage space of the memory device reaches a threshold. Garbage collection is generally implemented in three steps: selecting source memory blocks of less valid data; finding valid data in the source memory blocks; and writing the valid data into target memory blocks. At this point, all the data in the source memory blocks become invalid data and the source memory blocks are marked and can serve as new spare memory blocks. Wear-leveling module 1066 is configured to keep equilibrium in wear (the number of erase operations) for each memory block in the memory system through data statistics and an algorithm. Wear-leveling is generally implemented in two steps: selecting the source memory blocks, in which cold data are located; and reading the valid data out of the source memory blocks and writing them into the memory blocks that have been erased for a relatively large number of times. At this point, the valid data in the source memory blocks become invalid data and the source memory blocks are marked. The buffer 1067 is configured to buffer data.

In some examples, the memory controller 106 is configured to: control the memory device 104 to perform a read operation on at least one code word.

In some examples, the memory device 104 includes: a memory cell array including a plurality of memory cells, where a preset number of memory cells form a code word; and a peripheral circuit of the memory device 104 coupled to the memory cell array and configured to: obtain M first results corresponding to the at least one code word under M reference read voltages, where the first result includes a number of the bits which represents the number of flipped bits of the at least one code word in two read results under a first read voltage and a second read voltage; the difference between the first read voltage and the second read voltage is smaller than a preset voltage and M is an integer larger than or equal to 2; obtain a predicted valley voltage according to the M first results and M reference read voltages in combination with a preset function model, where the preset function model represents the relationship between the first results and the reference read voltages and the M first results are all in a first preset interval; and based on the predicted valley voltage, determine a target valley voltage, the target valley voltage is used as the read voltage when a read operation is performed on the at least one code word.

In some examples, the preset function model includes a quadratic function model that includes the following functional relation formula:

$$y = a(x + b)^2 + c$$

where y is the first result, x is the reference read voltage, b is used for representing a predicted parameter, a is a first parameter and c is a second parameter.

In some examples, a first preset interval represents the range between a first threshold and a second threshold in the curve where the quadratic function model is located, the first threshold being larger than the second threshold.

In some examples, the first parameter and the second parameter are both constants; the peripheral circuit of the memory device 104 is configured to: obtain the first result corresponding to the at least one code word under the target read voltage; and in response to the first result corresponding to the at least one code word under the target read voltage being within the first preset interval, take the target read voltage as one of the reference read voltages; and in response to the first result corresponding to the at least one code word under the target read voltage being outside the first preset interval, obtain at least one new target read voltages again and obtain the corresponding first results under the at least one new target read voltages until the corresponding first result under the newest target read voltage falls within the first preset interval.

In some examples, at least two of the M reference read voltages are located on two sides of the axis of symmetry of the curve where the quadratic function model located; and the peripheral circuit of the memory device 104 is configured to: when obtaining the reference read voltages, obtain the reference read voltages on the first side of the two sides of the axis of symmetry of the curve where the quadratic function model is located; and determine the reference read voltages on the second side of the two side of the axis of symmetry according to the reference read voltages on the first side.

In some implementations, the peripheral circuit of the memory device 104 is configured to: in response to the first result corresponding to at least one code word under a target read voltage being outside the first preset interval, based on the target read voltage, the corresponding first result under the target read voltage, a target first result and a first mapping function, obtain a fitted read voltage on the first side corresponding to the target first result, where the first mapping function is obtained according to the quadratic function model, the first parameter and the second parameter, the target first result is within a second preset interval and the first preset interval is within the range of the second preset interval; obtain a first result corresponding to at least one code word under the fitted read voltage on the first side; in response to the corresponding first result under the fitted read voltage on the first side being within the first preset interval, take the fitted read voltage on the first side as the reference read voltage on the first side; and in response to the corresponding first result under the fitted read voltage on the first side being outside the first preset interval, based on the previous fitted read voltage on the first side, the corresponding first result under the previous fitted read voltage on the first side, the target first result and the first mapping function, obtain the next fitted read voltage on the first side corresponding to the target first result until the corresponding first result under the newest fitted read voltage on the first side is within the first preset interval and take the newest fitted read voltage on the first side as the reference read voltage on the first side.

In some examples, the peripheral circuit of the memory device 104 is configured to: in response to the number of times the corresponding first result under the newest fitted read voltage on the first side being outside the first preset interval is larger than or equal to a preset number of times, adjust the value of the first parameter and adjust the first mapping function correspondingly; based on the previous fitted read voltage on the first side, the corresponding first result under the previous fitted read voltage on the first side, the target first result and the adjusted first mapping function, obtain the next adjusted fitted read voltage on the first side corresponding to the target first result until the corresponding first result under the newest adjusted fitted read voltage on the first side is within the first preset interval.

In some examples, the peripheral circuit of the memory 104 is configured to: based on a reference read voltage on the first side, the corresponding first result under the reference read voltage on the first side, a target first result and a second mapping function, obtain a fitted read voltage on the second side corresponding to the target first result, where the second mapping function is obtained according to the quadratic function model, the first parameter/adjusted first parameter and the second parameter; obtain the first result corresponding to at least one code word under the fitted read voltage on the second side; and in response to the corresponding first result under the fitted read voltage on the second side being within the first preset interval, take the fitted read voltage on the second side as the reference read voltage on the second side.

In some examples, the peripheral circuit of the memory device 104 is configured to: in response to the corresponding first result under the fitted read voltage on the second side being outside the preset interval, based on the previous fitted read voltage on the second side, the corresponding first result under the previous fitted read voltage on the second side, a target first result and a third mapping function, obtain the next fitted read voltage on the second side corresponding to the target first result until the corresponding first result under the newest fitted read voltage on the second side is within the first preset interval, and take the newest fitted read voltage on the second side as the reference read voltage on the second side; and the third mapping function is obtained according to the quadratic function model, the first parameter/adjusted first parameter and the second parameter.

In some examples, the first parameter is a variable and the second parameter is a constant; and the peripheral circuit of the memory device 104 is configured to: according to the M first results and the M reference read voltages in combination with the quadratic function model, obtain a predicted parameter, and take the predicted parameter as a predicted valley voltage.

In some examples, the first parameter and the second parameter are both variables; the peripheral circuit is configured to: obtain a predicted parameter according to the M first results and the M reference read voltages in combination with the quadratic function model; take the predicted parameter as a target read voltage and obtain the first result of corresponding to at least one code word under the target read voltage which is the predicted parameter; obtain a new predicted parameter according to the M first results, the M reference read voltages, the predicted parameter and the corresponding first result under the target read voltage which is the predicted parameter in combination with the quadratic function model; and take the new predicted parameter as the predicted valley voltage.

In some examples, the memory cell array includes memory cells each having a plurality of memory bits, where the plurality of memory bits correspond to a plurality of pages respectively, at least one of the pages corresponds to a plurality of stages; the peripheral circuit of the memory device 104 is configured to: after determining the target valley voltage of at least one code word for a target stage, determine the target valley voltages for the other stages than the target stage among the plurality of stages respectively.

In some examples, the plurality of stages include a first stage and a second stage, and the read voltage for the second stage is smaller than that for the first stage; the peripheral circuit of the memory device 104 is configured to: when the determined target valley voltage corresponds to the first stage, according to the target valley voltage determined for the first stage, obtain at least one of a predicted valley voltage for the second stage or predicted valley voltages for the remaining first stages with lower read voltages among the plurality of stages.

In some examples, the peripheral circuit of the memory device 104 is configured to: according to the first result corresponding to the at least one code word under the target read voltage, obtain a preset threshold configured to represent a first result corresponding to the maximum in the effective range of the predicted valley voltages; and in response to the first result corresponding to the predicted valley voltage being smaller than the preset threshold, take the predicted valley voltage as a target valley voltage.

In some examples, the peripheral circuit of the memory device 104 is configured to: read the stored data of the at least one code word under a first read voltage to obtain a second result; read the stored data of the at least one code word under a second read voltage to obtain a third result; perform logical operation on the second result and the third result to obtain a fourth result; and count, in the fourth result, the number of bits which represent flip of bits in the third result relative to the second result to obtain the first result.

In some examples, the peripheral circuit of the memory device 104 includes: a first latch, a second latch and a third latch; the first latch is configured to: store the second result; the second latch is configured to: store the third result; and the third latch is configured to: store the fourth result.

As shown in FIG. 19, in some examples, the memory controller 106 is configured to: send a data acquiring instruction that instructs to obtain a target valley voltage; the memory device 104 is configured to: receive the data acquiring instruction, obtain the target valley voltage and send information including the target valley voltage to the memory controller; the memory controller 106 is further configured to: perform a read operation on the data stored in the memory device according to the target valley voltage in the information.

In some examples, the memory controller 106 is further configured to: perform an error correction code decoding operation on a read result of the read operation. In some implementations, the error correction code decoding operation includes a hard-decoding operation using low density parity check codes (LDPCs).

In some examples, the memory controller 106 is configured to: send a mode setting command that instructs to set the read mode of the memory device into a single-level read mode, which includes reading at least one bit of data stored in the memory cells through a one-level read voltage; the memory device 104 is configured to: enter into the single-level read mode in response to the mode setting command and obtain the first result corresponding to the at least one code word under the target read voltage in the single-level read mode.

In a second aspect, in the memory system provided by examples of the present disclosure, first results (the size of the first result may be a few bytes) instead of the at least one code word (e.g., the size of the code word may be 4 KB) are transferred, thus reducing the amount of data to be transferred between the memory device and the memory controller; the process of obtaining first results is constrained within the memory device and does not occupy any space of the memory controller, thus exerting less dependence on the memory controller; and the process of obtaining a target valley voltage according to a limited number of reference read voltages and a limited number of first results in a first preset interval in combination with a preset function model is accomplished in the memory device, thus reducing at least one of the time of transfer through the input/output port of the memory device or the time for the error correction decoding operation performed by the memory controller, saving the iteration time of the error correction decoding algorithm executed by the memory controller and in turn speeding up the error correction decoding; and memory systems of the MLC, TLC or QLC type are applicable.

In a third aspect, examples of the present disclosure provide a memory controller coupled to at least one memory device each including a plurality of memory cells, where a preset number of the memory cells form a code word, the memory controller including a control component configured to: obtain M first results corresponding to at least one code word under M reference read voltages, where the first result includes a number of the bits which represents the number of flipped bits of the at least one code word in two read results under a first read voltage and a second read voltage, the difference between the first read voltage and the second read voltage is smaller than a preset voltage and M is an integer larger than or equal to 2; obtain a predicted valley voltage according to the M first results and M reference read voltages in combination with a preset function model, where the preset function model represents the relationship between the first results and the reference read voltages and the M first results are all in a first preset interval; and based on the predicted valley voltage, determine a target valley voltage and use the target valley voltage as the read voltage used when a read operation is performed on the at least one code word.

In some examples, the first preset interval represents a numerical interval of the first result corresponding to a preset region of the curve where the preset function model is located.

In some examples, the control component is configured to: obtain the first result corresponding to the at least one code word under the target read voltage; and in response to the first result corresponding to the at least one code word under the target read voltage being within the first preset interval, take the target read voltage as a reference read voltage and take the first result within the first preset interval as the corresponding first result under the reference read voltage.

In some examples, the control component is configured to: obtain a predicted parameter of the preset function model according to M first results and M reference read voltages in combination with the preset function model, where the predicted parameter is the corresponding reference read voltage when the curve where the preset function model is located has the minimum first result; and obtain a predicted valley voltage according to the predicted parameter.

In some examples, the preset function model includes a quadratic function model that includes the following functional relation formula:

$$y = a(x + b)^2 + c$$

where y is the first result, x is the reference read voltage, b is used for representing the predicted parameter, a is a first parameter and c is a second parameter.

In some examples, a first preset interval represents the range between a first threshold and a second threshold in the curve where the quadratic function model is located, the first threshold being larger than the second threshold.

In some examples, the first parameter and the second parameter are both constants; the control component is configured to: obtain the first result corresponding to the at least one code word under the target read voltage; and in response to the first result corresponding to the at least one code word under the target read voltage being within the preset interval, take the target read voltage as a reference read voltage; and in response to the first result corresponding to the at least one code word under the target read voltage is outside the first preset interval, obtain at least one new target read voltages again and obtain the corresponding first results under the at least one new target read voltages until the corresponding first result under the newest target read voltage falls within the first preset interval.

In some examples, at least two of the M reference read voltages are located on two sides of the axis of symmetry of the curve where the quadratic function model is located; and the control component is configured to: during the process of obtaining the reference read voltages, obtain the reference read voltages on the first side of the two sides of the axis of symmetry of the curve where the quadratic function model is located; and determine the reference read voltages on the second side of the two side of the axis of symmetry according to the reference read voltages on the first side.

In some examples, the control component is configured to: in response to the first result corresponding to the at least one code word under the target read voltage being outside the first preset interval, based on the target read voltage, the corresponding first result under the target read voltage, a target first result and a first mapping function, obtain a fitted read voltage on the first side corresponding to the target first result, where the first mapping function is obtained according to the quadratic function model, the first parameter and the second parameter, the target first result is within a second preset interval and the first preset interval is within the range of the second preset interval; obtain a first result corresponding to the at least one code word under the fitted read voltage on the first side; in response to the corresponding first result under the fitted read voltage on the first side being within the first preset interval, take the fitted read voltage on the first side as the reference read voltage on the first side; and in response to the corresponding first result under the fitted read voltage on the first side being outside the first preset interval, based on the previous fitted read voltage on the first side, the corresponding first result under the previous fitted read voltage on the first side, the target first result and the first mapping function, obtain the next fitted read voltage on the first side corresponding to the target first result until the corresponding first result under the newest fitted read voltage on the first side is within the first preset interval and take the newest fitted read voltage on the first side as the reference read voltage on the first side.

In some examples, the control component is configured to: in response to the number of times the corresponding first result under the newest fitted read voltage on the first side being outside the first preset interval is larger than or equal to a preset number of times, adjust the value of the first parameter and adjust the first mapping function correspondingly; based on the previous fitted read voltage on the first side, the corresponding first result under the previous fitted read voltage on the first side, the target first result and the adjusted first mapping function, obtain the next adjusted fitted read voltage on the first side corresponding to the target first result until the corresponding first result under the newest adjusted fitted read voltage on the first side is within the first preset interval.

In some examples, the control component is configured to: based on the reference read voltage on the first side, the corresponding first result under the reference read voltage on the first side, the target first result and a second mapping function, obtain a fitted read voltage on the second side corresponding to the target first result, where the second mapping function is obtained according to the quadratic function model, the first parameter/adjusted first parameter and the second parameter; obtain the first result corresponding to the at least one code word under the fitted read voltage on the second side; and in response to the corresponding first result under the fitted read voltage on the second side being within the preset interval, take the fitted read voltage on the second side as the reference read voltage on the second side.

In some examples, the control component is configured to: in response to the corresponding first result under the fitted read voltage on the second side being outside the preset interval, based on the previous fitted read voltage on the second side, the corresponding first result under the previous fitted read voltage on the second side, the target first result and a third mapping function, obtain the next fitted read voltage on the second side corresponding to the target first result until the corresponding first result under the newest fitted read voltage on the second side is within the first preset interval, and take the newest fitted read voltage on the second side as the reference read voltage on the second side; and the third mapping function is obtained according to the quadratic function model, the first parameter/adjusted first parameter and the second parameter.

In some examples, the first parameter is a variable and the second parameter is a constant; and the control component is configured to: according to the M first results and the M reference read voltages in combination with the quadratic function model, obtain a predicted parameter, and take the predicted parameter as a predicted valley voltage.

In some examples, the first parameter and the second parameter are both variables; the control component is configured to: obtain a predicted parameter according to the M first results and the M reference read voltages in combination with the quadratic function model; take the predicted parameter as the target read voltage and obtain the first result corresponding to the at least one code word under the target read voltage which is the predicted parameter; obtain a new predicted parameter according to the M first results, the M reference read voltages, the predicted parameter and the corresponding first result under the target read voltage which is the predicted parameter in combination with the quadratic function model; and take the new predicted parameter as the predicted valley voltage.

In some examples, the memory cell array includes memory cells each having a plurality of memory bits, where the plurality of memory bits correspond to a plurality of pages respectively, at least one of the pages corresponds to a plurality of stages; the control component is configured to: after determining the target valley voltage of the at least one code word for a target stage, determine the target valley voltages for the other stages than the target stage among the plurality of stages respectively.

In some examples, the plurality of stages include a first stage and a second stage, and the read voltage for the second stage is smaller than that for the first stage; the control component is configured to: when the determined target valley voltage corresponds to the first stage, according to the target valley voltage determined for the first stage, obtain at least one of a predicted valley voltage for the second stage or predicted valley voltages for the remaining first stages with lower read voltages among the plurality of stages.

In some examples, the control component is configured to: according to the first result corresponding to the at least one code word under the target read voltage, obtain a preset threshold which is configured to represent a first result corresponding to the maximum in the effective range of the predicted valley voltages; and in response to the first result corresponding to the predicted valley voltage being smaller than the preset threshold, take the predicted valley voltage as the target valley voltage.

In some examples, the amount of data of the first result is smaller than a preset data amount threshold. Illustratively, since the size of the data of the first result is in the range from 1 byte to 4 bytes, during the process of determining the target valley voltage, the amount of data transferred between the memory device and the memory controller is small and thus the speed is fast, which facilitates improvement of the overall speed of the read operation.

Here, the control component may be understood in connection with the control component shown in FIG. 18. It is to be noted that in the example of the present disclosure, the execution body is replaced from the peripheral circuit described above to the control component in the memory controller. That is, in the example of the present disclosure, the M reference read voltages and the M first results are obtained by the memory device; meanwhile the control component performs analyzing and processing using the M reference read voltages and the M first results and determines the target valley voltage according to results of the analyzing and processing.

In a third aspect, in the memory controller provided by examples of the present disclosure, first results (the size of the first result may be a few bytes) instead of at least one code word (e.g., the size of the code word may be 4 KB) are transferred between the memory device and the memory controller, thus reducing the amount of data to be transferred between the memory device and the memory controller; the process of obtaining first results is constrained within the memory device and does not occupy any space of the memory controller, thus exerting less dependence on the memory controller; and the process of obtaining a target valley voltage according to a limited number of reference read voltages and a limited number of first results in a first preset interval in combination with a preset function model is accomplished in the memory controller, which compared with accomplishing the same in the memory device, may achieve higher efficiency and accuracy, reducing at least one of the time of transfer through the input/output port of the memory device or the time for the error correction decoding operation performed by the memory controller, saving the iteration time of the error correction algorithm executed by the memory controller and in turn speeding up the error correction decoding; and memory systems of the MLC, TLC or QLC type are applicable.

In a fourth aspect, examples of the present disclosure provide an operation method of a memory device, the memory device including a plurality of memory cells, where a preset number of the memory cells form a code word, the operation method including: obtaining M first results of at least one code word under M reference read voltages, where the first result includes a number of the bits which represents the number of flipped bits of the at least one code word in two read results under a first read voltage and a second read voltage, the difference between the first read voltage and the second read voltage is smaller than a preset voltage and M is an integer larger than or equal to 2; obtaining a predicted valley voltage according to the M first results and M reference read voltages in combination with a quadratic function model, where the preset function model represents the relationship between the first results and the reference read voltages and the M first results are all in a first preset interval; and based on the predicted valley voltage, determining a target valley voltage and the target valley voltage is configured as the read voltage used when a read operation is performed on the at least one code word.

In some examples, the first preset interval represents a numerical interval of the first result corresponding to a preset region of the curve where the preset function model is located.

In some examples, the operation method of the memory device includes: obtaining the first result corresponding to the at least one code word under the target read voltage; and in response to the first result corresponding to the at least one code word under the target read voltage being within a first preset interval, taking the target read voltage as a reference read voltage and taking the first result within the first preset interval as the corresponding first result under the reference read voltage.

In some examples, the operation method of the memory device includes: obtaining a predicted parameter of the preset function model according to the M first results and the M reference read voltages in combination with the preset function model, where the predicted parameter is the corresponding reference read voltage when the curve where the preset function model is located has the minimum first result; and obtaining a predicted valley voltage according to the predicted parameter.

In some examples, the preset function model includes a quadratic function model that includes the following functional relation formula:

$$y = a(x + b)^2 + c$$

where y is the first result, x is the reference read voltage, b is used for representing the predicted parameter, a is a first parameter and c is a second parameter.

In some examples, a first preset interval represents the range between a first threshold and a second threshold in the curve where the quadratic function model is located, the first threshold being larger than the second threshold.

In some examples, the first parameter and the second parameter are both constants; the operation method of the memory device includes: obtaining the first result corresponding to the at least one code word under the target read voltage; and in response to the first result corresponding to the at least one code word under the target read voltage being within a preset interval, taking the target read voltage as a reference read voltage; and in response to the first result corresponding to the at least one code word under the target read voltage being outside the first preset interval, obtaining at least one new target read voltages again and obtaining the corresponding first results under the at least one new target read voltages until the corresponding first result under the newest target read voltage falls within the first preset interval.

In some examples, at least two of the M reference read voltages are located on two sides of the axis of symmetry of the curve where the quadratic function model is located; and the operation method of the memory device includes: during the process of obtaining the reference read voltages, obtaining the reference read voltages on the first side of the two sides of the axis of symmetry of the curve where the quadratic function model is located; and determining the reference read voltages on the second side of the two side of the axis of symmetry according to the reference read voltages on the first side.

In some specific implementations, the operation method of the memory device includes: in response to the first result corresponding to the at least one code word under the target read voltage being outside the first preset interval, based on the target read voltage, the corresponding first result under the target read voltage, a target first result and a first mapping function, obtaining a fitted read voltage on the first side corresponding to the target first result, where the first mapping function is obtained according to the quadratic function model, the first parameter and the second parameter, the target first result is within a second preset interval and the first preset interval is within the range of the second preset interval; obtaining a first result corresponding to the at least one code word under the fitted read voltage on the first side; in response to the corresponding first result under the fitted read voltage on the first side being within the first preset interval, taking the fitted read voltage on the first side as a reference read voltage on the first side; and in response to the corresponding first result under the fitted read voltage on the first side being outside the first preset interval, based on the previous fitted read voltage on the first side, the corresponding first result under the previous fitted read voltage on the first side, the target first result and the first mapping function, obtaining the next fitted read voltage on the first side corresponding to the target first result until the corresponding first result under the newest fitted read voltage on the first side is within the first preset interval and taking the newest fitted read voltage on the first side as the reference read voltage on the first side.

In some examples, the operation method of the memory device includes: in response to the number of times the corresponding first result under the newest fitted read voltage on the first side being outside the first preset interval is larger than or equal to a preset number of times, adjusting the value of the first parameter and adjusting the first mapping function correspondingly; based on the previous fitted read voltage on the first side, the corresponding first result under the previous fitted read voltage on the first side, the target first result and the adjusted first mapping function, obtaining the next adjusted fitted read voltage on the first side corresponding to the target first result until the corresponding first result under the newest adjusted fitted read voltage on the first side is within the first preset interval.

In some examples, the operation method of the memory device includes: based on a reference read voltage on the first side, the corresponding first result under the reference read voltage on the first side, the target first result and a second mapping function, obtaining a fitted read voltage on the second side corresponding to the target first result, where the second mapping function is obtained according to the quadratic function model, the first parameter/adjusted first parameter and the second parameter; obtaining the first result corresponding to the at least one code word under the fitted read voltage on the second side; and in response to the corresponding first result under the fitted read voltage on the second side being within the preset interval, taking the fitted read voltage on the second side as the reference read voltage on the second side.

In some examples, the operation method of the memory device includes: in response to the corresponding first result under the fitted read voltage on the second side being outside the preset interval, based on the previous fitted read voltage on the second side, the corresponding first result under the previous fitted read voltage on the second side, the target first result and a third mapping function, obtaining the next fitted read voltage on the second side corresponding to the target first result until the corresponding first result under the newest fitted read voltage on the second side is within the first preset interval, and taking the newest fitted read voltage on the second side as the reference read voltage on the second side; and the third mapping function is obtained according to the quadratic function model, the first parameter/adjusted first parameter and the second parameter.

In some examples, the first parameter is a variable and the second parameter is a constant; and the operation method of a memory device includes: according to the M first results and the M reference read voltages in combination with the quadratic function model, obtaining a predicted parameter, and taking the predicted parameter as a predicted valley voltage.

In some examples, the first parameter and the second parameter are both variables; the operation method of the memory device includes: obtaining a predicted parameter according to the M first results and the M reference read voltages in combination with the quadratic function model; taking the predicted parameter as a target read voltage and obtaining the first result of corresponding to the at least one code word under the target read voltage which is the predicted parameter; obtaining a new predicted parameter according to the M first results, the M reference read voltages, the predicted parameter, the corresponding first result under the target read voltage which is the predicted parameter in combination with the quadratic function model; and taking the new predicted parameter as a predicted valley voltage.

In some examples, the memory cell array includes memory cells each having a plurality of memory bits, where the plurality of memory bits correspond to a plurality of pages respectively, at least one of the pages corresponds to a plurality of stages; the operation method of the memory device includes: after determining the target valley voltage of the at least one code word for a target stage, determine the target valley voltages for the other stages than the target stage among the plurality of stages respectively.

In some examples, the plurality of stages include a first stage and a second stage, and the read voltage for the second stage is smaller than that for the first stage; the operation method of the memory device includes: when the determined target valley voltage corresponds to the first stage, according to the target valley voltage determined for the first stage, obtain at least one of a predicted valley voltage for the second stage or predicted valley voltages for the remaining first stages with lower read voltages among the plurality of stages.

In some examples, the operation method of the memory device includes: according to the first result corresponding to the at least one code word under the target read voltage, obtaining a preset threshold which is configured to represent a first result corresponding to the maximum in the effective range of the predicted valley voltages; and in response to the first result corresponding to the predicted valley voltage being smaller than the preset threshold, taking the predicted valley voltage as a target valley voltage.

It is to be noted that the execution body of the operation method of a memory device may be the peripheral circuit or the memory controller.

In a fifth aspect, examples of the present disclosure provide an operation method of a memory system. The memory controller in the memory system sends a data acquiring instruction that instructs to obtain a target valley voltage; the memory device in the memory system receives the data acquiring instruction, obtains the target valley voltage according to the operation method of the memory device in the fourth aspect and sends information including the target valley voltage to the memory controller; the memory controller performs a read operation on the data stored in the memory device according to the target valley voltage in the information.

In some examples, the memory device in the memory system includes a plurality of memory cells, where a preset number of the memory cells form a code word; the operation method of the memory system includes: obtaining M first results of at least one code word under M reference read voltages, where the first result includes a number of the bits which represents the number of flipped bits of the at least one code word in two read results under a first read voltage and a second read voltage, the difference between the first read voltage and the second read voltage is smaller than a preset voltage and M is an integer larger than or equal to 2; obtaining a predicted valley voltage according to the M first results and the M reference read voltages in combination with a quadratic function model, where the preset function model represents the relationship between the first results and the reference read voltages and the M first results are all in a first preset interval; and based on the predicted valley voltage, determining a target valley voltage and the target valley voltage is configured as the read voltage used when the read operation is performed on the at least one code word.

In a sixth aspect, examples of the present disclosure provide an operation method of a memory controller coupled to at least one memory device each including a plurality of memory cells, where a preset number of the memory cells form a code word; the operation method of the memory controller includes: obtaining M first results of at least one code word under M reference read voltages, where the first result includes a number of the bits which represents the number of flipped bits of the at least one code word in two read results under a first read voltage and a second read voltage, the difference between the first read voltage and the second read voltage is smaller than a preset voltage and M is an integer larger than or equal to 2; obtaining a predicted valley voltage according to the M first results and the M reference read voltages in combination with a quadratic function model, where the preset function model represents the relationship between the first results and the reference read voltages and the M first results are all in a first preset interval; and based on the predicted valley voltage, determining a target valley voltage and the target valley voltage is configured as the read voltage used when the read operation is performed on the at least one code word.

Figure 20:
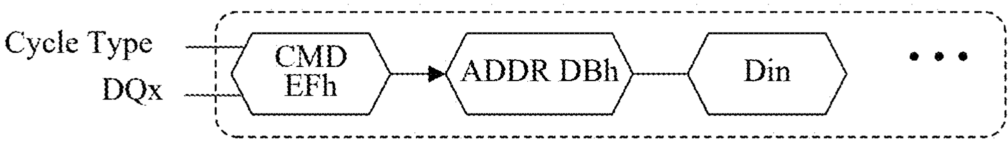
FIG. 20 is a timing diagram of an example operation for enabling a single-level read mode provided in the present disclosure.

FIG. 20 is a timing diagram of an example operation for enabling a single-level read mode provided in the present disclosure. DQx may represent a data bus signal and Cycle Type may further represent the type of the data bus signal.

As shown in FIG. 20, the function setting command may include, for example, a sub command (e.g., EFh), and illustratively the memory device enables the single-level read mode upon receiving the sub command EFh. In the single-level read mode, the memory device transfers the addresses ADDR (e.g., two column addresses C1~C2 and three row addresses R1~R3) of the data to be read between the received sub commands 00*h* and 30*h*. During the reading time, the data DATA (e.g., Dn) corresponding to the page of the received addresses may be buffered into a page buffer and then be read as desired. it is to be noted that in the examples above, data corresponding to a physical page (Dn) need be transferred (Din/Dout) between the memory device and the memory controller frequently during a reread operation, consuming a relatively long period of time.

Figure 21:
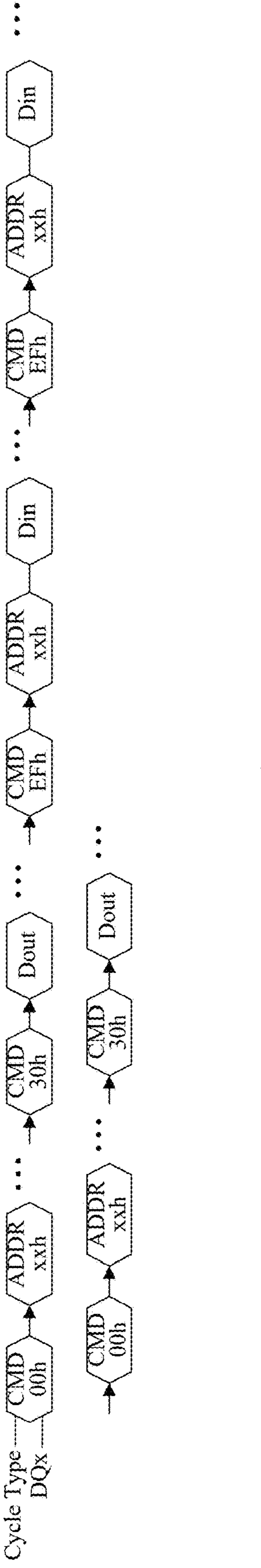
FIG. 21 is a timing diagram for determining a target valley voltage and performing a read operation provided in an example of the present disclosure.

FIG. 21 is a timing diagram for determining a target valley voltage and performing a read operation provided in an example of the present disclosure. As shown in FIG. 21, the read command may include, for example, two sub commands (e.g., 00*h* and 30*h*), and illustratively the memory device transfers the addresses ADDR (e.g., two column addresses C1~C2 and three row addresses R1~R3) of the data to be read between the received sub commands 00*h* and 30*h*. After the memory device has received the sub command 30*h*, the data DATA (e.g., Dn) corresponding to the page of the received addresses may be buffered into a page buffer and then be read as desired during the reading time.

In illustrative implementations, the memory device 104 transfers the addresses ADDR (e.g., two column addresses C1~C2 and three row addresses R1~R3) of the data to be read between the received sub commands 00*h* and 30*h*. After receiving the sub command 30*h*, the memory device 104 receives the sub commands EFh and xxh of the data acquiring instruction, acquires M first results corresponding to the code word under M reference read voltages according to the instruction of the data acquiring instruction, and sends the M reference read voltages and the M first results to the memory controller. The memory controller receives the M reference read voltages and the M first results from the memory device, uses them in combination with a preset function model to determine a target valley voltage, and performs a read operation on the data stored in the memory device according to the target valley voltage.

It is to be noted that the data acquiring instruction provided in examples of the present disclosure is only an example, exerting no limitation on the scope of the present disclosure.

In some implementations, since the amount of data of the first result is smaller than a preset data amount threshold, for example, the amount of data of the first result is in the range from 1 byte to 4 bytes, then during the process of determining the target valley voltage, the amount of data transferred between the memory device and the memory controller is small and thus the speed is fast, which facilitates improvement of the overall speed of the read operation.

Examples of the present disclosure further provide a storage medium having executable instructions stored thereon, where the executable instructions can implement steps of the operation method in the above-described examples of the present disclosure when being executed.

In some specific implementations, the storage medium may be a ferroelectric random access memory (FRAM), a read only memory (ROM), a programmable read-only memory (PROM), an erasable programmable read-only memory (EPROM), an electrically erasable programmable read-only memory (EEPROM), a flash memory, a magnetic surface memory, an optical disc, a compact disc read-only memory (CD-ROM) or any other memory; or the storage medium may be any of various apparatuses including one of or any combination of the above-described memory devices.

As an example, the executable instructions may take the form of a program, software, a software module, a script or codes, be written in any programming language (including a compiled or interpreted language or a declarative or procedural language) and be deployed in any form such as a module, an assembly, a sub routine or any other unit suitable for use in a computing environment.

As an example, the executable instructions may, but not necessarily, correspond to a file in a file system, may be stored as a portion of a file storing another program or other data, for example, stored in one or more scripts of a Hyper Text Markup Language (HTML) document, in a single file dedicated to the discussed program, or in multiple collaborative files (e.g., a file storing one or more modules, sub-routines or code sections).

For example, the executable instructions may be deployed to be executed on one electronic apparatus or on multiple electronic apparatuses located in the same place or on multiple apparatuses distributed in multiple places and interconnected through a communication network.

Figure 22:
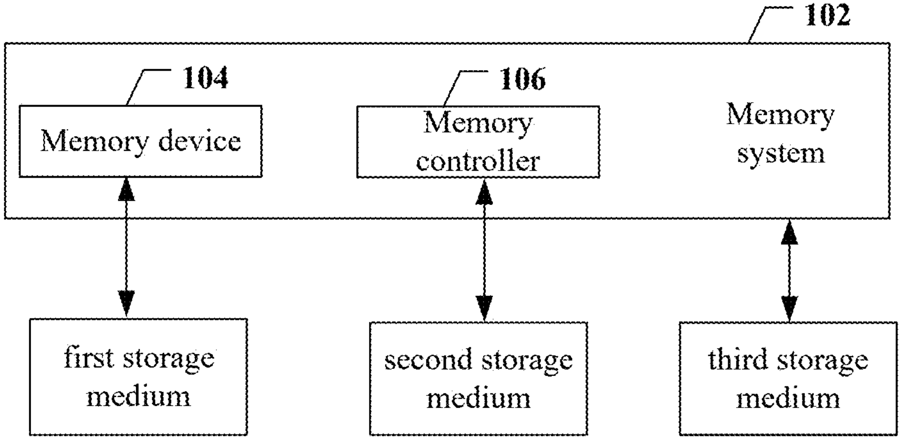
FIG. 22 is a diagram of composition structure of a storage medium provided in an example of the present disclosure.

In some examples, refer to FIG. 22, which is a diagram of composition structure of a storage medium provided in an example of the present disclosure; the storage media includes a first storage medium corresponding to the memory device 104, a second storage medium corresponding to the memory controller 106 and a third storage medium corresponding to the memory system 102; when the above-mentioned executable instructions are executed by the memory device, the first storage medium is used to implement steps of the operation method of the memory device in the above-described examples of the present disclosure; when the above-mentioned executable instructions are executed by the memory controller, the second storage medium is used to implement steps of the operation method of the memory controller in the above-described examples of the present disclosure; and when the above-mentioned executable instructions are executed by the memory system, the third storage medium is used to implement steps of the operation method of the memory system in the above-described examples of the present disclosure.

It can be understood that "one example" or "an example" mentioned throughout the specification means that particular features, structures or characteristics in association with the example may be included in at least one example of present disclosure. Therefore, "in one example" or "in an example" mentioned throughout the specification refers not necessarily to the same example. Moreover, those particular features, structures or characteristics may be incorporated in one or more examples in any suitable manner. It can be understood that, in various examples of the present disclosure, the ordinal numbers of the various processes above are not intended to indicate that the processes must be performed in any sequential order, and the various processes should be performed in a sequential order determined depending on their functions and inherent logic. Implementation of examples of the present disclosure is not limited in this respect. The ordinal numbers in the above-mentioned examples of the present disclosure are only for the purpose of description and imply no preference for any one or more examples over the others.

Only some implementations of the present disclosure are described above. It is not intended to limit the scope claimed by the present disclosure. All the equivalent structural transformations obtained using the contents of the specification and accompanying drawings in the present disclosure following the inventive concept of the present disclosure or direct/indirect application of the inventive concept in other related technical fields fall within the scope claimed by the present disclosure.

What is claimed is:

1. A memory device, comprising:

a memory cell array comprising a plurality of memory cells, wherein a preset number of the memory cells form a code word of at least one code word; and a peripheral circuit coupled to the memory cell array and configured to:

obtain M first results corresponding to the at least one code word at M reference read voltages, wherein each of the M first results comprises a number of flipped bits of the at least one code word in two read results under a first read voltage and a second read voltage, and wherein a difference between the first read voltage and the second read voltage is smaller than a preset voltage, and M is an integer larger than or equal to 2;

obtain a predicted valley voltage according to the M first results and the M reference read voltages in combination with a preset function model, wherein;

the preset function model represents a relationship between the M first results and the M reference read voltages;

each of the M reference read voltages is a respective first read voltage used to obtain a corresponding first result, and the M first results are all within a first preset interval; and in response to the corresponding first result falling outside the first preset interval, the peripheral circuit obtains at least one new target read voltage and a corresponding first result under the at least one new target read voltage until the corresponding first result under the at least one new target read voltage is within the first preset interval; and based on the predicted valley voltage, determine a target valley voltage and the target valley voltage is configured as a read voltage used when a read operation is performed on the at least one code word.

2. The memory device of claim 1, wherein the first preset interval represents a numerical interval of the first results corresponding to a preset region of a curve where the preset function model is located.

3. The memory device of claim 1, wherein the peripheral circuit is configured to:

obtain the first result corresponding to the at least one code word under a target read voltage; and in response to a first result of the M first results corresponding to the at least one code word under the target read voltage being within the first preset interval, determine the target read voltage as a reference read voltage of the M reference read voltages and determine the first result within the first preset interval as a corresponding first result under the reference read voltage.

4. The memory device of claim 1, wherein the peripheral circuit is configured to:

obtain a predicted parameter of the preset function model according to the M first results and the M reference read voltages in combination with the preset function model, wherein the predicted parameter is the corresponding reference read voltage when a curve where the preset function model is located has a minimum first result; and obtain the predicted valley voltage according to the predicted parameter.

5. The memory device of claim 4, wherein the preset function model comprises a quadratic function model comprising the following functional relation formula:

$$y=a(x+b)^2+c,$$

wherein y is a first result of the M first results, x is a reference read voltage of the M reference read voltages, b represents the predicted parameter, a is a first parameter, and c is a second parameter.

6. The memory device of claim 5, wherein the first preset interval represents a range between a first threshold and a second threshold in a curve where the quadratic function model is located, and wherein the first threshold is larger than the second threshold.

7. The memory device of claim 6, wherein the first parameter and the second parameter are both constants, and the peripheral circuit is configured to:

obtain the first result corresponding to the at least one code word under a target read voltage;

in response to the first result corresponding to the at least one code word under the target read voltage being within the first preset interval, determine the target read voltage as a reference read voltage of the M reference read voltages; and in response to the first result corresponding to the at least one code word under the target read voltage being outside the first preset interval, obtain the at least one new target read voltage again and obtain the corresponding first result under the at least one new target read voltage until the corresponding first result under a newest target read voltage falls within the first preset interval.

8. The memory device of claim 7, wherein at least two of the M reference read voltages are located on two sides of an axis of symmetry of the curve where the quadratic function model is located; and the peripheral circuit is configured to:

when obtaining the reference read voltage, obtain the corresponding reference read voltages on a first side of the two sides of the axis of symmetry of the curve where the quadratic function model is located; and determine the corresponding reference read voltages on a second side of the two sides of the axis of symmetry according to the corresponding reference read voltages on the first side.

9. The memory device of claim 8, wherein the peripheral circuit is configured to:

in response to the first result corresponding to the at least one code word under the target read voltage being outside the first preset interval, based on the target read voltage, the corresponding first result under the target read voltage, a target first result and a first mapping function, obtain a fitted read voltage on the first side corresponding to the target first result, wherein the first mapping function is obtained according to the quadratic function model, the first parameter and the second parameter, the target first result is within a second preset interval and the first preset interval is within the range of the second preset interval;

obtain the first result corresponding to the at least one code word under the fitted read voltage on the first side;

in response to the corresponding first result under the fitted read voltage on the first side being within the first preset interval, determine the fitted read voltage on the first side as one of the reference read voltages on the first side; and in response to the corresponding first result under the fitted read voltage on the first side being outside the first preset interval, based on a previous fitted read voltage on the first side, the corresponding first result under the previous fitted read voltage on the first side, the target first result and the first mapping function, obtain a next fitted read voltage on the first side corresponding to the target first result until the corresponding first result under a newest fitted read voltage on the first side is within the first preset interval, and determine the newest fitted read voltage on the first side as one of the reference read voltages on the first side.

10. The memory device of claim 9, wherein the peripheral circuit is configured to:

in response to the number of times the corresponding first result under the newest fitted read voltage on the first side being outside the first preset interval is larger than or equal to a preset number of times, adjust a value of the first parameter to obtain an adjusted first parameter and adjust the first mapping function correspondingly to obtain an adjusted first mapping function; and based on the previous fitted read voltage on the first side, the corresponding first result under the previous fitted read voltage on the first side, the target first result and the adjusted first mapping function, obtain a next adjusted fitted read voltage on the first side corresponding to the target first result until the corresponding first result under a newest adjusted fitted read voltage on the first side is within the first preset interval.

11. The memory device of claim 10, wherein the peripheral circuit is configured to:

based on one of the reference read voltages on the first side, the corresponding first result under one of the reference read voltages on the first side, the target first result and a second mapping function, obtain a fitted read voltage on the second side corresponding to the target first result, wherein the second mapping function is obtained according to the quadratic function model, one or more of the first parameter or the adjusted first parameter, and the second parameter;

obtain the first result corresponding to the at least one code word under the fitted read voltage on the second side; and in response to the corresponding first result under the fitted read voltage on the second side being within the first preset interval, determine the fitted read voltage on the second side as one of the reference read voltages on the second side.

12. The memory device of claim 11, wherein the peripheral circuit is configured to:

in response to the corresponding first result under the fitted read voltage on the second side being outside the first preset interval, based on the previous fitted read voltage on the second side, the corresponding first result under the previous fitted read voltage on the second side, the target first result and a third mapping function, obtain a next fitted read voltage on the second side corresponding to the target first result until the corresponding first result under the newest fitted read voltage on the second side is within the first preset interval, and determine the newest fitted read voltage on the second side as one of the reference read voltages on the second side, wherein the third mapping function is obtained according to the quadratic function model, one or more of the first parameter or the adjusted first parameter, and the second parameter.

13. The memory device of claim 7, wherein the peripheral circuit is configured to:

according to the first result corresponding to the at least one code word under the target read voltage, obtain a preset threshold, wherein the preset threshold is configured to represent a first result corresponding to a maximum in an effective range of the predicted valley voltages; and in response to the first result at the predicted valley voltage being smaller than the preset threshold, determine the predicted valley voltage as the target valley voltage.

14. The memory device of claim 6, wherein the first parameter is a variable and the second parameter is a constant and the peripheral circuit is configured to:

obtain the predicted parameter according to the M first results and the M reference read voltages in combination with the quadratic function model; and determine the predicted parameter as the predicted valley voltage.

15. The memory device of claim 6, wherein the first parameter and the second parameter are both variables and the peripheral circuit is configured to:

obtain the predicted parameter according to the M first results and the M reference read voltages in combination with the quadratic function model;

determine the predicted parameter as a target read voltage and obtain the first result corresponding to the at least one code word under the target read voltage which is the predicted parameter;

obtain a new predicted parameter according to the M first results, the M reference read voltages, the predicted parameter and the corresponding first result under the target read voltage which is the predicted parameter in combination with the quadratic function model; and determine the new predicted parameter as the predicted valley voltage.

16. The memory device of claim 1, wherein the memory cell array comprises memory cells each having a plurality of memory bits, wherein the plurality of memory bits correspond to a plurality of pages respectively, wherein at least one of the pages corresponds to a plurality of stages, and wherein the peripheral circuit is configured to:

after determining the target valley voltage of the at least one code word for a target stage, determine the target valley voltages for respective stages of the plurality of stages other than the target stage.

17. The memory device of claim 16, wherein the plurality of stages comprise a first stage and a second stage, wherein the read voltage for the second stage is smaller than the read voltage for the first stage, and wherein the peripheral circuit is configured to:

when the target valley voltage as determined corresponds to the first stage, according to the target valley voltage determined for the first stage, obtain at least one of a predicted valley voltage for the second stage or predicted valley voltages for remaining first stages with lower read voltages among the plurality of stages.

18. The memory device of claim 1, wherein the peripheral circuit is configured to:

read stored data of the at least one code word under the first read voltage to obtain a second result;

read the stored data of the at least one code word under the second read voltage to obtain a third result;

perform a logical operation on the second result and the third result to obtain a fourth result; and count, in the fourth result, the number of flipped bits in the third result relative to the second result to obtain the corresponding first result;

wherein the peripheral circuit comprises:

a first latch configured to store the second result;

a second latch configured to store the third result; and a third latch configured to store the fourth result.

19. A memory system, comprising:

one or more memory devices each comprising:

a memory cell array comprising a plurality of memory cells, wherein a preset number of the memory cells form a code word of at least one code word; and a peripheral circuit coupled to the memory cell array and configured to:

obtain M first results corresponding to at least one code word under M reference read voltages, wherein a first result of the M first results comprises a number of flipped bits of the at least one code word in two read results under a first read voltage and a second read voltage, a difference between the first read voltage and the second read voltage is smaller than a preset voltage and M is an integer larger than or equal to 2;

obtain a predicted valley voltage according to the M first results and the M reference read voltages in combination with a preset function model, wherein;

the preset function model represents a relationship between the M first results and the M reference read voltages;

each of the M reference read voltages is a respective first read voltage used to obtain a corresponding first result, and the M first results are all within a first preset interval; and in response to the corresponding first result falling outside the first preset interval, the peripheral circuit obtains at least one new target read voltage and a corresponding first result under the at least one new target read voltage until the corresponding first result under the at least one new target read voltage is within the first preset interval; and based on the predicted valley voltage, determine a target valley voltage and the target valley voltage is configured as a read voltage used when a read operation is performed on the at least one code word; and a memory controller coupled to and configured to control the one or more memory devices.

20. A memory controller, comprising:

a control component configured to:

obtain M first results of at least one code word at M reference read voltages, wherein each of the M first results comprises a number of flipped bits of the at least one code word in two read results under a first read voltage and a second read voltage, wherein a difference between the first read voltage and the second read voltage is smaller than a preset voltage and M is an integer larger than or equal to 2;

obtain a predicted valley voltage according to the M first results and the M reference read voltages in combination with a preset function model, wherein:

the preset function model represents a relationship between the M first results and the M reference read voltages;

each of the M reference read voltages is a respective first read voltage used to obtain a corresponding first result, and the M first results are all within a first preset interval; and in response to the corresponding first result falling outside the first preset interval, the memory controller obtains at least one new target read voltage and a corresponding first result under the at least one new target read voltage until the corresponding first result under the at least one new target read voltage is within the first preset interval; and based on the predicted valley voltage, determine a target valley voltage, wherein the target valley voltage is configured as a read voltage used when a read operation is performed on the at least one code word, wherein the memory controller is coupled to at least one memory device, wherein each of the at least one memory device comprises a plurality of memory cells forming a memory cell array, and wherein a preset number of the memory cells form a code word of the at least one code word.

* * * * *